United States Patent
Sakata et al.

[11] Patent Number: 6,132,050
[45] Date of Patent: Oct. 17, 2000

[54] REARVIEW MIRROR SYSTEM FOR VEHICLES

[75] Inventors: Ikuo Sakata, Yamato; George Kato, Tokyo; Yuji Sho, Isehara; Tsuyoshi Miki, Fujioka, all of Japan

[73] Assignee: Ichikoh Industries, Ltd., Tokyo, Japan

[21] Appl. No.: 08/937,151

[22] Filed: Sep. 25, 1997

Related U.S. Application Data

[63] Continuation of application No. 08/299,637, Sep. 2, 1994, abandoned.

[30] Foreign Application Priority Data

| Sep. 3, 1993 | [JP] | Japan | 5-219860 |
| Jun. 9, 1994 | [JP] | Japan | 6-127384 |
| Jul. 22, 1994 | [JP] | Japan | 6-170873 |
| Jul. 22, 1994 | [JP] | Japan | 6-170874 |

[51] Int. Cl.⁷ ............................ G02B 5/08; G02B 7/182; B60R 1/06
[52] U.S. Cl. .................. 359/841; 359/872; 359/877; 248/478; 248/479
[58] Field of Search ...................... 359/841, 877, 359/872; 248/479, 478, 477

[56] References Cited

U.S. PATENT DOCUMENTS

| 4,626,084 | 12/1986 | Kumaj | 359/841 |
| 4,697,065 | 9/1987 | Ishitsubo et al. | 219/219 |
| 4,981,349 | 1/1991 | Tamiya et al. | 359/877 |
| 5,190,499 | 3/1993 | Mori et al. | 464/36 |
| 5,369,530 | 11/1994 | Yamauchi et al. | 359/877 |
| 5,467,222 | 11/1995 | Oishi | 359/841 |
| 5,477,392 | 12/1995 | Mochizuki et al. | 359/841 |

FOREIGN PATENT DOCUMENTS

| 0 223 923 | 6/1987 | European Pat. Off. . | |
| 0 402 465 | 12/1990 | European Pat. Off. . | |
| 0 519 115 | 12/1992 | European Pat. Off. . | |
| 0 531 944 | 3/1993 | European Pat. Off. . | |
| 40 31 032 | 4/1991 | Germany . | |
| 0244639 | 12/1985 | Japan | 359/877 |
| 61-94845 | 5/1986 | Japan . | |
| 0082844 | 4/1988 | Japan | 359/877 |
| 0087338 | 4/1988 | Japan | 359/877 |
| 0173745 | 7/1988 | Japan | 359/877 |
| 2-10038 | 3/1990 | Japan . | |
| 2-14981 | 4/1990 | Japan . | |
| 2-19016 | 4/1990 | Japan . | |
| 0290754 | 11/1990 | Japan | 359/877 |
| 4-189638 | 7/1992 | Japan | 359/877 |
| 4-76196 | 7/1992 | Japan . | |
| 4-114839 | 10/1992 | Japan . | |
| WO 91/04172 | 4/1991 | WIPO . | |

*Primary Examiner*—Ricky D. Shafer
*Attorney, Agent, or Firm*—Foley & Lardner

[57] ABSTRACT

A rearview mirror system for vehicles comprises a plurality of base-housing sets adapted for a variety of car body styles, each of the sets comprising a base and a housing incorporating a mirror and adapted for the base, the set being to be installed to the right of the car body; a plurality of base-housing sets adapted for a variety of car body styles, each of the sets comprising a base and a housing incorporating a mirror and adapted for the base, the set being to be installed to the left of the car body; and a plurality of positioning units each coupled to each of the base-housing sets to turn the housing to a viewing position where the housing protrudes laterally from the car body and the mirror gives the driver a necessary rearview to one of parking positions where the housing is directed toward the car tail or the car head. Of the elements which are used to install the positioning unit to the housing, those on the housing side are designed in a same shape for all the housings while those on the positioning unit side are also designed in a same shape for all the positioning units. A projection is formed on the base and concavities are formed in the rotary member and housing or in the rotary member and a member separable from the rotary member and fixed to the housing, respectively. When the projection is engaged into any one of the concavities, the housing is blocked against turning in one of the parking positions.

31 Claims, 30 Drawing Sheets

REARVIEW MIRROR SYSTEM FOR VEHICLES

This application is a continuation of application Ser. No. 08/299,637, filed Sept. 2, 1994 now abandoned.

BACKGROUND OF THE INVENTION a) Field of the Invention

The present invention relates to a rearview mirror system for vehicles, and more specifically to a rearview mirror system of which the mirror housing is to be installed on either side of a car body, for example, and can be turned by hand or as driven by a motor to a viewing position (normal position) where it protrudes laterally from the car body and gives the car driver a rearview and to a viewing position (folded position) where the mirror housing is nearly parallel to the car body.

b) Prior-art Statement

Various rearview mirrors of this type have been proposed so far, including a typical one disclosed in the Japanese Unexamined Patent Publication No. Sho-61-94845 (laid open on May 13, 1986). In this conventional door mirror, the mirror housing having a mirror assembled therein is adapted to take three positions: Viewing, first and second parking positions. Namely, when in the viewing position, the mirror housing protrudes laterally from the car body and gives the car driver a rearview. When in the first parking position, the mirror housing outer end is directed toward the tail of the car body while the housing mirror side faces the lateral side of car body. When in the second parking position, the mirror housing outer end is directed toward the head of the car body while the housing rear side faces the lateral side of car body. The mirror housing can be turned from the second parking or viewing position to the first parking position or from the first parking position to the viewing or second parking position, depending upon the direction in which it is pressed by hand, body of a person or any other thing. The mirror housing can also be turned as pressed by hand. This rearview mirror has a positioning unit to turn the mirror housing in the above-mentioned directions. The positioning unit has a stationary member that is to be fixed to a base, and a rotary member that is to be fixed to the mirror housing. A shaft is provided in the stationary member and the rotary member is rotatably mounted on the shaft. The rotary member is forced by a coil spring fitted on the shaft to the stationary member. When the mirror housing is pressed by hand, the rotary member can be rotated along with the mirror housing to the viewing or first parking position against the pressure of the coil spring.

Also, another rearview mirror of the above-mentioned type in which the mirror housing is turned as driven by a motor is disclosed in the Japanese Unexamined Utility Model Publication No. Sho-4-114839 (laid open on Oct. 9, 1992). In this example, the positioning unit comprises a shaft on a stationary member, a gear mounted on the shaft, a clutch disposed between the gear and shaft, a motor on a rotary member and a gear train including a gear rotating on its own axis and about the gear on the shaft while being in mesh with the gear on the shaft. When the motor drives the gear train, the gear of the gear train that is in mesh with the gear on the shaft rotates on its own axis and about the gear on the shaft to turn the rotary member about the shaft to the viewing or first parking position. When the mirror housing is pressed by hand while the motor is being stopped, the clutch is released so that the gear on the shaft is rotated along with the rotary member that thus is turned about the shaft to the viewing or first parking position. When a person or any thing touches or hits the mirror housing in the viewing position, the clutch is released so that the rotary member can be turned about the shaft to the first or second parking position.

In these rearview mirrors, as the mirror housing is turned to the viewing position, balls held in the rotary member move and abut the ends of sector recesses formed in the stationary member concentrically with the rotary shaft of the mirror housing to set the rotary member precisely in the viewing position. Also, when a person or any thing touches or hits the mirror housing in the viewing position, a projection provided as extended from the stationary member to the rotary member enters into a concavity formed in the rotary member to limit a further or full turn of the mirror housing toward the first or second parking position.

As mentioned above, the conventional rearview mirrors use the positioning units in which the mirror housing is turned as driven by a motor and ones in which the mirror housing is to be turned by hand. To turn the mirror housing in case a pair of such rearview mirrors are installed on the body of a car, for example, four positioning units are required, including a positioning unit built in the left-hand mirror in which the mirror housing is turned as driven by a motor, a positioning unit built in the right-hand mirror in which the mirror housing is turned as driven by a motor, a positioning unit built in the left-hand mirror in which the mirror housing is to be turned by hand, and a positioning unit built in the right-hand mirror in which the mirror housing is to be turned by hand. Further, the mirror housing and base are designed in various shapes correspondingly to a variety of car body styles. Since the internal space of the mirror housing varies from one to another mirror housing, the motor-driven positioning unit and manual positioning unit are prepared for each set of the base and mirror housing, thus resulting in a rather large number of positioning unit types. For manufacture of the positioning units, it is not only necessary to prepare, check and manage many molding dies and jigs but also to manage many types of manufactured parts and many finished positioning units. Namely, the manufacture of the rearview mirrors needs large costs.

SUMMARY OF THE INVENTION

The present invention has an object to provide an improved rearview mirror system in which a minimum number of positioning unit types is used.

According to an aspect of the present invention, a rearview mirror system is provided which comprises a plurality of base-housing sets adapted for a variety of car body styles, each of the sets comprising a base and a housing incorporating a mirror and adapted for the base, the set being to be installed to the right of the car body; a plurality of base-housing sets adapted for a variety of car body styles, each of the sets comprising a base and a housing incorporating a mirror and adapted for the base, the set being to be installed to the left of the car body; a plurality of motor-driven positioning units each coupled to each of the base-housing sets and composed of a stationary member coupled to the base included in each of the base-housing sets, a rotary member coupled to the housing included in each of the base-housing sets, and a turning mechanism disposed between the stationary and rotary members to turn, by a motor, the rotary member along with the housing to an viewing position where the housing protrudes laterally from the car body, first parking position where it is directed toward the car tail and its mirror side faces the car body lateral side or second parking position where the housing is directed toward the car head and its rear side faces the lateral side of car body; a plurality of manual positioning units each coupled to each of the base-housing sets in place of the motor-driven positioning unit and composed of a stationary member coupled to the base included in each of the base-housing sets, a rotary member coupled to the housing included in each of the base-housing sets and a turning mechanism disposed between the rotary and stationary members to turn, by hand, the rotary member along with the housing to the viewing position, first parking position or second parking position; the housing in each of the base-housing sets being provided with a mount, each of the motor-driven or manual positioning units having a complementary portion which cooperates with the mount to couple the rotary member to the housing, the mount being designed in a same shape for the housings, the complementary portion being designed in a same shape for the positioning units; and each of the positioning units including means of blocking the housing against turning in each of the parking positions, the means including three parties of which the first one is formed in the base in each of the base-housing sets, the second one is so formed in the rotary member of each of the positioning units as to be put in contact with the first party in one of the parking positions and the third one is so formed in the housing in each of the base-housing sets as to be put into contact with the first party in the other parking position.

According to another aspect of the present invention, a rearview mirror system is provided which comprises a plurality of base-housing sets adapted for a variety of car body styles, each of the sets comprising a base and a housing incorporating a mirror and adapted for the base, the set being to be installed to the right of the car body; a plurality of base-housing sets adapted for a variety of car body styles, each of the sets comprising a base and a housing incorporating a mirror and adapted for the base, the set being to be installed to the left of the car body; a plurality of motor-driven positioning units each coupled to each of the base-housing sets and composed of a stationary member coupled to the base included in each of the base-housing sets, a rotary member coupled to the housing included in each of the base-housing sets, and a turning mechanism disposed between the stationary and rotary members to turn, by a motor, the rotary member along with the housing to an viewing position where the housing protrudes laterally from the car body, first parking position where it is directed toward the car tail and its mirror side faces the car body lateral side or second parking position where the housing is directed toward the car head and its rear side faces the lateral side of car body; a plurality of manual positioning units each coupled to each of the base-housing sets in place of the motor-driven positioning unit and composed of a stationary member coupled to the base included in each of the base-housing sets, a rotary member coupled to the housing included in each of the base-housing sets and a turning mechanism disposed between the rotary and stationary members to turn, by hand, the rotary member along with the housing to the viewing position, first parking position or second parking position; and the housing in each of the base-housing sets being provided with a mount, a portion of each of the positioning units including an area of the rotary member that is to be coupled to the housing being separably coupled to the rest of the rotary member, each of the separable portions having a complementary portion which cooperates with the mount in the coupling to the housing in each base-housing set, the mount being designed in a same shape for the housings, the complementary portion being designed in a same shape for the positioning units.

These and other objects and advantages of the present invention will be more apparent from the ensuing description made, by way of example, of the preferred embodiments of the present invention with reference to the drawings.

DETAILED DESCRIPTION OF THE PREFERRED EMBODIMENTS

Figure 1:
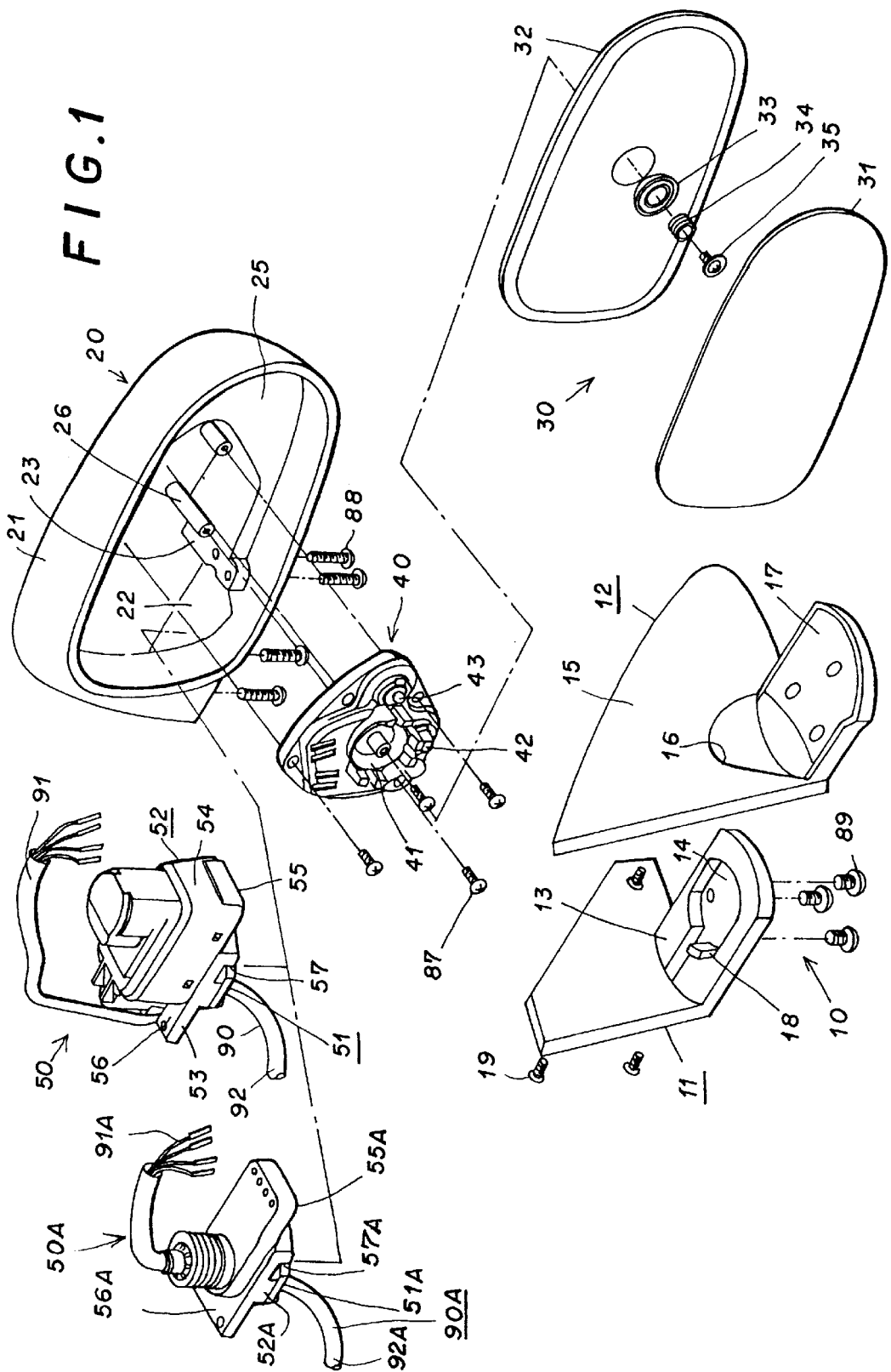
FIG. 1 is an exploded perspective view of a first embodiment of the rearview mirror system according to the present invention, showing a certain construction thereof.
Figure 2:
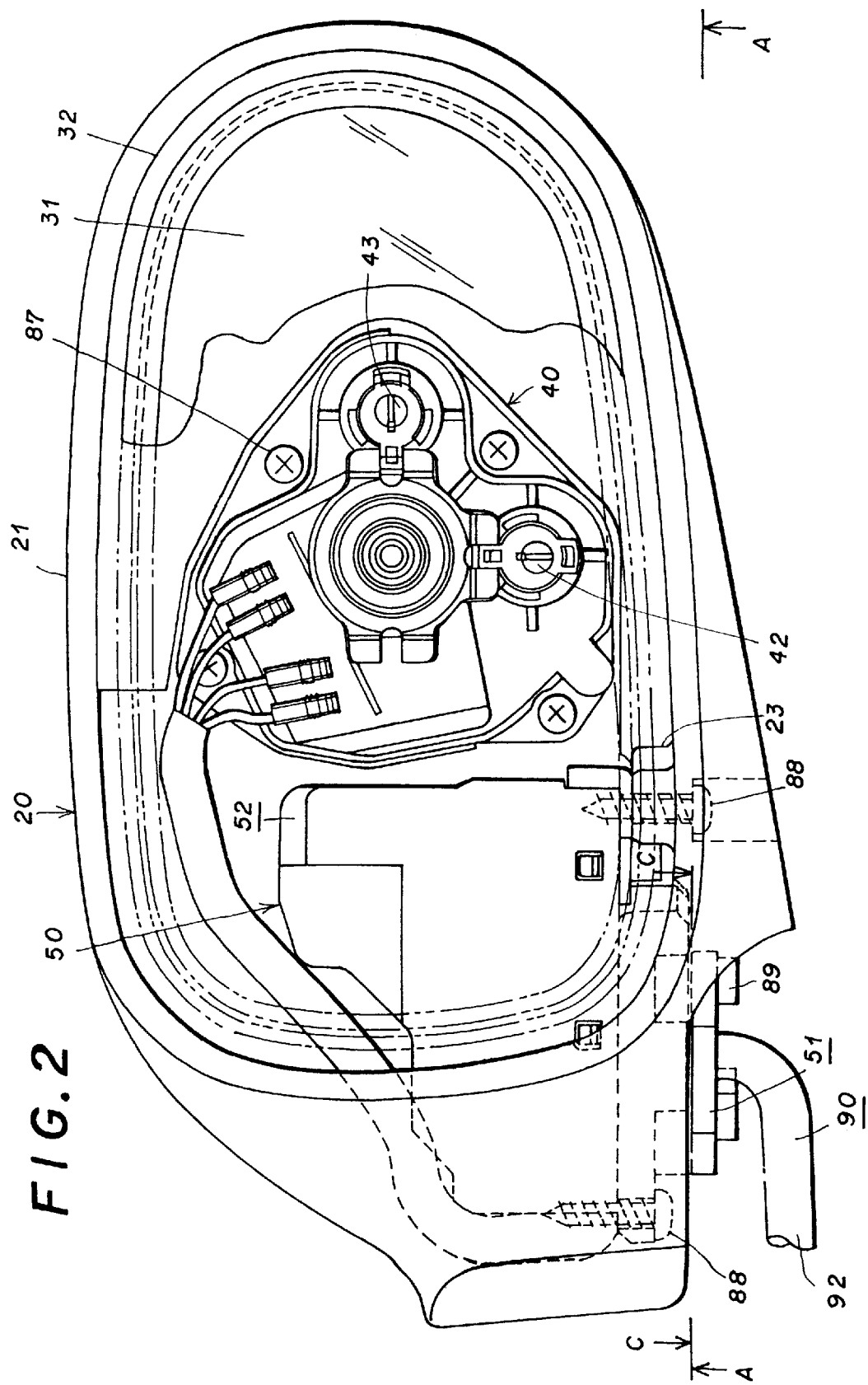
FIG. 2 is a front view of a rearview mirror, which is obtained by assembling the system in FIG. 1 but does not include the base.

FIG. 1 shows a part of the rearview mirror system according to the present invention, which is to be assembled into a rearview mirror that is to be installed on the right-hand door of a car.

The rearview mirror has a base 10 and housing 20, both formed correspondingly to the style of a car on which the rearview mirror is to be fixed. The base 10 consists of a base body 11 and base cover 12. The base body 11 is to be fixed to the right-hand door of the car, and the housing 20 has a mirror unit 30 incorporated therein. The mirror unit 30 is supported in the housing 20 by means of a tilting mechanism 40 having a ball joint. The mirror unit 30 can be tilted in any direction by the tilting mechanism 40. Further, there is provided between the base 10 and housing 20 a positioning unit 50 that turns the housing 20 as driven by a motor or a positioning unit 50A that turns the housing 20 by hand. The positioning unit 50 or 50A is used to turn the housing 20 to the viewing position, first parking position or second parking position.

The base body 11 and base cover 12 composing the base 10 have a form of a bracket or a nearly L-shaped structure. The base body 11 has a hollow portion 13 that forms one arm of the L-shape and a concavity 14 formed in the outer wall of the arm and in which the positioning unit 50 is to partially be fitted. The base cover 12 has an opening 16 formed in a portion 15 thereof which forms one arm of the L-shape. To build up the base 10, the portion 13 of the base body 11 is passed through the opening 16 in the base cover 12 and set on a portion 17 that forms the other arm of the base cover 12.

The housing 20 is formed like a shallow elongated round box open at the front thereof, and has an elongated opening 22 formed in an area of a circumference 21 thereof that selves as the bottom of the housing 20. The housing 20 has two seats provided on either side of the opening 22 and on which the positioning unit 50 or 50A is to be fixed. FIG. 1 shows only one seat 23. The seat 23 is a block formed integrally with the housing 20, i.e., formed on the inner wall of an area of the circumference 21 of the housing 20 that serves as the bottom side of the housing. The other seat is also formed integrally with the housing 20 on the inner wall of an area of the circumference 21 of the housing 20 that serves as the lateral side of the housing 20. The housing 20 has also support studs 26 formed integrally with the rear wall 25 thereof and on which the tilting mechanism 40 is to be fixed. The support studs 26 include, for example, four studs each being an internally threaded cylinder.

The mirror unit 30 consist of a mirror proper 31 and a mirror holder 32 to which the mirror proper 31 is fixed. The mirror holder 32 is coupled to the tilting mechanism 40 by means of a ball 33, a spherical seat 41 provided in the body of the tilting mechanism 40, a coil spring 34, set screw 35, etc. The tilting mechanism 40 is fixed to the support studs 26 inside the housing 20 with screws 87. Also, the tilting mechanism 40 has incorporated therein two rods and, motors that move these rods back and forth independently of each other, reduction gears, etc. To tilt the mirror unit 30, one of the motors runs to move the rod 42 which in turn will push the rear side of the mirror holder 32 that will thus be turned vertically about the ball joint while the other motor runs to move the rod 43 which in turn will push the rear side of the mirror holder 32 that will thus be turned horizontally about the ball joint.

The positioning unit 50 which turns the housing 20 by means of a motor comprises a turning mechanism which turns the housing to the viewing position, first parking position or second parking position, and a support carrying the tilting mechanism 40. The support consists of a stationary member 51 fixed to the base 10 and a rotary member 52 fixed to the housing 20. The stationary member 51 has the substantial form of a plate. The rotary member 52 consists of a member 53 and another member 54 separable from the member 53. The member 53 as a whole is a nearly hollow box open at the top thereof. The member 54 is a generally hollow box open at the bottom thereof. When the member 54 is fitted on the member 53, they form together one casing. The member 53 has a fixture 55 that is to be secured to the seat 23 located by the side of the opening 22 in the housing 20 and another fixture 56 that is to be secured to the other seat at the other side of the opening 22. The fixture 55 is a step on the bottom of the member 53 and the fixture 56 is a protrusion from the end face of the member 53. The turning mechanism is built and sealed in the casing defined by the members 53 and 54. As will be discussed in detail later, the turning mechanism is composed of a shaft, a gear fixed to the shaft by means of a clutch, a motor incorporated in the rotary member 52, a gear train that transmits the revolution of the motor to the gear on the shaft, etc. The shaft is erected on the stationary member 51 while the rotary member 52 is fitted on the shaft, the gear is fitted on the shaft, the clutch is placed between the gear and shaft, and the motor and gear train are incorporated in the rotary member 52 so that the rotary member 52 can be rotated on the stationary member 51 as the motor runs. A pair of sector recesses is formed on the surface of the stationary member 51 that faces the rotary member 52 and concentrically with the shaft. Balls are provided as held on the surface of the member 53 that faces the stationary member 51 or half balls are formed integrally with the member 53, on the surface of the member 53 that faces the stationary member 51. The balls or half balls are fitted in the sector recesses, respectively. These balls or half balls cooperate with the shaft to support the rotary member 52 on the stationary member 51 and also hold the housing 20 in the viewing position as they abut the end of the sector recess.

To assemble the positioning unit 50 into the housing 20, the positioning unit 50, for example, is laid inside the housing 20 at first, the fixture 55 is put in contact with the top of the seat 23 inside the housing 20 and the fixture 56 is also put in contact with the bottom of the other seat inside the housing 20 while the stationary member 51 is being placed inside the opening 22 of the housing 20. Then, screws 88 are driven into the seats and fixtures from outside the bottom of the housing 20 to couple the positioning unit 50 to the housing 20. With the stationary member 51 of the positioning unit 50 fitted into the concavity 14 in the portion 13 of the base body 11, the base 10 is fitted into the housing 20 and screws 89 are driven into the stationary member 51 from under the portion 13 of the base body 11 through the portion 13 of the base body 11 and portion 15 of the base cover 12 to couple the stationary member 51 to the base 10. Before the above assembling, a cable 90 is passed through the internal space of the base body 11 and the shaft and some of the wires of the cable 90 are connected to the motor in the turning mechanism and the other wires 91 are connected to the motor in the tilting mechanism 40.

The positioning unit 50A that turns the housing 20 by hand is also composed of a mechanism that turns the housing 20 and a support carrying the turning mechanism. This support also consists of a stationary member 51A that is to be fixed to the base 10 and a rotary member 52A that is to be fixed to the housing 20. The stationary member 51A has the substantial shape of a plate. The rotary member 52A is also like a plate having a fixture 55A that is to be secured to the seat 23 in the housing 20 and another fixture 56A that is to be secured to the other seat in the housing 20. The fixture 55A is a step formed under the rotary member 52A and the fixture 56A is a protrusion from the end face of the rotary member 52A. These fixtures 55A and 56A are identical in size and shape to the fixtures 55 and 56 of the positioning unit 50. As will be discussed in detail later, the turning mechanism is composed of a shaft provided on the stationary member 51A and which holds the rotary member 52A, a coil spring provided as fitted on the shaft and which forces the rotary member 52A to the stationary member 51A, balls held on the surface of the rotary member 52A that faces the stationary member 51A or half balls formed integrally with the rotary member 52A, on the surface thereof that faces the stationary member 51A, sector recesses formed concentrically with the shaft, on the surface of the rotary member 52A that faces the stationary member 51A and in which the balls or half balls are fitted, etc.

To assemble the positioning unit 50A into the housing 20, the same procedure as that for assembling the motor-driven positioning unit 50 is to be followed. For example, the cable 90A is passed through the internal space of the portion 13 of the base body 11 and the shaft and connected to the motor in the tilting mechanism 40, then the positioning unit 50A is laid inside the housing 20, the fixture 55A is put in contact with the seat 23 in the housing 20 and the fixture 56A is put in contact with the other seat 24 in the housing 20 while the stationary member 51A is being placed in the opening 22 of the housing 20, screws 88 are driven into the fixtures 55A and 56A of the positioning unit 50A from outside the bottom of the housing 20 through the seats to couple the rotary member 52A to the housing 20, and the stationary member 51A of the positioning unit 50A is fitted into the concavity 14 in the portion 13 of the base body 11 to assemble the base 10 into the housing 20. Thereafter, screws 89 are driven into the stationary member 51A from under the portion 13 of the base cover 11 through the portion 13 of the base cover 11 and portion 15 of the base cover 12 to couple to the stationary member 51A to the base 10.

The base and housing of the rearview mirror to be installed to the lefthand door of a car are not illustrated herein but they are formed symmetrically to the base 10 and housing 20 of the right-hand rearview mirror having been described in the foregoing. To install both the positioning units in relation to the base and housing in a set, the stationary member is put in the opening of the housing, the rotary member is placed inside the housing with one of the fixtures set in contact with the seat 23 in the housing while the other fixture is put in contact with the other seat 24 in the housing, the rotary member and housing are coupled to each other with screws, and the base body is coupled to the stationary member with screws.

To install to the door of a car the right-hand one, shown in FIG. 1, of the rearview mirrors, in which the positioning unit 50 is provided to turn the housing 20 as driven by the motor, the base body 11 of the base 10 having the assembled mirror already fixed thereon is fixed to the car body and an end 92 of the cable 90 is connected by a connector to a controller provided in the car body. The driver can operate the switches of the controller, provided near the driver's seat, to control the motor of the turning mechanism for the housing 20 and the motors in the tilting mechanism 40. When the motor of the positioning unit is put into revolution when the housing 20 is in the first parking position, the gear of the gear train is put into mesh with the gear on the shaft rotates on its own axis and about the gear on the shaft. The rotary member 52 is turned along with the housing 20 about the shaft toward the viewing position. When the motor runs reversely, the housing 20 is turned toward the first parking position. When the housing 20 is pressed strongly by hand from the viewing position to the first parking position or from the first parking position to the viewing position while the motor is out of operation, the clutch disconnects the gear on the shaft from the stationary member 51, the rotary member 52 is turned along with the gear on the shaft and the housing 20 about the shaft toward the first parking position or viewing position. When a person or any thing touches the housing 20 having been set in the viewing position, the clutch disconnects the gear on the shaft from the rotary member 52 which in turn will be turned along with the housing 20 about the shaft to the first or second parking position. When the housing 20 in the set or first parking position is blocked against turning, the load to the motor increases and an increased current flows through the motor. The controller detects the increased current flow and shuts off the power supply to the motor that will thus be stopped from running with the housing 20 in the viewing or first parking position.

To install the rearview mirror in which the positioning unit 50A is provided to permit manual turning of the housing 20, the base cover 12 of the base 10 is fixed to the car body, and an end 92A of a cable 90A is connected by a connector to the controller provided in the car body. The cable 90A has a wire 91A connected to the motor in the tilting mechanism 40, similar to the wire 91 of the aforesaid cable 90. In this case, the driver can operate the switches of the controller, located near the driver's seat, to control only the motors in the tilting mechanism 40. The housing 20 is turned by hand to the viewing position or first parking position. When the housing 20 is pressed, the rotary member 52A is turned against the pressure of the coil spring, the balls 83 between the stationary member 51A and rotary member 52A move and abut the ends of the sector recesses and thus the housing 20 is set in the viewing position. When a person or any thing touches the housing 20, the rotary member 52A is turned against the pressure of the coil spring to the first or second parking position.

In the rearview mirror having either of such positioning units, the housing 20 is stopped when the balls between the stationary member 51 and rotary member 52 abut the ends of the sector recesses in the stationary member 51. The housing 20 is blocked against turning in the first parking position when a projection formed on the base 10 is engaged into a concavity 57 formed in the rotary member 52. In the second parking position, the housing 20 is blocked against turning when the projection of the base 10 is engaged into a concavity formed in the housing 20. Otherwise, the housing 20 is blocked against turning in the first parking position when the projection formed on the base 10 is engaged into the concavity of the housing 20, and in the second parking position when the projection formed on the base 10 is engaged into the concavity 57 in the rotary member 52. The positioning unit 50A has such a concavity, indicated with 57A, formed in the bottom of the rotary member 52A thereof. For example, in a rearview mirror shown in FIG. 1 that is to be installed to the right of a car body, the projection is formed on the base 10, one of the concavities is formed in the rotary member 52 (52A) and the other concavity is formed in the housing 20. When the projection is engaged into the concavity 57 (57A) in the rotary member, the housing 20 is blocked against turning in the first parking position. And when the projection is engaged into the concavity in the housing 20, the housing 20 is blocked against turning in the second parking position. More specifically, the projection is formed integrally with the portion 13 of the base body 11 and lies in an imaginary circle concentric with the shaft erected on the stationary member 51 (51A) of the positioning unit 50 (50A). The free end of the projection 18 extends to the bottom of the housing 20. In addition to the concavity 57 (57A), another concavity 57' (57A') is formed in the rotary member 52 (52A) in a position opposite to the concavity 57 (57A). These concavities 57 (57A) are formed each as one end of a circular recess on an imaginary circle concentric with the shaft. The concavity in the housing 20 is a cut also formed as the other end of the circular recess. The concavities 57 (57A) of the rotary member 52 (52A) are located in a position on the imaginary circle that corresponds to the position the projection 18 takes when the housing 20 is turned to the first parking position. The concavity in the housing 20 is located in a position on the imaginary circle that corresponds to the position the projection 18 takes when the housing 20 is turned to the second parking position. When the stationary member 51 is coupled to the portion 15 of the base 10, the projection has the free end thereof placed in the circular recess. When the housing 20 is turned to the first parking position, the projection 18 is engaged into the concavity 57 of the rotary member 52 to stop the rotary member 52 from further moving. When the housing 20 is turned to the second parking position, the projection 18 is engaged into the concavity to block any further turning of the rotary member 52.

In the rearview mirror to be installed to the left-hand door, the concavities in the housing and rotary member are formed symmetrically to those in the housing 20 and rotary member 52 of the rearview mirror that is to be installed to the right-hand door, so the housing 20 is set in the viewing position and blocked against turning in the parking positions in the same manner as in the right-hand rearview mirror.

The rearview mirror system according to the present invention includes a plurality of base-housing sets adapted for the styles of cars and which are to be installed to the right of a car and a plurality of base-housing sets adapted for the styles of cars and which are to be installed to the left of the car (not illustrated) in addition to the base-housing set which is to be installed to the right of the car and the base-housing set which is to be installed to the left of the car. Also in the former plural base-housing sets for the right and left car doors, the housing has an opening, a seat and another seat in pair with the first seat provided in an area thereof that faces the base. These opening and seats in one base-housing set are formed identical to those in another base-housing set. Each of the motor-driven positioning units has formed at the rotary member thereof fixtures corresponding to the seats. These fixtures in one base-housing set are formed identical to those in another base-housing set. This is also true with each of the manual positioning units.

Accordingly, either of the motor-driven and manual positioning units can be installed to any of the above-mentioned base-housing sets. All the base-housing sets for installation on the right-hand door, left-hand door and adapted for the styles of car bodies can use a same positioning unit. That is, the positioning unit may not be constructed uniquely for each of the base-housing sets. Therefore, the number of positioning unit types can be extremely reduced, and the positioning units can be manufactured with a reduced total cost. Further, since the positioning unit can be mass-produced, the manufacturing costs for the positioning units can be further reduced.

Moreover, in each of the assembled rearview mirrors, the housing in one of the parking positions is blocked against turning by means of the projection and the concavity in the housing. So no special positioning unit may be used to accommodate any difference in the angular range of the housing between the first and second parking positions, which leads to a further reduction of the required number of positioning unit types. More specifically, the angle of housing turn between the first and second parking positions depends upon an angle defined by the two concavities with respect to the center axis of revolution of the housing. According to the present invention, one of the concavities is formed in the housing in each base-housing set. If the maximum angle of the housing turn varies, the position of the concavity in the housing has to be changed and housings are produced for every maximum angle of housing turn. However, no special positioning units are required for such housings as mentioned above. The number of positioning unit types can thus be reduced considerably. Concerning the manual positioning unit, the number of types thereof can be minimized to one.

Now the assembled status of the motor-driven positioning unit 50 will be described in detail below with reference to FIGS. 2 to 11.

The base 10 consists of the base body 11 and base cover 12 as previously mentioned, both made of a synthetic resin. The portion 13 of the base body 11 is inserted into the opening 16 in the base cover 12 and the base body 11 is coupled to the base cover 12 with screws 19 to build up the base 10. As previously mentioned, the housing 20 is molded in a generally box-like shape open at the front thereof and the material thereof is also a synthetic resin. The housing 20 has the opening 22 formed in the circumference 21 thereof which serves as the bottom thereof and which is to face the portion 13 of the base body 11. Also the housing 20 has formed on the opposite longitudinal edges of the opening 22 two seats 23 and 24 to which the positioning unit 50 is to be fixed. The seat 23 is located at one longitudinal edge of the opening 22 and on the area of the circumference 21 that serves as the bottom of the housing 20, while the seat 24 is located at the other longitudinal edge of the opening 22 and on the area of the circumference 21 being the lateral side wall of the housing 20. The top of the seat 23 is flat and the bottom of the seat 24 is flat. In addition, the housing 20 has the studs (not shown) projected from the rear wall 25 and on which the tilting mechanism 40 is to be fixed.

The mirror unit consists of the mirror and mirror holder (not shown). The mirror unit is installed by means of the ball joint to the tilting mechanism. The tilting mechanism is installed to the housing by fixing, with screws, to the studs inside the housing 20.

The positioning unit 50 consists of a mechanism that turns the housing 20 and a support for the mechanism. The support is made of a synthetic resin and consists of the stationary member 51 and rotary member 52. The stationary member 51 is formed generally like a plate. The rotary member 52 consists of members 53 and 54. The member 53 is formed generally like a hollow box open at the top and has provided therein a bearing 58 and bridge seat 59 formed integrally therewith. A bridge 60 is placed and fixed on the bridge seat 59. The member 53 has formed integrally therewith a projection at one end face thereof and a step under the other end face. The projection is formed as one of the fixture 55 while the step formed as another fixture 56. The top of the projection and bottom of the step are formed flat. The member 54 is formed in the shape of a hollow box open at the bottom thereof. The member 54 is to be fitted onto the top of the member 53 to form together with the member 53 a closed container. The member 54 is coupled to the member 53 by fitting projections formed on the lateral sides of the rotary member 52 into holes formed in the inner walls of the member 54.

The turning mechanism has a hollow shaft 64 formed integrally with the stationary member 51. The shaft 64 has longitudinally extending flat faces formed on parts of the circumference thereof. The rotary member 52 is installed to the stationary member 51 with the bearing 58 fitted on the shaft 64. The shaft 64 has a gear 65 fitted on a part thereof beyond the rotary member 52 in such a manner that the gear 65 can rotate and slide on the shaft 64. In addition, there is provided between the gear 65 and stationary member 51 a member 66 that forms a clutch together with the gear 65. The member 66 is formed generally like a ring that has a pawl on the end face thereof directed toward the gear 65. The member 66 is inserted in the hollow shaft 64 and blocked against rotation by the flat face formed on the part of the circumference of the shaft 64. There is formed in the end face of the gear 65 facing the member 66 a recess in which the pawl on the member 66 is engaged. The gear 65 is so mounted on the shaft 64 that the pawl on the member 66 is engaged in the recess therein. A seat plate 67 is disposed between the member 66 and stationary member 51. It is fitted on the shaft 64 while being in contact with a portion of the rotary member 52 that is higher than the stationary member 51. Also a coil spring 68 is disposed between the gear 65 and a spring seat 69 fixed to the free end of the shaft 64 and inserted in the shaft 64 to maintain the engagement of the pawl on the member 66 in the recess in the gear 65 and force the gear 65, member 66 and seat plate 67 toward the rotary member 52.

Figure 5:
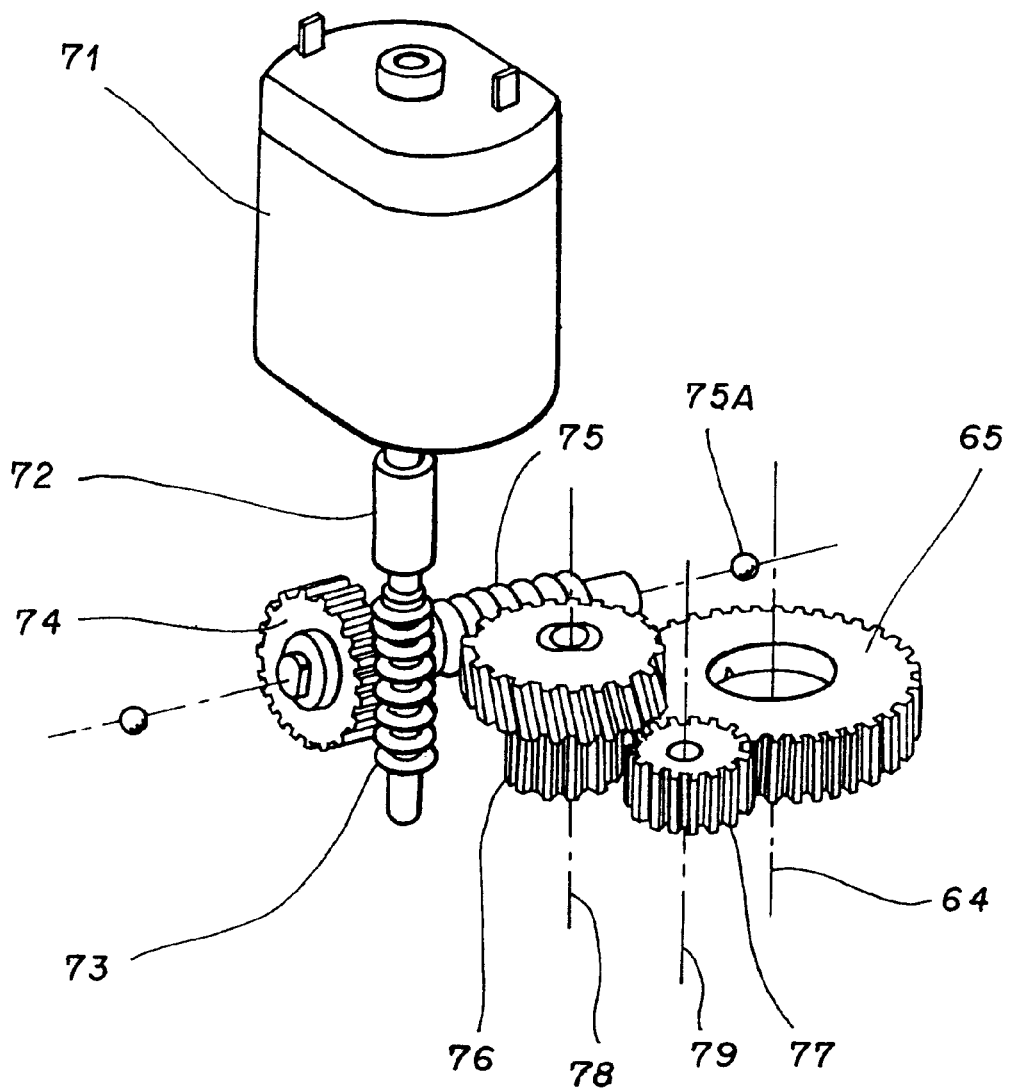
FIG. 5 is an explanatory perspective view showing the turning mechanism of the rearview mirror in FIG. 2.

A motor 71 is fixed on the bridge 60 with the drive shaft thereof passed through a hole in the bridge 60. The drive shaft has a worm 73 fixed by means of a coupling 72 to a portion thereof protruded from the bridge 60 as shown in FIG. 5. The worm 73 is disposed below the bridge 60 and held by the bearing in the member 53. It is in mesh with a worm wheel 74 disposed below the bridge 60. The worm wheel 74 is fitted and fixed on the shaft of a worm 75. The shaft of the worm 75 is held by the bearing in the member 53. There is provided between the end of the shaft of the worm 75 and the member 53 a ball 75A that bears the thrust load of the worm 75. Furthermore, a shaft 78 is disposed across the bridge 60 and bottom wall of the member 53 and has the opposite ends thereof held by bearings provided in the bridge 60 and bottom wall of the member 53, respectively. A gear assembly 76 is provided having a worm wheel and spur gear formed integrally and concentrically with each other. The worm wheel is in mesh with the worm 75. It is fitted and fixed on the shaft 78. A shaft 79 is disposed near the gear assembly 76 and held by the bearings in the bridge 60 and on the member 53, respectively. A gear 77 is fitted and fixed on the shaft 79. The gear 77 is in mesh with the spur gear of the gear assembly 76 and the gear 65 on the shaft 64.

Figure 4:
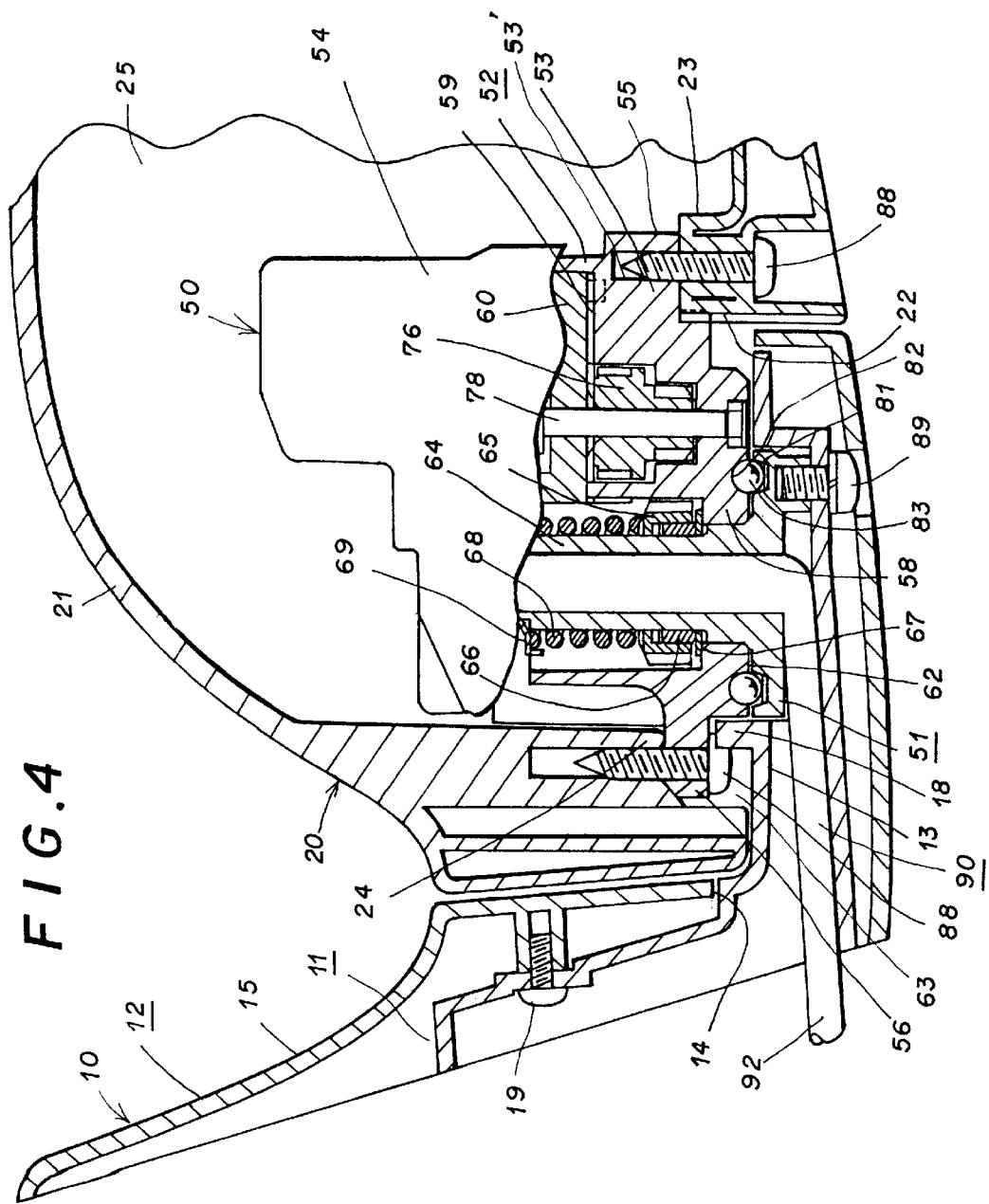
FIG. 4 is a sectional view of the rearview mirror, taken along the line B—B in FIG. 3, including the base.
Figure 6:
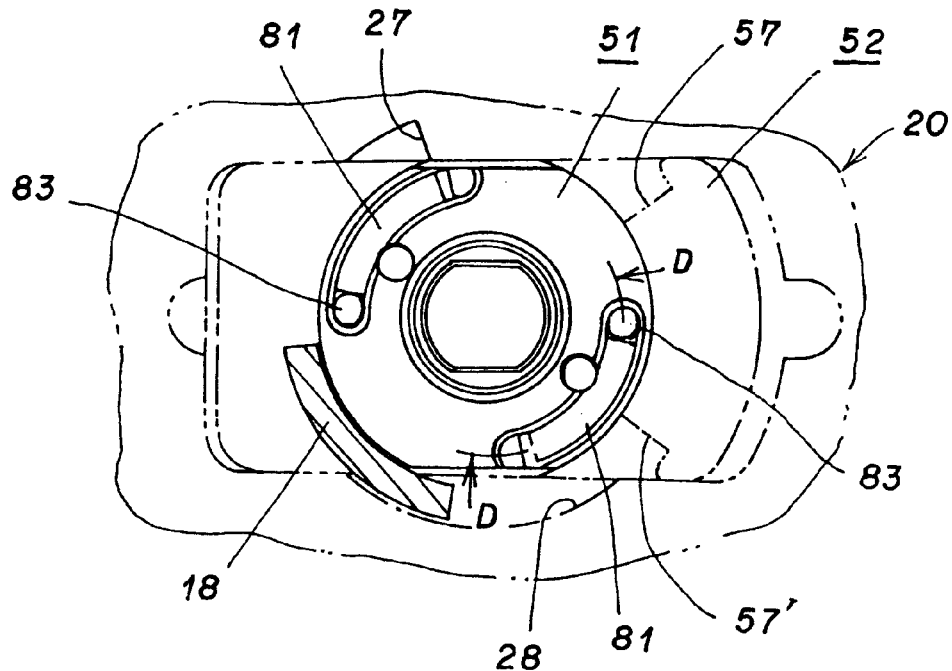
FIG. 6 is a sectional view taken along the line C—C in FIG. 2.
Figure 7:
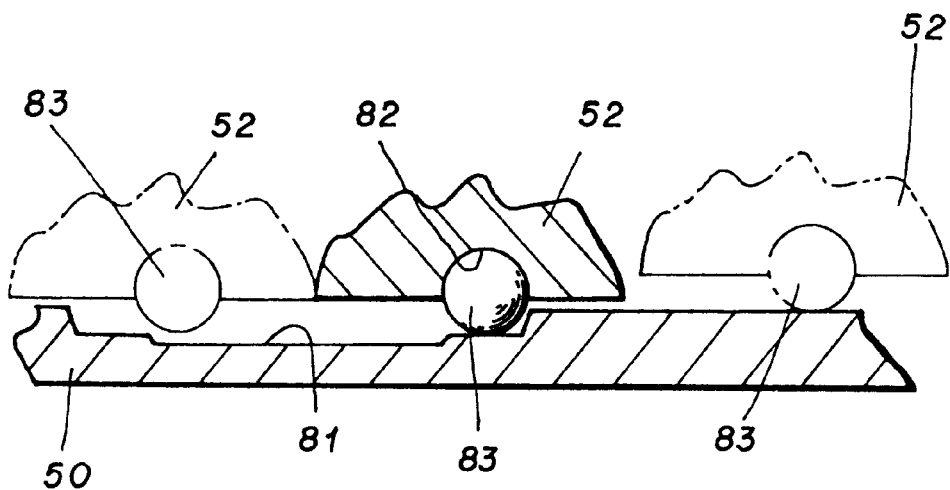
FIG. 7 is a sectional view taken along the line D—D in FIG. 6 but developed as a plan view.

As shown in FIGS. 4 and 6, the sector recesses 81 for setting the housing 20 in the viewing position are formed in a surface of the stationary member 51 opposite to the rotary member 52 concentrically with the shaft 64. The balls 83 are held in the concavities 82 formed in the rotary member 52. The rotary member 52 has the bearing 58 thereof fitted on the shaft 64 with the balls 83 placed in the sector recesses 81.

As previously described, the cable 90 is passed through the inner space of the base body 11 and a hole in the shaft 64. Some wires in the cable 90 are connected to the drive circuit of the motor 71 while the other wires are led out through a hole in the member 54.

To install the positioning unit 50 in the housing 20, the other wires of the cable 90 having been passed through the hole in the member 54 are connected to the motors in the tilting mechanism 40, the stationary member 51 is placed inside the opening 22 of the housing 20, the positioning unit 50 is put inside the housing 20 with the fixture 55 of the member 54 put into contact with the seat 23 at one edge of the opening 22 while the fixture 56 is put into contact with the seat 24 at the other edge of the opening 22, the screws 88 are driven from the bottom of the housing 20 into the fixture 55 and the seat 24, the stationary member 51 is fitted into the concavity 14 in the portion 13 of the base body 11 of the base 10, and then the portion 13 of the base body 11 is coupled to the stationary unit 51 with the screws 89. The positioning unit 51 is connected to the controller provided near the driver's seat inside the car by connecting the end 92 of the cable 90 to the controller through the connector.

Figure 3:
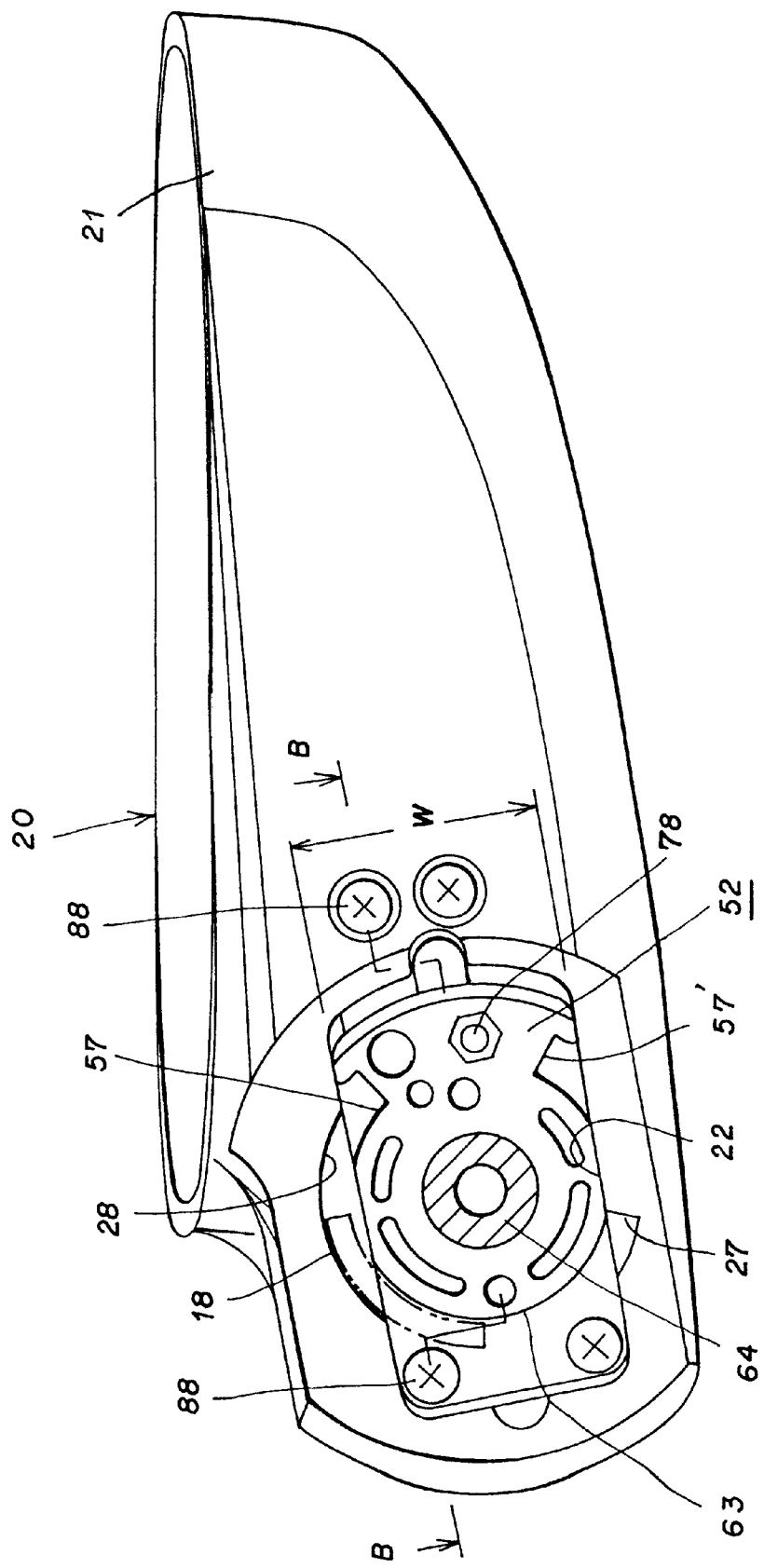
FIG. 3 is a bottom view taken along the line A—A in FIG. 2.
Figure 8:
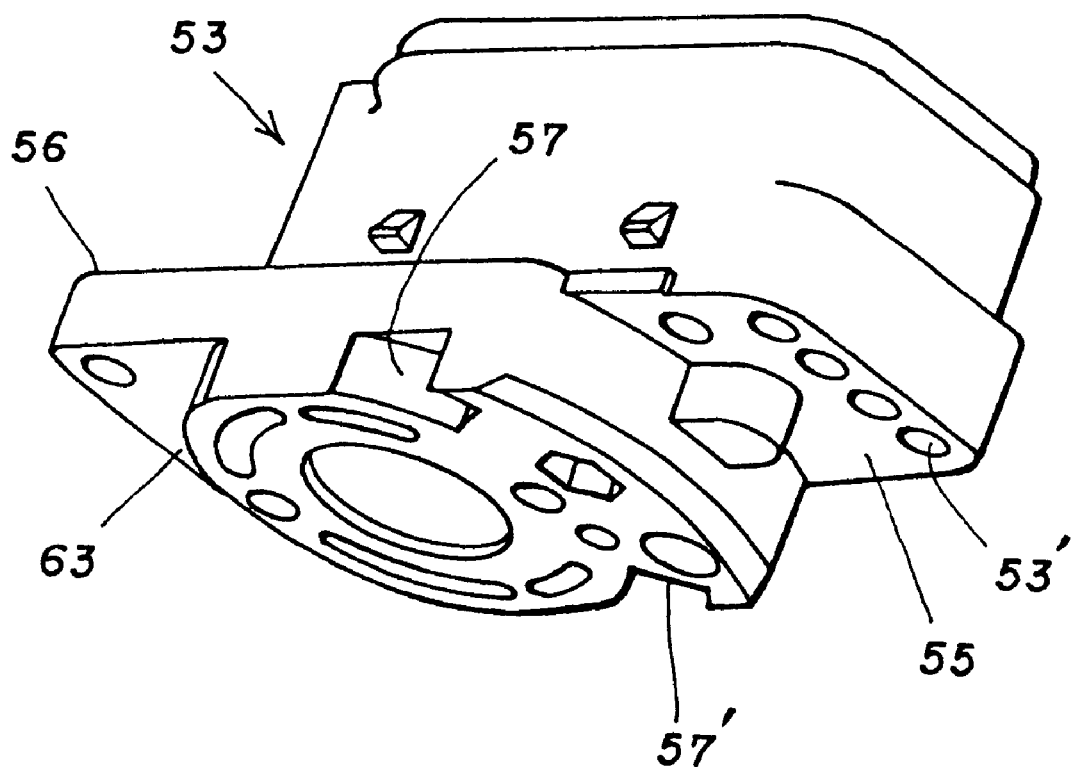
FIG. 8 is a perspective view of a member forming a part of the rotary member in the rearview mirror in FIG. 2.

This embodiment of the rearview mirror is so adapted that the positioning unit 50 can be installed in the housing without any relative displacement between them. This will be described in detail herebelow. As seen in FIG. 3, the opening 22 in the housing 20 is so formed that the width W thereof between the longitudinal walls is larger as it goes inwardly from the outermost edge of the opening 22. As shown in FIG. 4, the seat 23 is located at one edge of and outside the opening 22 in the bottom wall of the housing 22 and projected from the inner surface of an area of the circumference 21 of the housing 20 that serves as the bottom of the housing 20 and the seat 24 is located at the upper portion of the opposite edge of the opening 22 and projected toward the opening 22. Namely, the seat 24 is formed on the inner wall of an area of the circumference 21 of the housing 20 that serves as the lateral side of the housing 20. The top of the projection forming the seat 23 is flat and the bottom of the projection forming together the seat 24 is also flat. The fixture 56 and the area of the rotary member 52 that is contiguous to this projection are analogous in shape to the opening 22 when viewed from below. To install the positioning member 50 into the housing 20, the stationary member 50 is placed inside the opening 22 of the housing 20 and the positioning unit 50 is slid outwardly of the housing 20 with the top of the fixture 56 of the rotary member 52 put in contact with the bottom of the seat 24 at one edge of the opening 22 while the bottom of the fixture 55 is put in contact with the top of the seat 23 at the opposite edge of the opening 22. Even if the positioning unit 50 has the motor, gear train, etc. thereof installed as concentrated at one side of the opening 22, the fixtures 55 and 56 are pressed to the seats 23 and 24, respectively, due to the moment generated by the positioning unit 50. Further, the width W between the longitudinal walls of the opening 22 is larger as it goes inwardly of the outermost edge of the opening 22, and the area of the member 53 that is fitted in between the opening walls is formed analogous in shape to the opening 22 of the housing 20. Namely, the positioning unit 50 is taper-fitted into the opening 22 of the housing 20. Thus, the positioning unit 50 can be installed in the housing 20 without any relative displacement between them. The seat 23 of the housing 20 has through-holes formed therein and the seat 24 has screw holes formed therein. The fixture (step portion) 55 of the rotary member 52 has internally threaded holes 53' formed therein and the fixture (projection) 56 has through-holes formed therein. The screws 88 are driven into the internally threaded holes through the through-holes, respectively, to fix the rotary member 52 to the housing 20. The internally threaded holes 53' are regularly spaced on the fixture 55. As shown in FIG. 8, the internally threaded holes 53' are four in number, for example. Even if the through-holes in the seat 23 of the housing 20 have to be changed in location because the shape of the housing 20 is changed correspondingly to a style of a car, installation of the same positioning unit 50 in the housing 20 can be made possible by forming the through-holes at a same pitch as the through-holes or at a pitch resulting from multiplication of it by an integral number.

The housing 20 is turned to the viewing position or first parking position by putting the motor 71 into run to rotate the worm 73, worm wheel 74, worm 75 and gear assembly 76 and to rotate the gear 77 on its own axis and about the gear 65, thereby turning the housing 20 about the shaft 64 or by putting the motor 71 into reverse run to rotate the gear 77 reveresly on its own axis and about the gear 65. When the housing 20 is turned to the viewing position, the balls 83 held by the rotary member 52 move and abut the respective ends of the sector recesses 81 in the stationary member 51 as shown with solid line in FIG. 7 to limit any further turning of the housing 20. Thus, the motor 71 stops running and the housing 2Q is set there. Further, when the housing 20 is turned by hand in a direction from the first parking position to the viewing position, for example, while the motor 71 is stopping, the gear train consisting of the gears 72 to 77 are blocked against rotation due to the presence of the worm 73 and worm wheel 74 so that the member 66 forming the clutch together with the gear 65 cannot be rotated. So the gear 65 is rotated about the shaft 64 along with the rotary member 52 and slid in relation to the member 66. The pawl on the member 66 is disengaged from the recess in the gear 65, so that the rotary member 52 is rotated about the shaft 64 together with the housing 22 and mirror unit 30. When a person or any thing touches or hits the housing 20 in the parking position, the gear 65 is rotated about the shaft 64 along with the rotary member 52 because the gears 72 to 77 in the gear train and the member 66 are locked with each other, thus the pawl of the member 66 is disengaged from the recess in the gear 65. The gear 65 is rotated along with the rotary member 52, the balls 83 ride over the ends of the recesses 81 onto the surface of the stationary member 51 as shown with two dot chain line in FIG. 7 so that the rotary member 52 is turned about the shaft 64 along with the housing 20 to the second parking position. When a person or any thing hits the housing 20 at the opposite side thereof, the balls 83 will not abut the rend of the recesses 81 as indicated with one dot chain line in FIG. 7 with the result that the housing 20 is turned to the first parking position.

Figure 9:
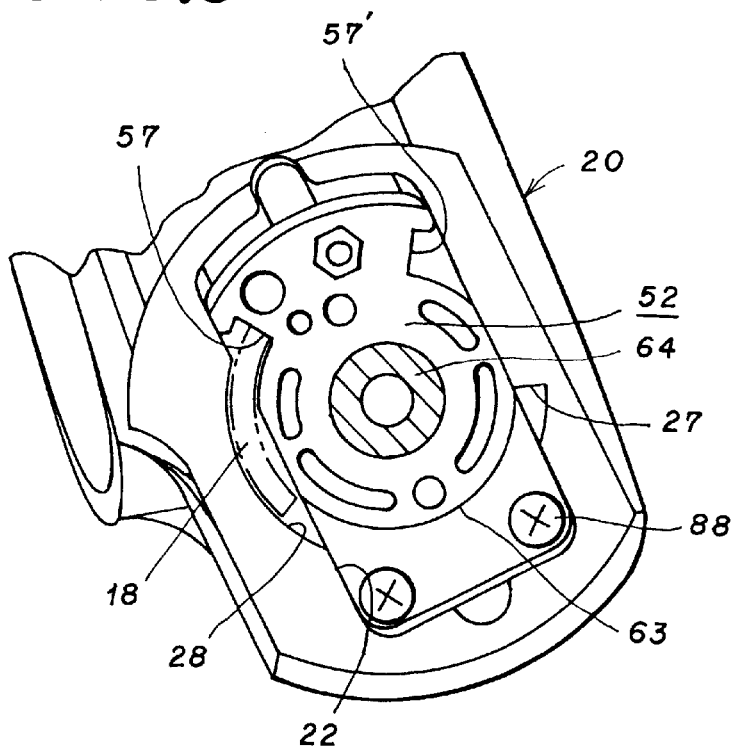
FIG. 9 is a bottom view taken along the line A—A in FIG. 2 when the housing of the rearview mirror is turned to one of the parking positions.
Figure 10:
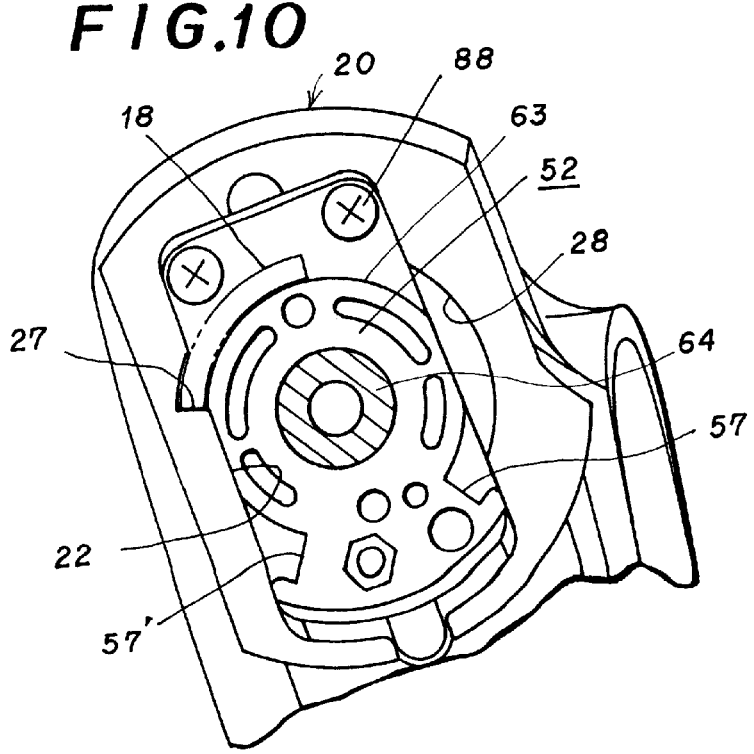
FIG. 10 is a bottom view taken along the line A—A in FIG. 2 when the housing of the rearview mirror is turned to the other parking positions.

In the first or second parking position, the housing 20 is blocked against any further turn with the projection 18 of the base 10 engaged into the concavity 57 in the rotary member 52 or concavity 27 in the housing 20 as having previously been described. As seen from FIGS. 3 and 6, the projection 18 is formed integrally with the portion 13 of the base body 11 in a position on an imaginary circle concentric with the center axis of revolution of the housing 20. As shown in FIG. 4, the rotary member 52 has a bottom face 62 that lies in a plane nearly same as the bottom of the housing 20 when the positioning unit 50 is installed in the housing 20 and the fixtures 55 and 56 thereof are in contact with the seats 23 and 24, respectively, of the housing 20. The member 53 and housing 20 have formed in the bottoms thereof, respectively, concavities 57 and 27 in which the free end of the projection 18 is to be engaged. As shown in FIG. 3, the concavity 57 is formed in the lateral side of the member 53 while the concavity 27 is formed in the edge of the opening 22 of the housing 20. That is, the concavities 57 and 27 are formed in a same circle on which the projection 18 also lies when the positioning unit 50 is installed in the housing 20. FIG. 8 shows the bottom face of the member 53. As seen, the member 53 has also a cut-out 63 formed in the bottom thereof. The housing 20 has also a concavity 28 formed along the lateral edge of the opening 22. The concavity 28 and cut-out 63 connect the concavities 57 and 27 to each other to define a circular recess along which the projection 18 is moved between the concavities 57 and 27. Thus, when the rotary member 52 is turned along with the housing 20 to the first parking position, one end of the projection 18 is inserted into the concavity 57. When the rotary member 52 is turned along with the housing 20 to the second parking position, the other end of the projection 18 is inserted into the concavity 27. To install the base 10 to the stationary member 51, the end of the projection 18 is placed in the circular recess defined by the concavities 27 and 57, cut-out 63 and concavity 28, and the portion 13 of the base body 11 is fixed to the stationary member 51 by driving the screws 89 from outside into the stationary member 51 through the portion 13 of the base 10. When the housing 20 is turned to the first parking position, the projection 18 is inserted into the concavity 57 in the rotary member 52 as shown in FIG. 9 to block the rotary member 52 and thus the housing 20 against further turning. When the housing 20 is turned to the second parking position, the projection 18 is inserted into the concavity 27 in the housing 20 as shown in FIG. 10 to block the rotary member 52 and housing 20 against further turning. For accommodation of a different angle of turning between the first and second parking positions, the circumferential width of the projection 18 or the depth of the concavity 57 may be changed.

In addition, the rotary member 52 has another concavity 57' formed therein symmetrically to the concavity 57 with respect to the longitudinal central axis through the rotary member 52. This concavity 57' is to be used for holding the housing in the first parking position when the positioning unit 50 is used in a set of the base and housing of a left-hand rearview mirror. Because of this concavity 57', the positioning unit 50 can be installed in the housing 20 even if the housing 20 is so designed that the distance (D1) between the center axis of turning of the housing 20 and the front of the housing 20 is shorter than that (D2) between the center axis of turning of the housing 20 and the back of the housing 20 (D1<D2) in order to balance the housing 20 in style with the car body, for example. More particularly, in case the distance between the center axis of turning of the housing 20 and the front of the housing 20 is longer (D1>D2) as in FIGS. 2 to 10, the concavity 28 can be formed in the front half of the housing 20. Contrarily, if the distance is shorter (D1<D2), the concavity 28 cannot be formed in the front half of the housing 20. Because of the concavity 57' formed symmetrically to the concavity 57 in the rotary member 52 of this rearview mirror, the positioning unit 50 can be installed in a thin housing if concavities corresponding to the concavities 27 and 28 are formed symmetrically to the latter in the rear half of the housing where the distance between the center axis of turning and back of the housing is longer (D1<D2) so that the projection 18 is inserted into the concavity corresponding to the concavity 57' when the housing is turned to the first parking position.

Figure 11:
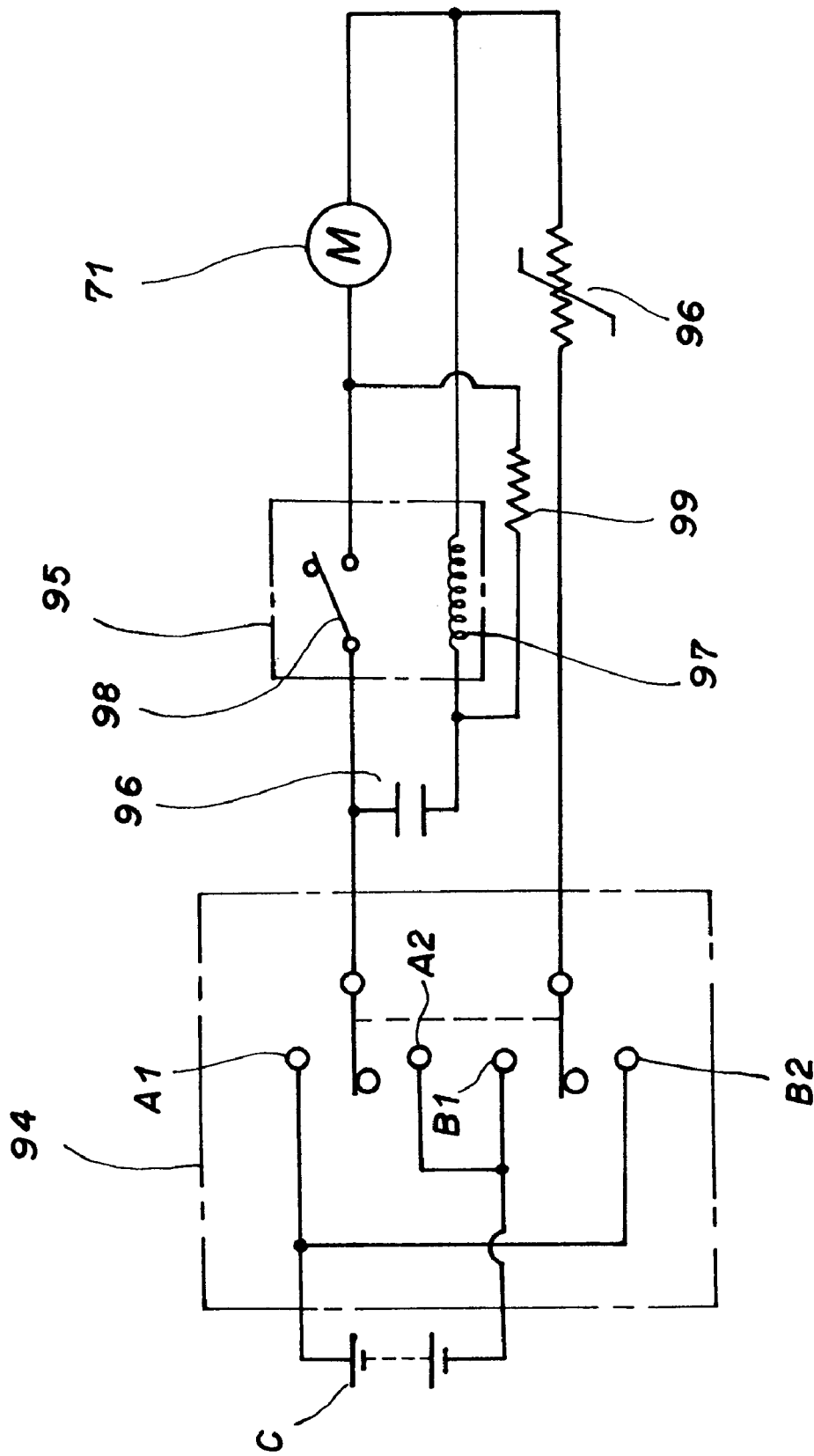
FIG. 11 is a wiling diagram of the control circuit for the motor which turns the housing.
Figure 12:
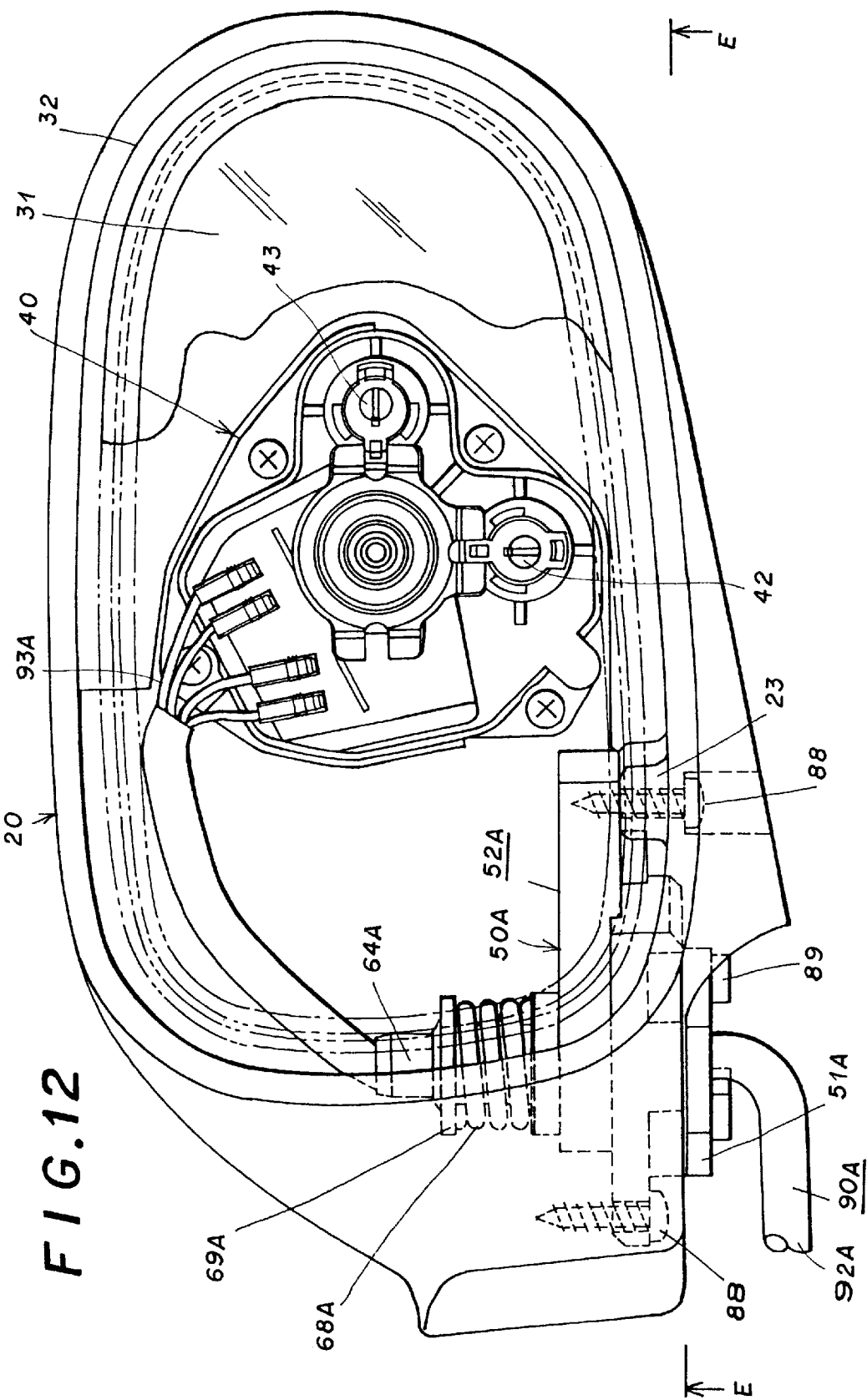
FIG. 12 is a front view of another rearview mirror, which is obtained by assembling the system in FIG. 1 but does not include the base.
Figure 13:
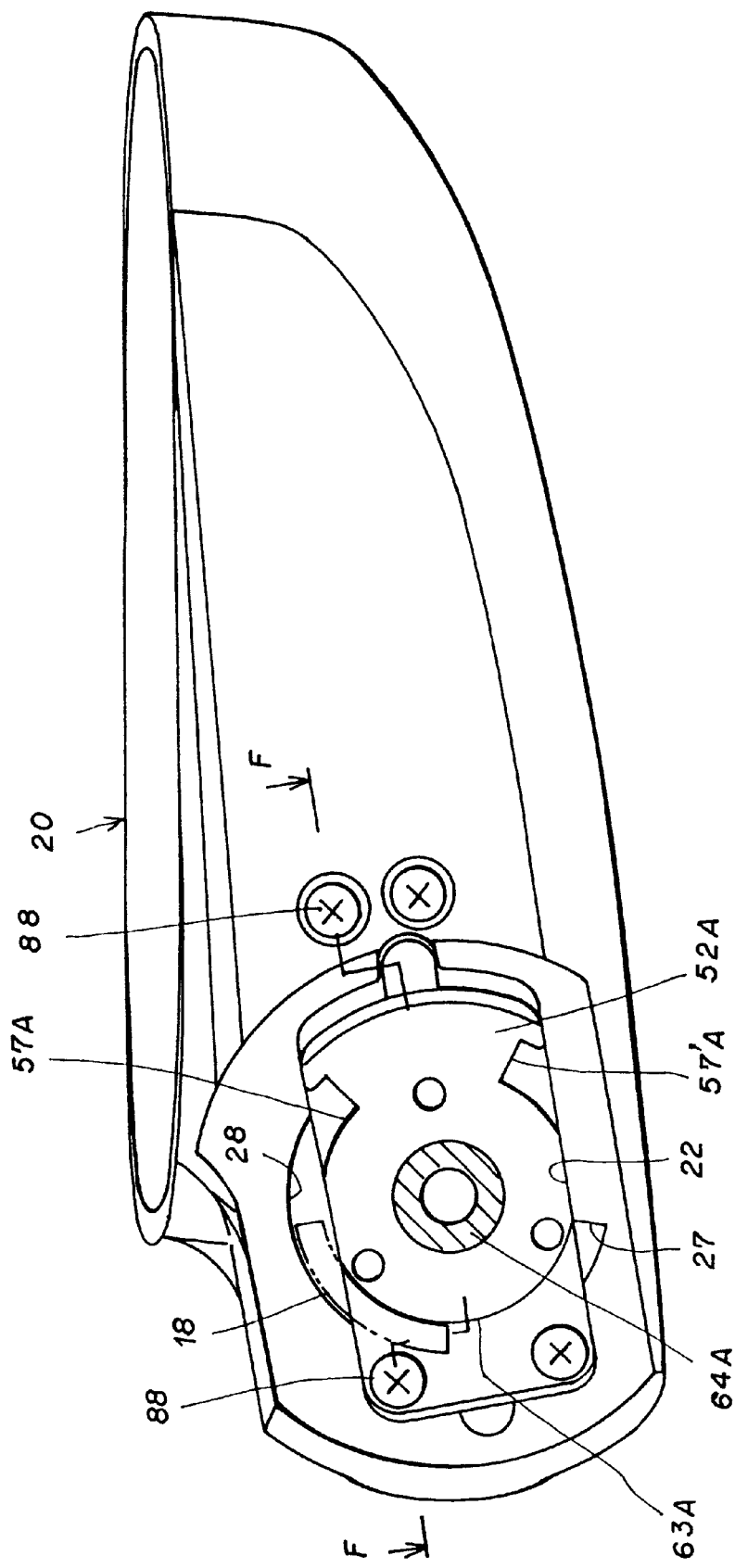
FIG. 13 is a bottom view taken along the line E—E in FIG. 12.
Figure 14:
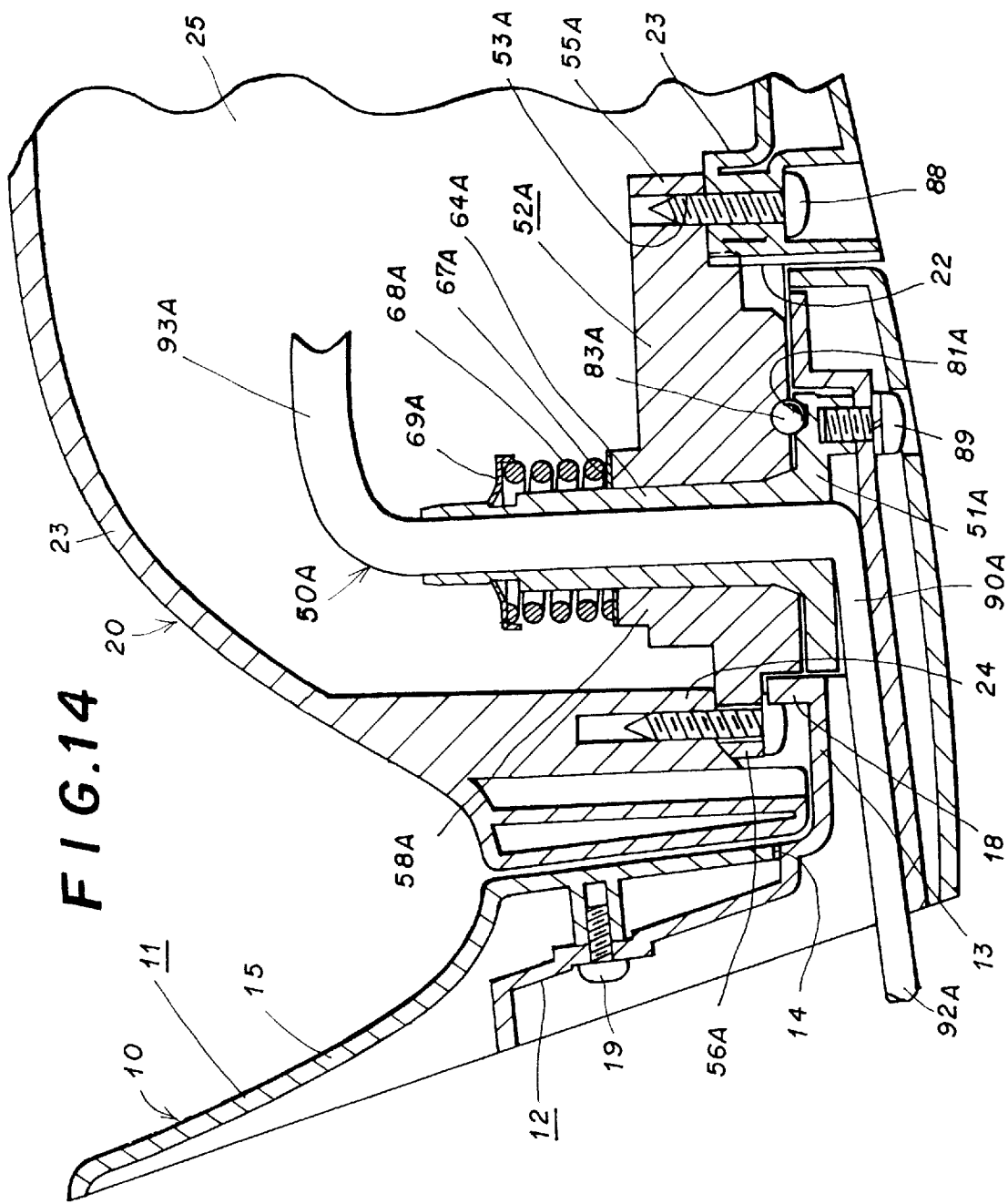
FIG. 14 is a sectional view taken along the line F—F in FIG. 13.

The housing 20 is turned as driven by the motor to the viewing or first parking position and the motor is stopped from running with the housing 20 in the position, both under control of a circuit included in the controller. This circuit is well known from the disclosure in the Japanese Unexamined Utility Model Publication Hei-4-76196, for example. As shown in FIG. 11, the circuit comprises a battery C, rotary switch 94, relay 95, positive temperature coefficient thermistor 96, etc. The housing 20 can be turned through operation of a switch 94 by the driver. When the switch 94 is shifted to contacts A1 and B1, a current flows through a capacitor 96 to a relay coil 97 of the relay 95 of which a contact 98 will in turn be closed so that the motor 71 will be put into run. When the housing 20 is turned as driven by the motor 71 to the viewing position, the balls 83 in the rotary member 52 are moved and abut the ends of the sector recesses 81, the load to the motor 71 is increased and an increased current flows through the positive temperature coefficient thermistor 96. The temperature in the thermistor 96 rises and the internal resistance of the thermistor 96 also rises rapidly so that the current through the relay coil 97 is decreased and the contact 98 of the relay 95 is opened. Thus, the motor 71 is stopped from running. When the switch 94 is shifted to contacts B1 and A2, the current will flow reversely. The contact 98 of the relay 85 is closed, the motor 71 runs reversely, the housing 20 is thus turned from the viewing position to the first parking position. When the projection 18 of the base 10 is engaged into the concavity 57 of the rotary member 52, the load to the motor 71 increases and an increased current flows through the positive temperature coefficient thermistor 96 so that the internal temperature of the thermistor 96 rises, the internal resistance of the thermistor 96 also rises rapidly and the contact of the relay 96 is opened. Thus the motor 71 is stopped from running. Reference numeral 99 denotes self-holding relay resistance for holding an exciting state of the relay coil 97.

FIGS. 12 to 16 show in detail the installed status of the manual positioning unit 50A for the housing 20.

The positioning unit 50A has a base 10 that is the same as the one used in the rearview mirror having been described with reference to FIGS. 2 to 11. The base 10 consists of a base body 11 and base cover 12. The base body 11 is to be fixed to the right-hand door of a car. A mirror unit composed of a mirror 31 and mirror holder 32 is installed in the housing 20. The mirror unit is supported by a tilting mechanism 40 in the housing 20. It is tilted in a desired direction by the tilting mechanism 40.

The positioning unit 50A consists of a mechanism which permits to turn the housing 20 and a support for the mechanism. The support consists of the stationary member 51A and rotary member 52A. The stationary member 51A is formed like a plate. The rotary member 52A consist of a single member formed generally like a plate and has a bearing 58A formed integrally thereof at the center. It has formed at the opposite ends thereof fixtures 55A and 56A, respectively, at which the positioning unit 50A is to be coupled to the housing 20. These fixtures 55A and 56A are the same in size and shape as those 55 and 56 of the motor-driven positioning unit 50.

The turning mechanism has a hollow shaft 64A formed integrally with the stationary member 51A. The stationary member 51A is fixed to the rotary member 52A with the shaft 64A fitted in the bearing 58A. A coil spring 68A is fitted on a portion of the rotary member 52A that protrudes from the shaft 64A. It is compressed by a spring holder 69A provided at the end of the shaft 64A to press the rotary member 52A toward the stationary member 51A by means of a seat plate 67A. Further, sector recesses 81A are formed in the stationary member 51A concentrically with the shaft 64A. The rotary member 52A is fitted on the shaft 64A with balls 83A or half balls thereof placed in the sector recesses 81A. A cable 90A is passed through the inner space of the base body 11 and a hole in the shaft 64A.

To install the positioning unit 50A in the housing 20, the end 93A of the cable 90 is connected to the motor drive circuit in the tilting mechanism 40, then the stationary member 51A is placed inside the opening 22 of the housing 22, the positioning member 50A is put inside the housing 20, the fixture 55A is put into contact with the seat 23 at one edge of the opening 22 while the fixture 56A is put into contact with the seat 24, the positioning unit 50A is slid horizontally into place and then the rotary member 52A is fixed to the housing 20 with screws 88 or like. The stationary member 51A is fitted into the concavity 14 in the portion 13 of the base body 11 of the base 10, and then the portion 13 of the base body 11 is coupled to the stationary unit 51A with the screws 89. The positioning unit 50A is connected to the controller in the car by connecting the end 92A of the cable 90A to the controller by means of a connector. The controller is intended to control only the operation of the motor in the tilting mechanism 40.

Also in this embodiment of the rearview mirror, the direction in which the fixture 55A is fixed to the seat 23 is opposite to the direction in which the fixture 56A is fixed to the seat 24, whereby the positioning unit 50A when fixed to the housing 20 cannot be rotated. The opening 22 in the housing 20 is so formed that the width thereof between the longitudinal walls is larger as it goes inwardly from the outermost edge of the opening 22. The areas of the rotary member 52 that are in contact with the opening wall are analogous in shape to the walls of opening 22. Thus, the positioning unit 50A is taper-fitted into the opening 22 and can be installed in the housing 20 without any backlash between them. The fixture 55A has formed therein a plurality of screw holes to fix the positioning unit 50A to the housing 20. Even if the through-holes in the seat 23 of the housing 20 have to be changed in location because the shape of the housing 20 is changed correspondingly to a style of a car, the same positioning unit 50A can be installed in the housing 20.

The housing 20 is turned as pressed by hand. The housing 20 is turned about the shaft 64A toward the viewing position or first parking position. As the housing 20 is turned to the viewing position, the balls 83A move and abut the ends of the sector recesses 81A to limit the housing 20 from further turning, thereby holding the housing 20 there. When a person or any thing touches or hits the housing 20 in the viewing position, it is turned to the first or second parking position. As the housing 20 is turned toward the second parking position, the balls 83A ride over the ends of the sector recesses 81A and onto the surface of the stationary member 51A. The balls 83A roll on the surface of the stationary member 51A.

Figure 15:
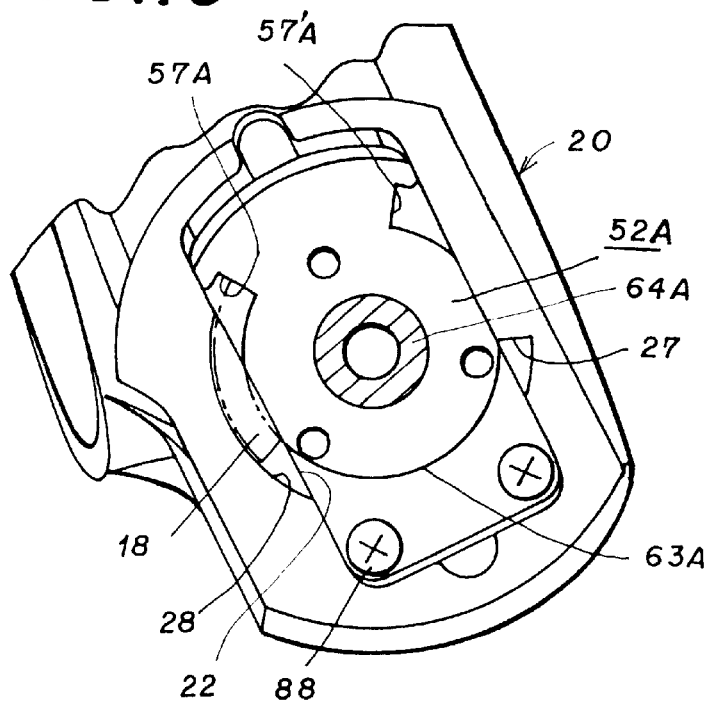
FIG. 15 is a bottom view taken along the line E—E in FIG. 12 when the housing of the rearview mirror is turned to one of the parking positions.
Figure 16:
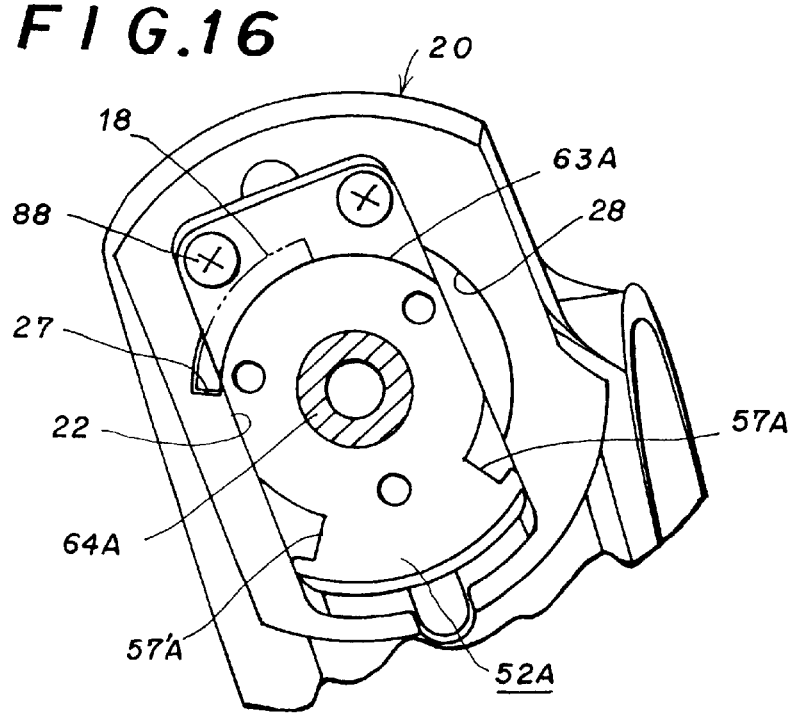
FIG. 16 is a bottom view taken along the line E—E in FIG. 12, showing the status of the member in FIG. 12 when the housing of the rearview mirror is turned to the other parking positions.

Also in this rearview mirror, the housing in each of the parking positions is blocked against further turning when the projection 18 on the base 10 is engaged into the concavity 57A in the rotary member 52A or the concavity 27 in the housing 20. As in the rearview mirror having previously been described with reference to FIGS. 2 to 11, the concavity 57A in the rotary member 52A form together with the cut-out 63A, the concavities 27 and 28 in the housing 20 a circular recess along which the projection 18 is moved and engaged into the concavity 57A when the housing 20 is turned to the first parking position and into the concavity 27 in the housing 20 when the housing 20 is turned to the second parking position. When the housing 20 is turned as pressed or hit by a person or any thing to the first parking position, the projection 18 is engaged into the concavity 57A in the rotary member 52A as shown in FIG. 15 to block the rotary member 52A against further turning. When the housing 20 is turned to the second parking position, the projection 18 is engaged into the concavity 27 in the housing 20 to block the rotary member 52A against further turning. Also in this rearview mirror, a second concavity 57' A is formed in the rotary member 52A symmetrically with the concavity 57' with respect to the longitudinal center axis of the rotary member 52A. So, the same positioning unit 50A can be installed in any housing 20 irrespectively of the thickness in the front or rear half of the housing 20 or whether the rearview mirror is to be installed on the right- or left-hand door of a car. Reference numeral 53A in FIG. 14 denotes a tapped hole into which the screw 88 is screwed.

Figure 17:
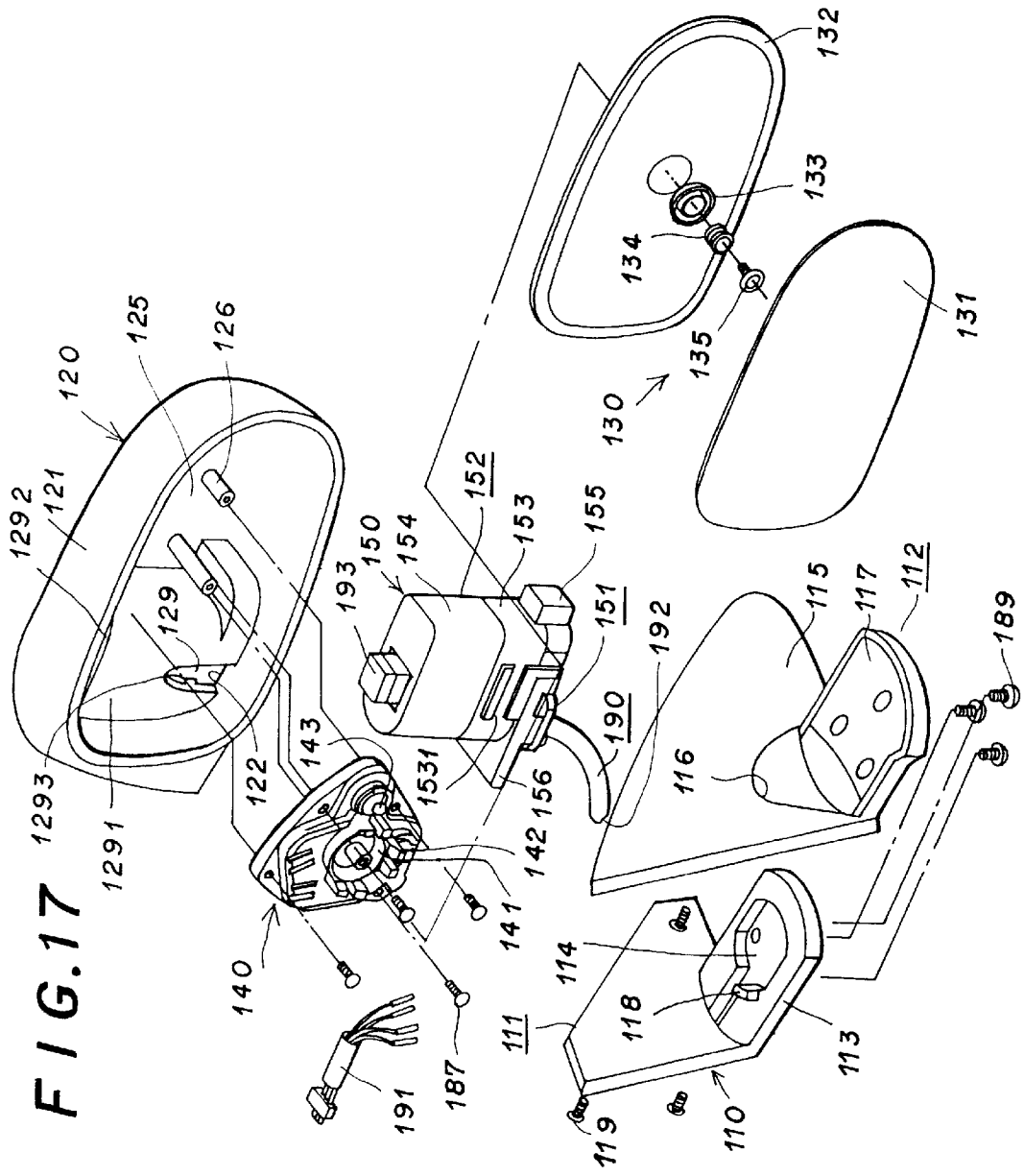
FIG. 17 is an exploded perspective view of a second embodiment of the rearview mirror system according to the present invention, showing a certain composition thereof.

FIG. 17 shows the second embodiment of the rearview mirror system according to the present invention, which is to be installed on the right-hand door of a car.

In FIG. 17, the reference numeral 110 indicates a base consisting of a base body 111 and base cover 112. The base body 111 is adapted for fixation to the right-hand door of a car. The reference numeral 120 indicates a housing in which a mirror unit 130 consisting of a mirror and mirror holder is installed. The mirror unit 130 is supported to the housing 120 by means of a tilting mechanism 140 by which the mirror unit 130 can be tilted in a desired direction. The housing positioning units for this door mirror system includes a motor-driven type and a manual type. FIG. 17 shows only a motor-driven type positioning unit 150 that turns the housing 120 by a motor. This positioning unit 150 is also to be installed between the housing 120 and base 110 and turn the housing 120 to the viewing position, first and second parking positions.

As in the rearview mirror system having previously been described with reference to FIG. 1, the base 110 is shaped to have a generally bracket-like or L shape of which one arm is the base body 111 and the other is the base cover 112. The base body 111 has a portion 113 that is to be passed through an opening 116 in the base cover 112 and placed on a portion 117 of the base cover 112 to form the base 110.

The housing 120 has a general form of a shallow box open at the front thereof. As mentioned above, the housing 120 has formed therein a chamber 129 in which the positioning unit 150 is housed. The chamber 129 is defined by an area of a circumference 121 of the housing 120 that serves as the lateral side of the housing 120, a portion of a rear wall 125 of the housing 120, an L-shaped wall 1291 laid inside the housing 120, formed integrally with the housing 120 and consisting of a wall nearly parallel to the rear wall of the housing 120 and a wall generally parallel to the lateral side of the housing 120, and a wall 1292 laid inside the housing 120, formed integrally with the housing 120 and nearly parallel to the top of the housing 120. The chamber 129 is open to outside through an opening 122 formed in an area of the housing circumference 121 that serves as the bottom of the housing 120. Furthermore, the housing 120 has formed integrally of the rear wall 125 thereof and apart from the wall portion forming the chamber 129 studs 126 to which the tilting mechanism 140 is to be fixed. For example, four such studs 126 are provided each being an internally threaded cylinder.

The mirror unit 130 consists of the mirror 131 and mirror holder 132 to which the mirror 131 is fixed. The mirror holder 132 is installed to the tilting mechanism 140 by means of a ball joint composed of a spherical seat 141, coil spring 134, balls 133, set screw 135, etc. The tilting mechanism 140 is fixed to the studs 126 in the housing 120 with screws 187. The tilting mechanism 140 incorporates two rods 142 and 143, motors that drive the rods independently forward and backward, reduction gears, etc. One of the motors moves forward the rod 142 which in turn will push the lower portion of the back of the mirror holder 132 to turn the mirror holder 132 vertically about the ball joint while the other motor moves forward the rod 143 which in turn will push the lateral portion of the back of the mirror holder 132 to turn the mirror holder 132 horizontally about the ball joint, thereby tilting the mirror unit 130 in a desired direction.

The positioning unit 150 consists of a mechanism that turns the housing 120 to the viewing position, first and second parking positions, and a support carrying the turning mechanism. The support consists of a stationary member 151 that is to be fixed to the base 110 and a rotary member 152 that is to be fixed to the housing 120. The stationary member 151 has a general form of a plate. The rotary member 152 consists of a member 153 and a member 154 that is separable from the member 153. The member 153 has a general form of a hollow box open at the top thereof. The member 154 has a general form of a hollow box open at the bottom thereof. Namely, when the member 154 is put on the top of the member 153, they define together a container. Also the shape and size of them are such that they are closely fitted in the chamber 129 of the housing 120. The turning mechanism is built in the container and closed therein. As in the positioning unit 50 in the rearview mirror having previously been described with reference to FIGS. 1 or 2 to 11, the turning mechanism in this positioning unit 150 consists of a shaft in the stationary member 151, a gear installed on the shaft by means of a clutch, motor built in the rotary member 152, gear train that couples the motor and shaft to each other, etc. The motor runs to turn the housing 120 along with the rotary member 152 to the viewing position and first parking position. If the housing 120 is pressed by hand or when a person or any thing touches or hits the housing 120 while the motor is out of operation, the housing 120 and rotary member 152 are turned to the first or second parking position. Sector recesses are formed concentrically with the shaft in a surface of the stationary member 151 that faces the rotary member 152. Balls are provided as held on a surface of the member 153 that faces the stationary member 151 or half balls are provided as formed integrally with the member 153 on that surface, and they are received in the sector recesses, respectively. The shaft and rotary member 152 are supported on the stationary member 151 by means of these balls or half balls. When the balls or half balls abut the ends of the sector recesses, the housing 120 is located at the viewing position. A cable 190 is passed through the shaft into the rotary member 153. Some of the wires of the cable 190 are connected to the motor in the turning mechanism while the other are connected to a connector 193 on a member 154 forming the rotary member 152.

To install the positioning unit 150 in the housing 120, the cable 191 is connected at first to the connector 193 on the rotary member 152 and to the motor in the tilting mechanism 140, then the rotary member 152 of the positioning unit 150 is inserted into the chamber 129 through the opening 122 in the bottom of the housing 120 and fixed to the housing 120, and screws 189 are driven into the stationary member 151 through the portion 113 of the base body 111 and portion 15 of the base cover 112 to couple the stationary member 151 to the base 110. To fix the positioning unit 150 to the housing 120, an adhesive is applied to the inner wall of the chamber 129 or outer surface of the rotary member 152 and the rotary member 152 is inserted into the chamber 129. When the adhesive is cured, the positioning unit 150 is securely fixed to the housing 120. In this rearview mirror, however, the rotary member 152 is also fixed to the housing 120 due to a projection 1293 formed on the housing 120 and a concavity 1531 formed on the rotary member 152 forming the support for each positioning unit 150. When the positioning unit 150 is inserted into the chamber 129 of the housing 120, the projection 1293 is engaged into the concavity 1531 to thereby hold the positioning unit 150 in the chamber 129 and also keep the positioning unit 150 in place until the adhesive is cured. Further, to keep the stationary member 151 and the base body 111 of the base 110 in a correct relation to each other when the rotary member 152 is inserted into the chamber 129 of the housing 120, the positioning unit 150 has projections 155 and 156 formed at opposite ends of the rotary member 152 thereof and the housing 120 has formed at opposite edges of the opening 122 in the bottom of the chamber 129 thereof steps by which the projections 155 and 156 are to be caught. When the positioning unit 150 is introduced into the chamber 129 of the housing 120, the projections 155 and 156 abut the steps to prevent any vertical backlash between the rotary member 152 and chamber 129. The chamber 129 is so formed that the contour in horizontal section of the chamber 129 corresponds to that of the rotary member 152, whereby the rotary member 152 can be set in the chamber 129 without any horizontal backlash between them.

The housing and base (not shown) forming the rearview mirror which is to be installed on the left-hand door of a car are designed symmetrically with the housing 120 and base 110 of the rearview mirror having been described in the foregoing (which is to be installed on the right-hand door). Also in this rearview mirror, the positioning unit 150 or manual positioning unit is installed to the housing by inserting the rotary member of the positioning unit into the chamber of the housing and fixing it to the housing with an adhesive while bolting the stationary member to the base body.

To install these rearview mirrors to the car body, the base body 111 of the base 110 is to be fixed to the car body and the end 192 of the cable 190 is to be connected to a connector of a controller provided in the car.

The controller controls the motor of the positioning unit and that of the tilting mechanism through operation by the driver of the switches of the controller that are provided near the driver's seat in the car. The housing 120 is turned from the first parking position to the viewing position as follows. When the motor is put into run, a gear of a gear train that is in mesh with a gear on the shaft rotates on its own axis and about the gear on the shaft while being in mesh with the shaft gear. The rotary member 152 is turned along with the housing 120 about the shaft. For turning of the housing 120 to the first parking position, the motor runs reversely, the gear on the shaft rotates on its own axis and about the gear on the shaft, both reversely, and the rotary member 152 is turned along with the housing 120. If the housing 120 is strongly pressed while the motor is stopping, a clutch disconnects the gear on the shaft from the stationary member 151 and the rotary member 152 is turned about the shaft along with the gear on the shaft between the viewing and first parking positions. When a person or any thing touches or hits the housing 120 in the viewing position, the clutch disconnects the gear on the shaft from the rotary member 152 and the rotary member 152 is turned about the shaft along with the housing 120 to the first or second parking position.

As in the rearview mirror having previously been described with reference to FIGS. 1 and 2 to 11, the housing 120 is held in the viewing position by the balls between the stationary and rotary members 151 and 152 that abut the ends of the sector recesses in the stationary member 151. For blocking the housing 120 against turning in each of the parking positions, a projection 118 is formed on the base 110 and a circular recess, partially fragmentary, is formed in the bottoms of the rotary member 152 and housing 120 on an imaginary circle concentrical with the shaft. That is, the housing 120 in the first parking position is blocked against turning with the projection 118 engaged into a concavity formed in the rotary member 152 and which forms one end of the circular recess. In the second parking position, the housing 120 is blocked against turning with the projection 118 engaged into a concavity formed in the housing 120 and which forms the other end of the circular recess. On the contrary, the housing 120 in the first parking position is blocked against turning with the projection 118 engaged into the concavity formed in the housing 120 and which forms the other end of the circular recess. In the second parking position, the housing 120 is blocked against turning with the projections 118 engaged into the concavity formed in the rotary member 152 and which form the one end of the circular recess. The concavity (not shown) in the rotary member 152 is located in a position on the above-mentioned imaginary circle to which the projection 118 is moved when the housing 120 has been turned to the first parking position and in a lateral bottom portion of the rotary member 152, and the concavity in the housing 120 is located also in a position on the imaginary circle to which the projection 118 is moved when the housing 120 has been turned to the second parking position and in a position around the opening 122 in the housing 120. In the viewing and first parking positions, the motor is stopped from running as follows. Namely, when the housing 120 is blocked against turning in such a position, the load to the motor is increased and an increased current flows through the motor. This increase of the motor current is detected by a positive temperature coefficient thermistor in a circuit of the controller that is provided in the turning mechanism. The thermistor turns on a relay by which the power supply to the motor is shut off. Also in the rearview mirror intended for use on the left-hand door and which uses a same positioning unit 150, the housing 120 is held in place in the viewing position and blocked against turning in each of the two parking positions, both in the same manner as mentioned above.

No manual positioning unit for the housing is illustrated. It should be noted, however, it has a rotary member identical in size and shape to the motor-driven positioning unit 150 for the housing 120. As in the turning unit 150 in the rearview mirror having been described in the foregoing with reference to FIGS. 1 and 12 to 16, the turning mechanism consists of a shaft provided on the stationary member to support the rotary member, a coil spring fitted on the shaft to force the rotary member to the stationary member, a pair of sector recesses formed concentrically with the shaft in a surface of the stationary member that faces the rotary member, balls provided in the sector recesses, respectively, and held by the rotary member or half balls formed integrally with the rotary member, etc. To block the housing 120 in each of the parking positions, the projection 118 provided on the base 110 and the circular recess, partially fragmentary, formed in the rotary member and housing 120 on the imaginary circle concentrical with the shaft, are used in combination. For example, the housing 120 in the first parking position is blocked against turning with the projection 118 on the base body 110 engaged into a concavity formed in the rotary member and which forms one end of the circular recess. In the second parking position, the housing 120 is blocked against turning with the projection 118 engaged into a concavity formed in the housing 120 and which forms the other end of the circular recess. In a rearview mirror which is to be used on the left-hand door of a car, the concavities in the housing and rotary member are formed symmetrically with those in the housing and rotary member in the right-hand door rearview mirror and the housing is held in the viewing position and blocked against turning in each of the parking positions in the same manner as in the right-hand door rearview mirror.

The rearview mirror system according to the present invention includes a plurality of base-housing sets adapted for the styles of cars and which are to be installed to the right of a car and a plurality of base-housing sets adapted for the styles of cars and which are to be installed to the left of the car (not illustrated) in addition to the base-housing set which is to be installed to the right of the car and the base-housing set which is to be installed to the left of the car. Also in the former plural base-housing sets for the right and left car doors, the chambers formed in the housings in the base-housing sets are identical in size and shape to one another. Thus, the rotary member of each positioning unit in each of the motor-driven and manual positioning units are formed in such shape and size as to be closely fitted into the chamber in the housing.

Accordingly, either of the motor-driven and manual positioning units can be installed to any of the above-mentioned base-housing sets. All the base-housing sets for installation on the right-hand door, left-hand door and adapted or the styles of car bodies can use a same positioning unit. That is, the positioning unit may not be constructed uniquely for each of the base-housing sets. Therefore, the number of positioning unit types can be extremely reduced, and the positioning units can be manufactured with a reduced total cost. Further, since the positioning unit can be mass-produced, the manufacturing costs for the positioning units can be further reduced.

Furthermore, the manual or motor-driven positioning unit can be fixed to the housing by applying an adhesive to the support or inner wall of the chamber 129 beforehand and then inserting the support into the chamber 129. So the turning mechanism may not be injured, the positioning unit can easily be installed to the housing 120, and thus the installation can be automated easily. In the installation of the positioning unit to the housing 120, the projection 1293 is engaged into the concavity 1531 in the support. No much labor or any jig is required for securing the positioning unit until the adhesive is cured. Therefore, the installation of the positioning unit to the housing 120 can be done more easily and automated more easily.

Moreover, in each of the assembled rearview mirrors, the housing in one of the parking positions is blocked against turning by means of the projection and the concavity in the housing. So no special positioning unit may be used to accommodate any difference in the angular range of the housing between the first and second parking positions, which leads to a further reduction of the required number of positioning unit types. More specifically, the angle of housing turn between the first and second parking positions depends upon an angle defined by the two concavities with respect to the center axis of revolution of the housing. According to the present invention, one of the concavities is formed in the housing in each base-housing set. If the maximum angle of the housing turn varies, the position of the concavity in the housing has to be changed and housings are produced for every maximum angle of housing turn. However, no special positioning units are required for such housings as mentioned above. The number of positioning unit types can thus be reduced considerably. Concerning the manual positioning unit, the number of types thereof can be minimized to one.

Now the assembled status of the motor-driven positioning unit 150 will be described in detail below with reference to FIGS. 18 to 20.

The base 110 consists of the base body 111 and base cover 112 as previously mentioned, both made by molding a synthetic resin. The portion 113 of the base body 111 is inserted into the opening 116 in the base cover 112, and the base body 111 is coupled with screws 119 to the base cover 112 to build up the base 110. The housing 20 is also molded in a generally box-like shape open at the lateral side thereof and the material thereof is also a synthetic resin. The chamber 129 is defined by the area of the circumference 121 of the housing 120 that serves as the lateral side of the housing 120, the portion of the rear wall 125 of the housing 120, the L-shaped wall 1291 laid inside the housing 120, formed integrally with the housing 120 and consisting of the wall nearly parallel to the rear wall of the housing 120 and the wall generally parallel to the lateral side of the housing 120, and the wall 1292 laid inside the housing 120, formed integrally with the housing 120 and nearly parallel to the top of the housing 120 which closes the top of the wall 1291. The area of the chamber 1291 that faces the portion 113 of the base body 111 is open to outside through the opening 122 formed in the area of the circumference 121 of the housing 120 that serves as the bottom of the housing 120. Steps 123 and 124 are formed on the opposite edges of the opening 122 that are near the housing bottom, one at a lower portion of the wall 1291 forming the chamber 129, that faces the housing lateral side, and the other at a lower portion of the housing circumference 121 that is related to the housing lateral side.

The mirror unit is disposed in a place (not shown) inside the housing 120. It is installed in an area (not shown) in the housing 120 by means of the tilting mechanism having the ball joint.

The positioning unit 150 has the support consisting of the stationary member 151 and rotary member 152 as mentioned above. The stationary member 151 is formed generally like a plate. The rotary member 152 consists of a member 153 and a member 54 separable from the member 153. The member 153 is formed generally like a hollow box open at the top thereof and has projections 155 and 156 formed integrally therewith at opposite longitudinally ends thereof, a bridge seat 159 formed integrally therein and also a hole formed in the bottom thereof and through which the shaft of the turning mechanism is passed. The bridge 160 is to have installed therein a motor, a printed wiring board having a drive circuit for the motor, etc. and to be fixed to the bridge seat 159. The other member 154 is to be fitted in the opening of the bridge seat 159 to form a container along with the member 153. The member 154 is also formed generally like a box open at the bottom thereof and has a connector 193 installed at the top thereof.

The turning mechanism is constructed in the same way as that of the positioning mechanism 50 having been described with reference to FIGS. 2 to 11. The shaft 164 is hollow and has longitudinally extending flat faces formed on a part of the circumference thereof. It is formed integrally with the stationary member 151. The rotary member 152 is fitted on the shaft 164, and assembled to the stationary member 151. A gear 165 is fitted on a portion of the shaft 164 that is out of the rotary member 152. It is fitted rotatably and slidably along the shaft 164. In addition, a member 166 forming a clutch together with the gear 165 is disposed between the gear 165 and the stationary member 151, and a seat plate 167 disposed between the member 166 and stationary member 151. The seat plate 167 is fitted on the shaft 164. Further, a coil spring 168 is disposed between the gear 165 and a spring retainer 169 fixed at the free end of the shaft 164. This coil spring 168 is also fitted on the shaft 164 to maintain the engagement of a pawl of the clutch member 166 in a recess formed in the gear 165 while pressing the gear 165, member 166 and seat plate 167 toward the rotary member 152. A motor 171 is fixed to the bridge 160 with the shaft thereof penetrated through a hole in the bridge 160. A worm is fixed on a portion of the motor shaft that protrudes from the bridge 160 with a coupling disposed between the worm and the shaft portion. The worm is placed under the bridge 160 and held by a bearing in the member 153, and in mesh with a worm wheel disposed under the bridge 160. The worm wheel is fitted on and fixed to the shaft of another worm. A gear assembly is also disposed between the second worm and a spur gear which is in mesh with the gear 165. FIG. 18 shows only the gear assembly 177 in the gear train and the shaft 178 of the gear assembly 177. Sector recesses 181 which retain the housing 120 in the viewing position are formed in the surface of the stationary member 151 that is opposite to the member of the rotary member 152 concentrically with the shaft 164. Balls 183 are held in concavities 182 in the rotary member 152. The rotary member 152 is fitted on the shaft 164 with the balls 183 put in the sector recesses 181. The cable 190 is passed through the inner space of the base body 111 and hole in the shaft 164, and some of the wires of the cable 190 are connected to the drive circuit for the motor 171 and the other wires are connected to the connector 193 located on the top wall of the member 154.

To install the positioning unit to the housing, for example, the cable 191 is first connected to the connector 193 and the motor in the tilting mechanism, and then the rotary member 152 of the positioning unit 150 is inserted in the chamber 129 and fixed to the housing 120 while the connector 193 is being inserted into a hole in the top wall 1292 defining the chamber 129. Then the projections 155 and 156 of the rotary member 152 of the positioning unit 150 are fitted to the steps 123 and 124 forming a part of the opening 122 in the housing 120. Then the stationary member 151 is coupled to the base body 111 with screws 189. The positioning unit 150 is fixed in the chamber 129 of the housing 120 in the following manner. As previously mentioned, an adhesive 1296 is applied to the inner wall of the chamber 129 or the outer surface of the rotary member 152 and the rotary member 152 is inserted into the chamber 129. When the adhesive 1296 is set, the rotary member 152 is securely fixed to the inner wall of the chamber 129. To hold the positioning unit 150 in the chamber 129 of the housing 120 until the adhesive is cured, the rotary member 152 has a projection 1293 formed integrally therewith on either of the wide lateral sides of the member 153 forming the rotary member 152. Each of the projections 1293 has the sectional form of a trapezoid as shown in FIG. 20. Also a concavity 1531 also having the sectional shape of a trapezoid is formed in the inner face of either of the rear walls 125 of the housing 120 that define the chamber 129 so that the projections 1293 are fitted into the concavities 1531 when the positioning unit 150 is inserted into the chamber 129. When the positioning unit 150 is inserted into the chamber 129, the member 153 or the wall 1291 defining the chamber 129 or both are deflected and thus the projections 1293 go into the concavities 1531. Then the member 153 or the wall 1291 or both resiliently restores its initial state so that the positioning unit 150 is retained by the housing 120. Furthermore, the concavity 1531 is defined by two portions protruding from the surface of the member 153. These protrusions provide a space between the outer surface of the rotary member 152 and the walls defining the chamber 129, into which the adhesive 1296 is to be put. Also a slope 1294 is formed on a portion of the rotary member 152 that is nearer to the end of the member 153 than the projection 1293 of the rotary member 152 when the positioning unit 150 is inserted into the chamber 129. The slope 1294 facilitates the engagement of the projection 1293 into the concavity 1531. The stationary member 151 is coupled to the base body 110 with the screws 189 driven into the stationary member 151 through the base cover 112 and base body 111.

To install the rearview mirror to a car body, the base body 111 is fixed to the car body, and then the end 192 of the cable 190 is connected by means of the connector to the controller provided near the driver's seat in the car body.

As in the rearview mirror having previously been described with reference to FIGS. 2 to 11, the housing 120 is turned to the viewing position or first parking position by putting the motor 171 into run. When the motor 171 runs forward, the gear in mesh with the gear 165 of the gear train that is on the shaft 164 rotates on its own axis and about the gear 165 to turn the housing 120 about the shaft 164 to the viewing position. When the motor 171 runs reversely, the gear in mesh with the gear 165 of the gear train that is on the shaft 164 rotates reversely on its own axis and reversely about the gear 165 to turn the housing 120 about the shaft 164 to the first parking position. In the viewing position, the housing 120 is set in place when the balls 183 abut one ends of the sector recesses 181 and rotation of the gear train is locked due to the presence of worm and worm wheel. For manual turning of the housing 120 to the viewing position or first parking position, the housing 120 is pressed by hand while the motor is out of operation to release the clutch formed by the gear 64 and member 166 and the rotary member 152 is turned along with the housing 120 about the shaft 164. When a person or any thing touches or hits the housing 120 in the viewing position, the clutch composed of the gear 64 and member 166 is released and the rotary member 152 and housing 120 are turned together about the shaft 164. In each of the parking positions, the housing 120 is blocked against turning by the projection 118 provided on the portion 113 of the base body 111 when it abuts either end of the partially fragmentary circular recess of which one end is the concavity in the rotary member 152 while the other end is the concavity in the housing 120. The circular recess is formed in the bottoms of the rotary member 152 of the positioning unit 150 and housing 120, respectively. The projection 118 is formed on the base body 111 and its free end is to be fitted in the circular recess. When the rotary member 152 is turned to the first parking position, the concavity in the rotary member 152 receives the projection 118 on the portion 113 of the base body 111 to block the housing 120 against further turning. When the rotary member 152 and housing 120 are turned to the second parking position, the concavity in the housing 120 receives the projection 118 to block the housing 120 against further turning. It should be noted that FIG. 17 shows only the recess 163 formed, as a part of the circular recess, in the rotary member 152, which connects the concavity in the housing 120 with that in the rotary member 152.

Figure 18:
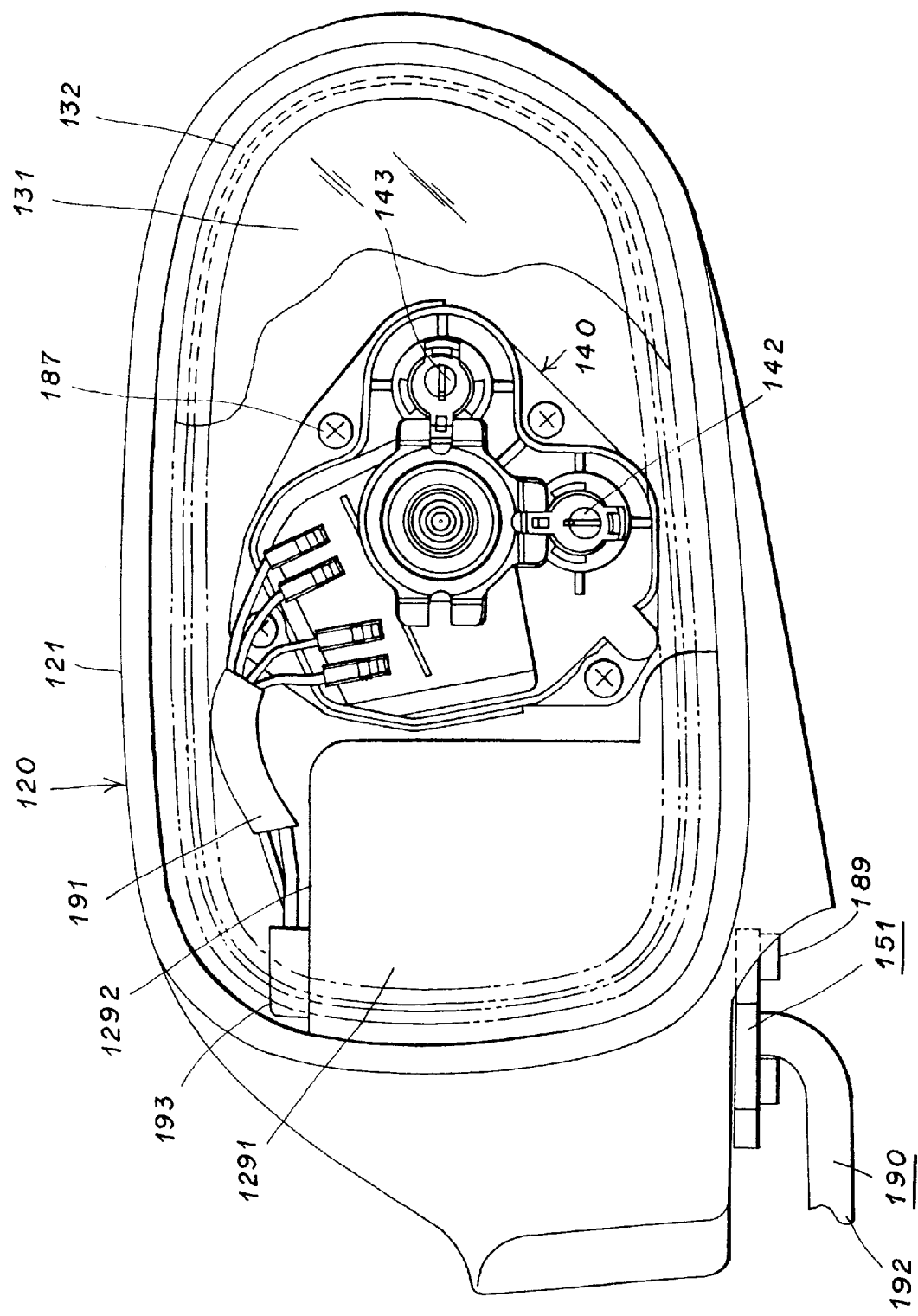
FIG. 18 is a front view of a rearview mirror obtained by assembling the system in FIG. 17 but does not include the base.
Figure 19:
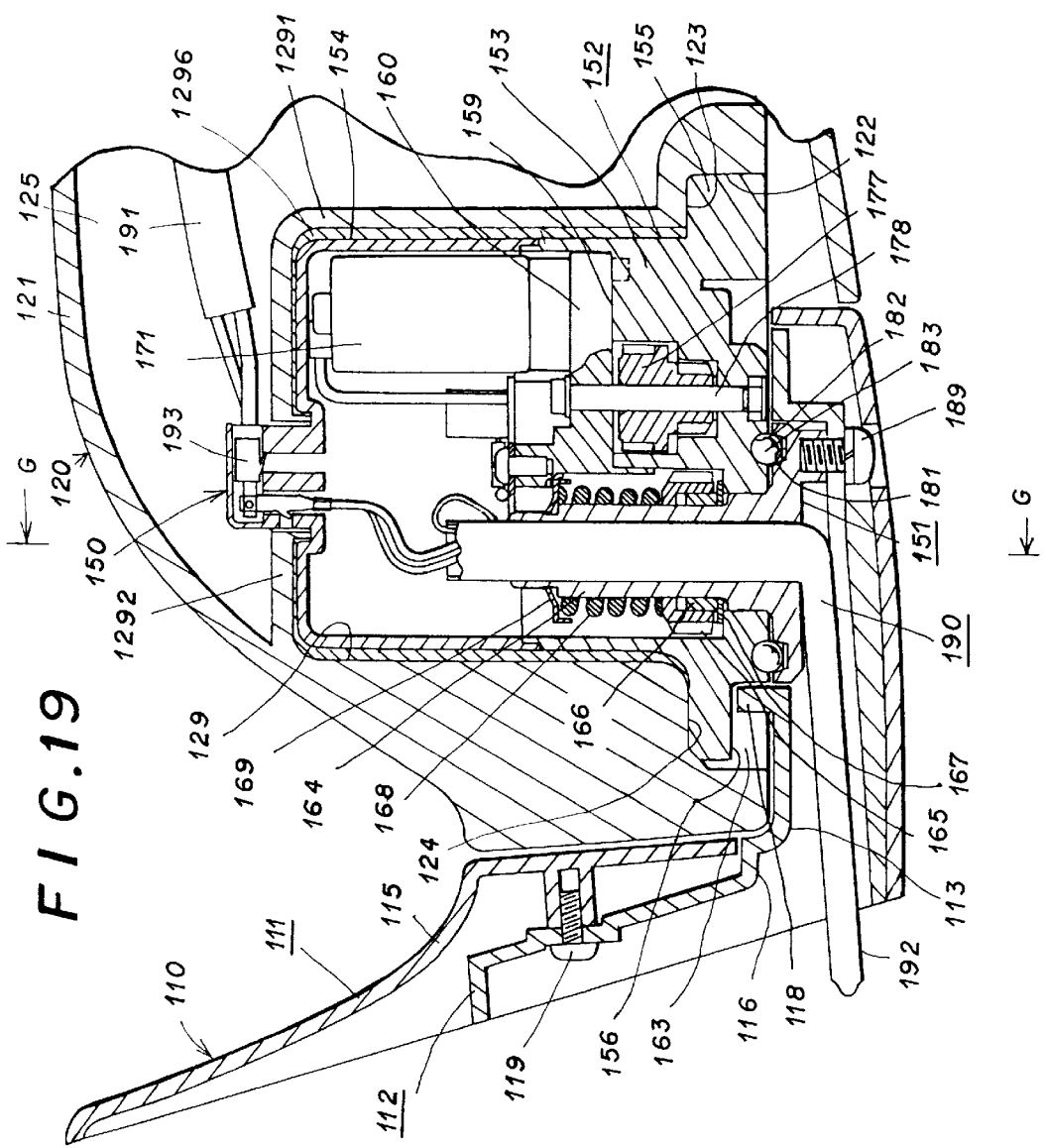
FIG. 19 is a section view of the rearview mirror in FIG. 18.
Figure 20:
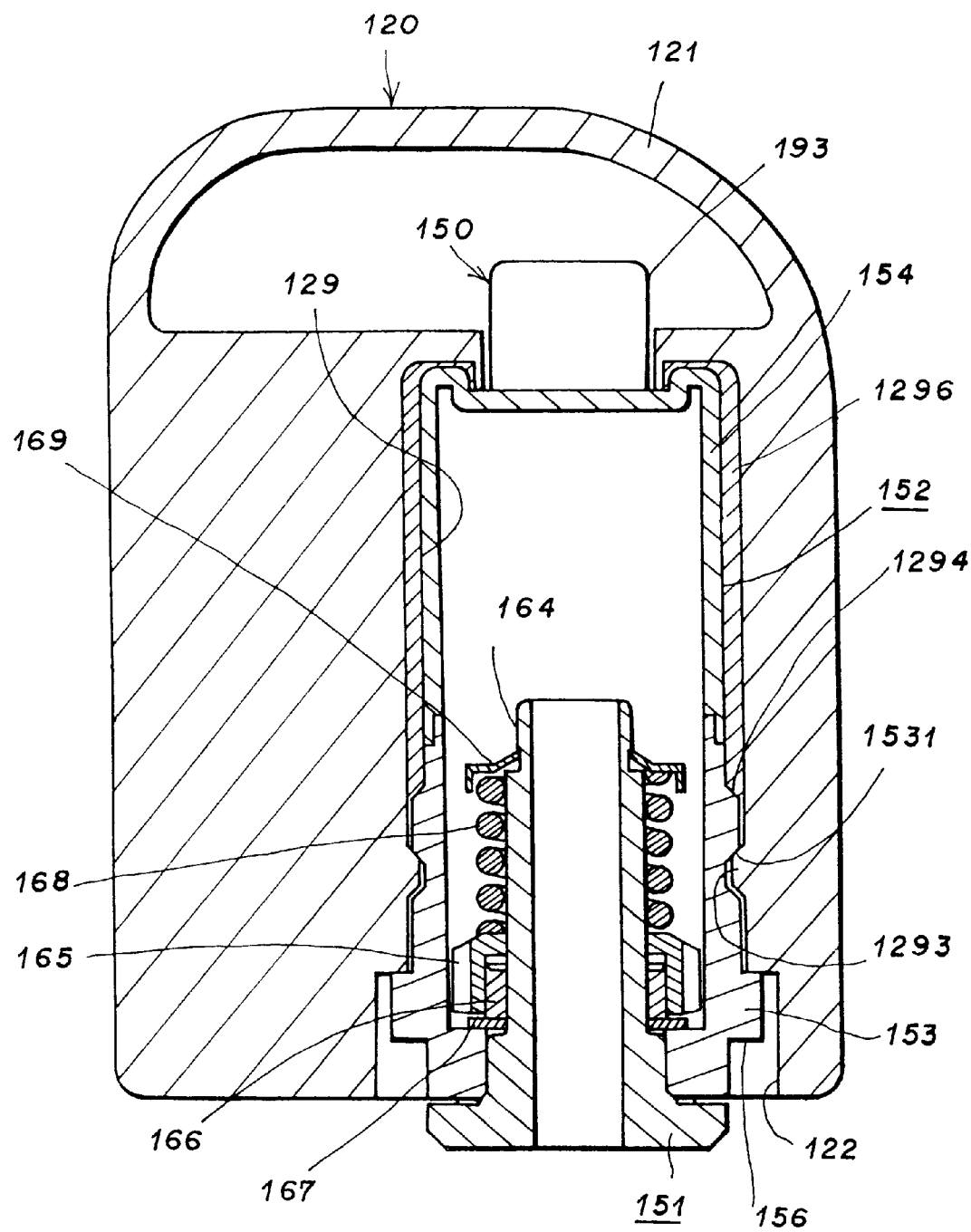
FIG. 20 is a sectional view taken along the line G—G in FIG. 19, from which some component elements are omitted.
Figure 21:
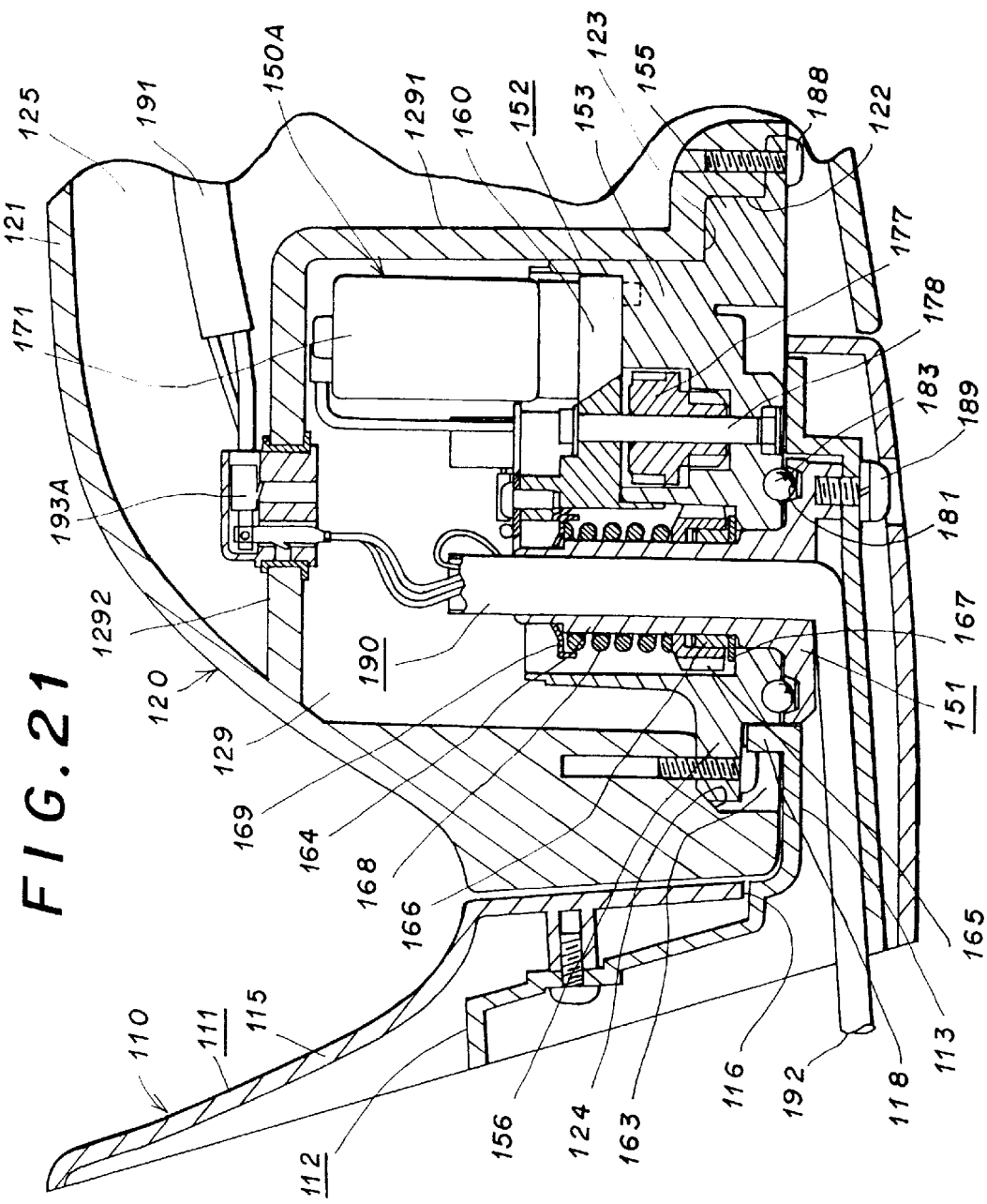
FIG. 21 is a sectional view of another rearview mirror obtained by assembling the system in FIG. 17.

In the rearview mirror having been described in the foregoing with respect to FIGS. 18 to 20, the rotary member 152 of the positioning unit 150 consists of the member 153 and the member 154 which is separable from the member 153. The turning mechanism assembled in the member 153 is closed by the member 154. Therefore, the turning mechanism is protected against injury or dust adhesion during assembling into the housing or product management before the assembling. The member 154 forming the rotary member 152 may be formed from the top wall 1292 defining the chamber 129 of the housing 120 and the connector 193 be fixed to the top wall 1292, as necessary, which will contribute to the reduction of the number of parts of the rearview mirror. FIG. 21 shows an example of a rearview which is formed from a reduced number of parts is used.

Similarly to the rearview mirrors having been described in the foregoing, this rearview mirror consists of a base 110 which is to be fixed to the body of a car, housing 120 incorporating a mirror unit and a positioning unit which is built in the housing 120. As in the rearview mirror having been described with reference to FIGS. 18 to 20, the base 110 consists of a base body 111 and base cover 112. The base body 111 is assembled to the base cover 112 with a portion 113 thereof inserted into an opening 116 of the base cover 112, and the portion 113 is coupled to a stationary member 151 of the positioning unit 150A. The housing is shaped generally like a box open at one of the lateral sides thereof, and has a chamber 129 defined by a circumference 121, rear wall 125, L-shaped wall 1291 and top wall 1292, which form together the housing 120. The positioning unit 150A is to be housed in the chamber 129. The chamber 129 is open outside at an area thereof that faces the base 110 through an opening formed in the bottom wall of the housing 120. The top wall 1292 has fixed thereon a connector 193 by means of an adapter. This rearview mirror has a mirror unit (not shown) is installed in an area (not shown) of the housing 120 by means of a tilting mechanism consisting of ball joint and a motor which tilts the mirror unit about the ball joint, etc.

The positioning unit 150A consists of a stationary member 151 and rotary member 152. The stationary member 151 is constructed as in the rearview mirror having been described with reference to FIGS. 18 to 20, but the rotary member 152 comprises only a member 153. As in the rearview mirror having been described with reference to FIGS. 18 to 20, the turning mechanism for the housing 120 consists of a shaft 164 which is provided in the stationary member 151, gear 165 provided on the shaft 164, member 166 which forms a clutch along with the gear 165, coil spring 168, motor 171 carried by the rotary member 152, a gear train disposed between the motor 171 and gear 165 and including a gear assembly 177 in the member 153, sector recesses 181 formed in the stationary member 151 concentrically with the shaft 164, balls 183 held by the rotary member 152, etc. Also a cable 190 is passed through the inner space of the base body 111 and a hole formed in the shaft 164 and then some wires of the cable 190 are connected to a drive circuit for the motor 171.

To install the positioning unit 150A to the housing 120, for example, the other wires of the cable 190 are connected to the connector 193, then the rotary member 152 is introduced into the chamber 129 while projections 155 and 156 of the positioning unit 150 are being put in contact with steps 123 and 124, respectively, of the housing 120, and the rotary member 152 is fixed to the housing 120. The rotary member 152 is fixed to the housing 120 by driving screws 188 into screw holes formed in the L-shaped wall 1291 and housing circumference 121 forming together the chamber 129 of the housing 120 through the projections 155 and 156 of the rotary member 152. The tilting mechanism and positioning unit 150A are connected to each other by connecting the cable 191 to the connector 193 and the motor of the tilting mechanism, and the controller provided near the driver's seat inside the car body and positioning unit 150A are connected to each other by connecting the end 192 of the cable 190 to the controller by means of the connector.

Figure 22:
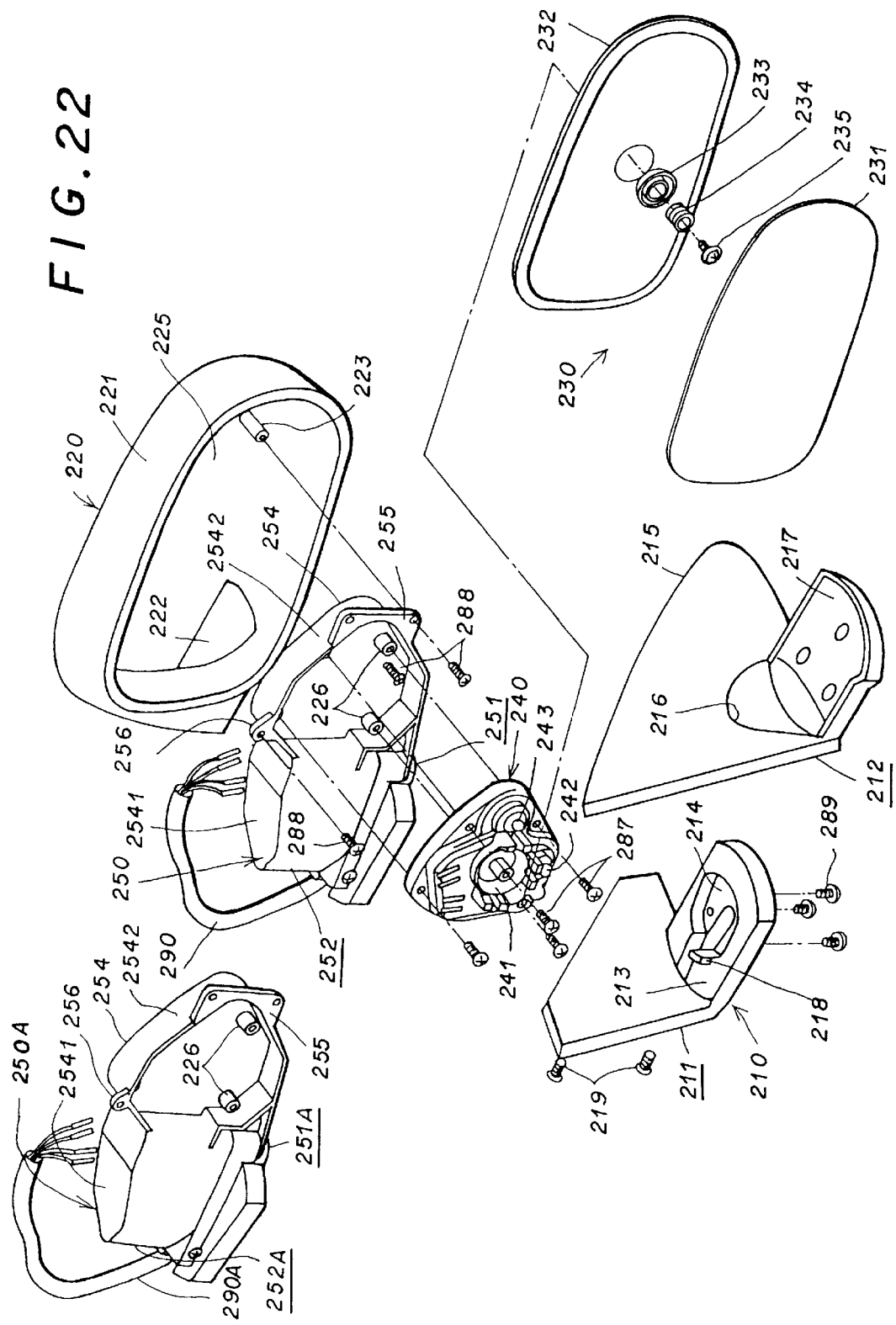
FIG. 22 is an exploded perspective view of a third embodiment of the rearview mirror system according to the present invention, showing a certain composition thereof.
Figure 23:
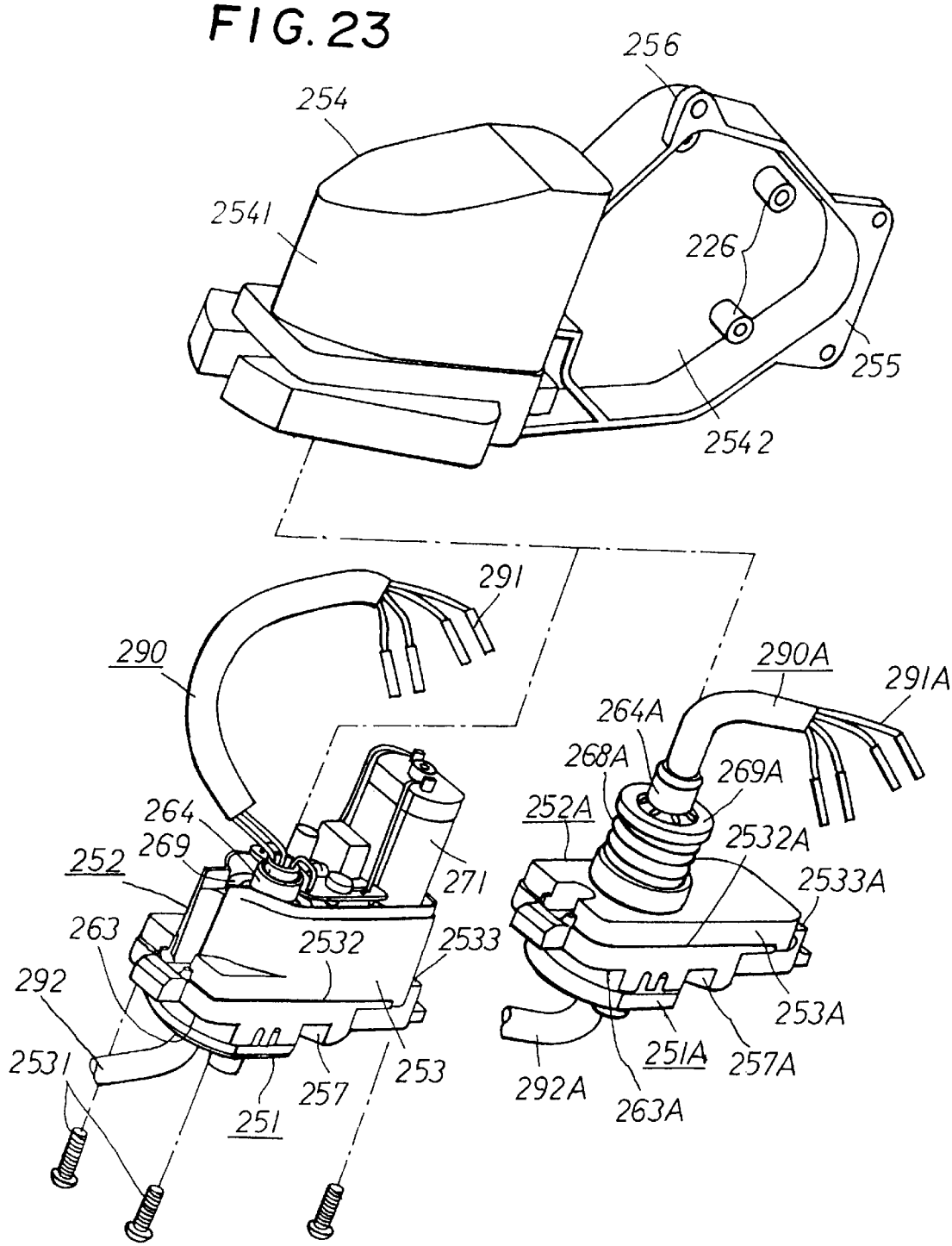
FIG. 23 is an exploded perspective view showing the construction two positioning units incorporated in the rearview mirror system shown in FIG. 22.

FIGS. 22 and 23 show the third embodiment of the rearview system according to the present invention.

FIG. 22 shows one of the rearview mirrors of a rearview mirror system which to be installed on the right door of a car, in which a base 210 and housing 220 are designed according to the style of a car body to which they are to be installed.

The base 210 is to be fixed to the right door of a car. The housing 220 incorporates a mirror unit 230 consisting of a mirror and mirror holder. The mirror unit 230 is supported in the housing 220 by means of ball joint of a tilting mechanism 240. Further, a positioning unit for the housing 220 is installed between the base 210 and housing 220. The positioning unit is a motor-driven type 250 or a manual type 250A. The housing 220 is turned as driven by the motor or by hand between the viewing position and first or second parking position.

The base 210 consists of a base body 211 and base cover 212. They are designed in a nearly L-shape similarly to the base of the other rearview mirror. The base body 211 has a portion 213 being one arm of the L shape and in which an opening 214 in which a portion of the positioning unit 250 is to be fitted, and the base cover 212 has a portion 215 being one arm of the L shape and in which an opening 216 is formed in which the portion 213 of the base body 211 is to be fitted. To assemble the base 210, the base body 211 is passed through the opening 216 in the base cover 212, the portion 213 is placed on a portion 217 being another arm of the base cover 212 and the portions 213 and 217 are coupled with screws 219.

The housing 220 is designed like a shallow box open at the front thereof. The housing 220 has a circumference 221 that has an opening 222 in an area thereof that serves as the bottom of the housing 220. Apart from the opening 222, studs 223 to which the positioning unit 250 is to be fixed are formed in a rear wall 225 of the housing 220. The studs 223 are designed in the form of a cylinder in which a screw hole is made. Three such studs are formed but only one of them is illustrated.

The mirror unit 230 consists of the mirror 231 and mirror holder 232. The mirror 231 is fixed to the mirror holder 232. The mirror holder 232 is fixed to the tilting mechanism 240 by means of a ball 233, spherical seat 241 provided at the body of the tilting mechanism 240, coil spring 234, set screw 235, etc. The tilting mechanism 240 comprises two rods 242, motor that drive the rods independently of each other, reduction gears, etc. As one of the motor runs and moves one of the rods 242, the rod 242 presses the lower rear portion of the mirror holder 232 which in turn will be turned vertically about the ball joint. As the other motor drives and moves the other rod 242, the rod 242 presses the lateral rear portion of the mirror holder 232 which in turn will be turned horizontally about the ball joint. Thus, the mirror unit 230 can be tilted in a desired direction.

The positioning unit 250 consists of a mechanism that turns the housing 220 and a support carrying the turning mechanism. The support comprises a stationary member 251 and rotary member 252. The stationary member 251 has a general form of a plate as shown in FIG. 23. The rotary member 252 consists of a member 253 and a member 254 separable from the member 253. The member 253 has a general form of a hollow box open at the top thereof having narrow seats 2532 formed at the lateral sides thereof and a projection 2533 formed at one end thereof. The member 254 consists of a cover 2541 and extension 2542. The cover 2541 is so shaped and dimensioned as to be fitted on a cylindrical portion of the member 253 to form a container. Also the cover 2541 has formed at the end of the wall thereof that defines an opening at which it is fitted onto the member 253 end faces that are to be in contact with the narrow seats 2532 of the member 253, and in the inner surface of the wall of the opening of the cover 2541 a concavity into which the projection 2533 of the member 253 is to be fitted. To install the member 254 to the member 253, the end faces of the wall defining the opening of the cover 2541 and the concavity formed in the wall are put into contact with the seat 2532 and fitted onto the projection 2533 of the member 253, the cover 2541 is thus fitted onto the member 253, and then screws 2531 are driven into the cover 2541 from under the member 253. The extension 2542 has the general form of a shallow box and is formed integrally with the cover 2541 as projected outwardly from the lateral side of the cover 2541. It has formed on the circumference thereof fixtures 255 and 256 that are to be joined to the studs 223 of the housing 220 and on the rear wall thereof seats 226 to which the tilting mechanism is to be fixed. The fixtures 255 and 256 themselves are a tab formed integrally with the circumference forming the extension 2542. Each of the tabs has formed therein a through-hole that coincides with the screw hole in the stud 223 when the positioning unit is installed to the housing 220. The seat 226 is formed like a cylinder in which a screw holder is formed. They are formed integrally on the rear wall of the extension 1542 so that their screw holes are to coincide with the through-holes in the tilting mechanism 240. The tuning mechanism is installed and enclosed in the container formed by the member 253 and the cover 2541 of the member 254. As in the other positioning units having previously been described, the turning mechanism consists of a shaft 264, gear mounted on the shaft 264 by means of a clutch, motor 271 installed in the rotary member 252, gear train that transmits the power from the motor 271 to the gear on the shaft 264. The shaft 264 is provided as erected in the stationary member 251, the rotary member 252 is fitted on the shaft 264, the gear is mounted as fitted on the shaft 264, the clutch is provided between the gear on the shaft 264 and the shaft 264 itself, the motor 271 and gear train are installed in the rotary member 252. As the motor 271 runs, a gear of the gear train that is in mesh with the gear in the shaft 264 is rotated on its own axis and about the gear on the shaft 264 to turn the rotary member 252 on the stationary member 251. A pair of sector recesses is formed concentrically with the shaft 264 and in a surface of the stationary member 251 that faces the rotary member 252. Balls are held on a surface of the member 253 of the rotary member 252 that faces the stationary member 251 or half balls are formed integrally with the member 253 on a surface of the member 253 that faces the stationary member. Either the balls or half balls are put in the sector recesses, respectively. As the rotary member 252 is turned, the balls or half balls abut the ends of the sector recesses to position the rotary member 252 and housing 220 at the viewing position. FIG. 23 shows the shaft 264, motor 271, etc. of these components.

To install the positioning unit 250 to the housing 220, for example, a cable 290 is first passed through the inner space of the base body 211 and the shaft 264, some of the wires of the cable 290 are connected to the motor 271 in the turning mechanism, the other wires are led out of the positioning unit 250 from the opening in the member 254 and connected to the drive circuit of the motor in the tilting mechanism 240, then the tilting mechanism 240 is fixed along with the mirror unit 230 to the seats 226 of the extension 2542 with screws 287, the stationary member 251 is put in the opening 222 in the housing 220 and the positioning unit 250 is placed inside the housing 220, the fixtures 255 and 256 are fixed to the studs 223 of the housing 220 with screws 288, and screws 289 are driven into the stationary member 251 through the portions 217 of the base cover 212 and portion 213 of the base body 211. To install the rearview mirror to a car body, the base body 211 of the base 210 is fixed to the car body, the end 292 of the cable 290 is connected to a controller inside the car by means of a connector. As in the previously described rearview mirrors, the driver operates control switches provided near the driver's seat to control the motor of the turning mechanism that turns the housing 220 and the motor of the tilting mechanism 240 that tilts the mirror unit.

The manual positioning unit 250A for the housing 220 consists of a mechanism permitting a manual turn of the housing 220 and a support carrying the turning mechanism. The support consists of a stationary member 251A and rotary member 252A. The stationary member 251A is generally formed like a plate. Similar to the rotary member 252 in the motor-driven positioning unit 250, the rotary member 252A consists of a member 253A carrying the turning mechanism and a member 254 which forms a container together with the member 253A and is separable from the member 253A. The separable member 254 is the same as the member 254 forming a part of the rotary member 252 of the motor-driven positioning unit for the housing 220. The member 253A is generally formed like a plate having seats 2532A formed on the lateral sides thereof and a projection 2533A formed at one end thereof. To install the member 253A to the member 254, the member 253A is fitted into a cover 2541 of the member 254 while the seats 2532A on the member 253A and projection 2533A are being put in contact with the end face of a wall defining an opening of the cover 2541 of the member 254 and a step formed on the inner face of the wall, respectively, and screws 2531 are driven into the members 253A and 254 from under the member 253A. The turning mechanism is inserted into the container formed by the member 253A and the cover 2541 of the member 254 and thus sealed from outside. As in the previously described manual positioning units for the housing, the turning mechanism itself comprises a shaft 264A provided on the stationary member 251A and holding the rotary member 252A in place, coil spring 268A mounted on the shaft 264A to press the rotary member 252A to the stationary member 251A, balls held on a surface of the rotary 252A that faces the stationary member 251A or half balls formed integrally with the rotary 252A on a surface of the rotary member 252A that faces the stationary member 251A, sector recesses formed concentrically with the shaft 264A and in a surface of the stationary member 251A that faces the rotary member 252A and in which the balls or half balls are placed, etc.

To install the positioning unit 250A to the housing 220, for example, a cable 290A is passed through the inner space of the base unit 211 and the shaft 264A and led out of the positioning unit 250A from the opening in the member 254, wires 291A are connected to the drive circuit of the motor in the tilting mechanism 240, then the tilting mechanism 240 is fixed along with the mirror unit 230 to the seats 226 on the extension 2542 of the member 254 with screws 287, the stationary member 251A is placed in the opening 222 in the housing 220, fixtures 255 and 256 on the extension 2542 of the member 254 are secured to the studs 223 in the housing 220 with screws 288 and the stationary member 251A is secured to the portion 213 of the base member 211 with screws 289. To install the rearview mirror to a car body, the base body 211 of the base 210 to the car body and an end 292 of the cable 290 is connected, by means of a connector, to a controller provided inside the car body and having a control circuit only for the motor in the tilting mechanism 240.

Regarding the one, in which the motor-driven positioning unit 250 for the housing 220 is installed, of these rearview mirrors, when the motor is put into run with the housing 220 set at the first parking position, the gear of the gear trains that is in mesh with the gear on the shaft is rotated on its own axis and about the gear on the shaft, the rotary member 252 is turned along with the housing 220 about the shaft to the viewing position. When the motor runs reversely, the housing 220 is turned to the first parking position. When the housing 220 is forcibly pressed by hand from the viewing position toward the first parking position or vice versa, the gear on the shaft is disengaged from the stationary member 251 so that the rotary member 252 will be rotated along with the gear on the shaft about the shaft between the viewing position and first parking position. When a person or any thing presses or hits the housing 220 in the viewing position, the gear on the shaft is disengaged from the rotary member 252 is turned along with the housing 220 about the shaft to the second parking position.

In the rearview mirror incorporating the manual positioning unit 250A for the housing 220, the housing 220 can be manually turned to the viewing position or first parking position. When a person or thing presses or hits the housing 220, the rotary member 252A is turned against the force of the coil spring to the first or second parking position.

The base and housing for a rearview mirror which is to be used on the left-hand door of a car are not illustrated. However, they are formed symmetrically with the base 210 and housing 220 used in the aforementioned rearview mirror which is to be installed on the right-hand door. In both the motor-driven and manual positioning units for the housing, only the separable member of the rotary member is formed symmetrically with the member 254 in the right-hand door rearview mirror. To install the positioning unit to the base and housing in a set, a portion of the positioning unit 250 (250A) for the set which is to be installed to the right-hand door, that corresponds to the cover 2541 of the member 254, is fitted onto the member 253 (253A) and bolted. To install the positioning unit to the housing, the positioning unit is put into the housing with the stationary unit put in the opening in the housing, the extension is bolted to the studs of the housing, and the stationary member is bolted to the base body.

Also in these rearview mirrors for vehicle, the housing 220 is held in place in the viewing position when the motor is stopped and the balls between the stationary and rotary members abut the ends of the sector recesses in the stationary member. In the first parking position, the housing is blocked against further turn when the projection on the base is engaged in the concavity in the rotary member of each positioning unit. In the second parking position, the housing is blocked against further turn when the projection 218 on the base is engaged in the concavity in the separable member. Regarding the rearview mirror, shown in FIG. 22, for example, which is to be installed on the right side of a car body, the projection 218 is provided on the base 210 as positioned on an imaginary circle concentrical with the shaft 264 (264A) in the stationary member 251 (251A) of the positioning unit 250 (250A) and the free end of the projection 218 extends toward the bottom of the housing 220. A partially fragmentary circular recess is formed in the bottoms of the member 253 (253A) of the rotary member 252 (252A) of the positioning unit 250 (250A) and concentrically with an imaginary circle concentrical with the shaft 264 (264A). The concavity 257 (257A) in the member 254 forms one end of the circular recess and is located in a position on the imaginary circle that corresponds to a position the projection 218 will take when the housing 220 is turned to the first parking position. Also, another concavity (not shown) is formed in the member 254 in a position on the imaginary circle that corresponds to a position the projection 218 will when the housing 220 is turned to the second parking position. When the stationary member 251 is fixed to the portion 213 of the base 210, the end of the projection 218 enters the circular recess. When the housing 220 is turned to the first parking position, the projection 218 is engaged into the concavity 257 (257A) in the rotary member 252 to block the rotary member 252 from turning. When the housing 220 is turned to the second parking position, the projection 218 is engaged into the concavity in the member 254 to block the rotary member from turning. As in the rearview mirrors of this type having previously been described, the motor of the motor-driven positioning unit 250 is stopped when the housing has been turned to the viewing or first parking position as in the following. Namely, when the housing is blocked against turning in the viewing or first parking position, the load to the motor increases and an increased current flows through the motor. The positive temperature coefficient thermistor in the controller detects the increased current and shuts off the power supply to the motor which will thus be stopped from running. In the rearview mirror which is to be installed on the left-hand door, the concavity in the member in which the turning mechanism is housed, and the concavity in the member separable from the housing member, of the rotary member of the positioning unit, are formed symmetrically with the concavity 257 (257A) in the member 253 (253A) of the rotary member 252 (252A) and the concavity in the member 254 separable from the member 253 (253A) in the rearview mirror which is to be installed on the right-hand door. The housing is securely held in the viewing position and blocked against turning in each of the parking positions, both in the same manner as in the right-hand door rearview mirror.

This rearview mirror system may also be composed of each of plural base-housing sets formed correspondingly to the car body styles and intended for installation on the right side of the car body and each of plural base-housing sets formed correspondingly to the car body styles and intended for installation on the left side of the car body (these are not illustrated), in addition to the aforementioned base-housing set intended for installation on the right side of a car body and that intended for installation on the left side of a car body. In each of the plural base-housing sets, each housing has formed in an area of the circumference thereof that faces the base an opening in which each positioning unit is to be fitted and also seats formed apart from the opening and to which the positioning unit is to be fixed, and a part of the rotary member of each positioning unit has a separable member which is commonly usable in all the base-housing sets included in the rearview mirror system.

Therefore, preparing only a separable member for each base-housing set in the rearview mirror system according to the present invention permits to install either of a motor-driven positioning unit and manual positioning unit to the housing in each base-housing set. Namely, no special positioning unit is required for a base-housing set of a rearview mirror which is to be installed on the left-hand door of a car, base-housing set of a rearview mirror which is to be installed on the right-hand door and each of plural base-housing sets formed corresponding to the car body styles. Thus, the positioning units of a same type can be commonly used with various many types of base-housing sets, so it is not necessary to produce many types of positioning units for a variety of base-housing sets. The positioning units can be produced with considerably reduced costs and a mass production of the positioning units is possible. Therefore, the costs for positioning unit manufacture can be further reduced. Further, in each of assembled rearview mirrors, the housing in one of the parking positions can be blocked against turning by the projection on the base and the concavity in the member separable from the rotary member of the positioning unit. Therefore, preparation of the separable member for each of base-housing sets different in the maximum angle of housing turn from one another makes it unnecessary to make a positioning unit for each of the base-housing sets even if the sets are different in the range of angle between the first and second parking positions from one another. Owing to this characteristic of the present invention and the above-mentioned requirement of no special positioning unit, the number of positioning-unit types can remarkably be reduced and the main parts of the stationary and rotary members and the turning mechanism can be limited to a single type, respectively.

Figure 24:
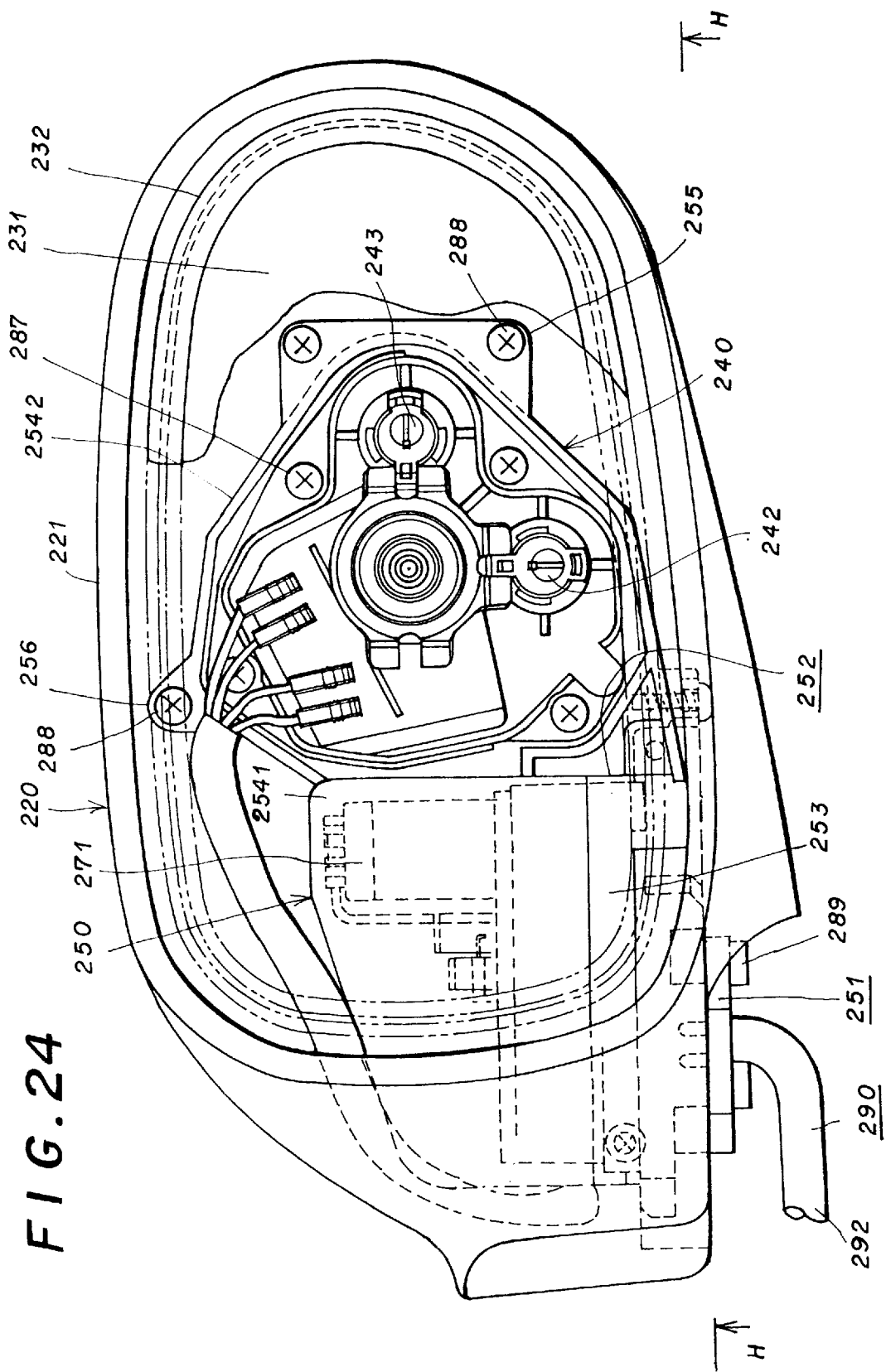
FIG. 24 is a front view of a rearview mirror obtained by assembling the system in FIG. 22 but does not include the base.
Figure 25:
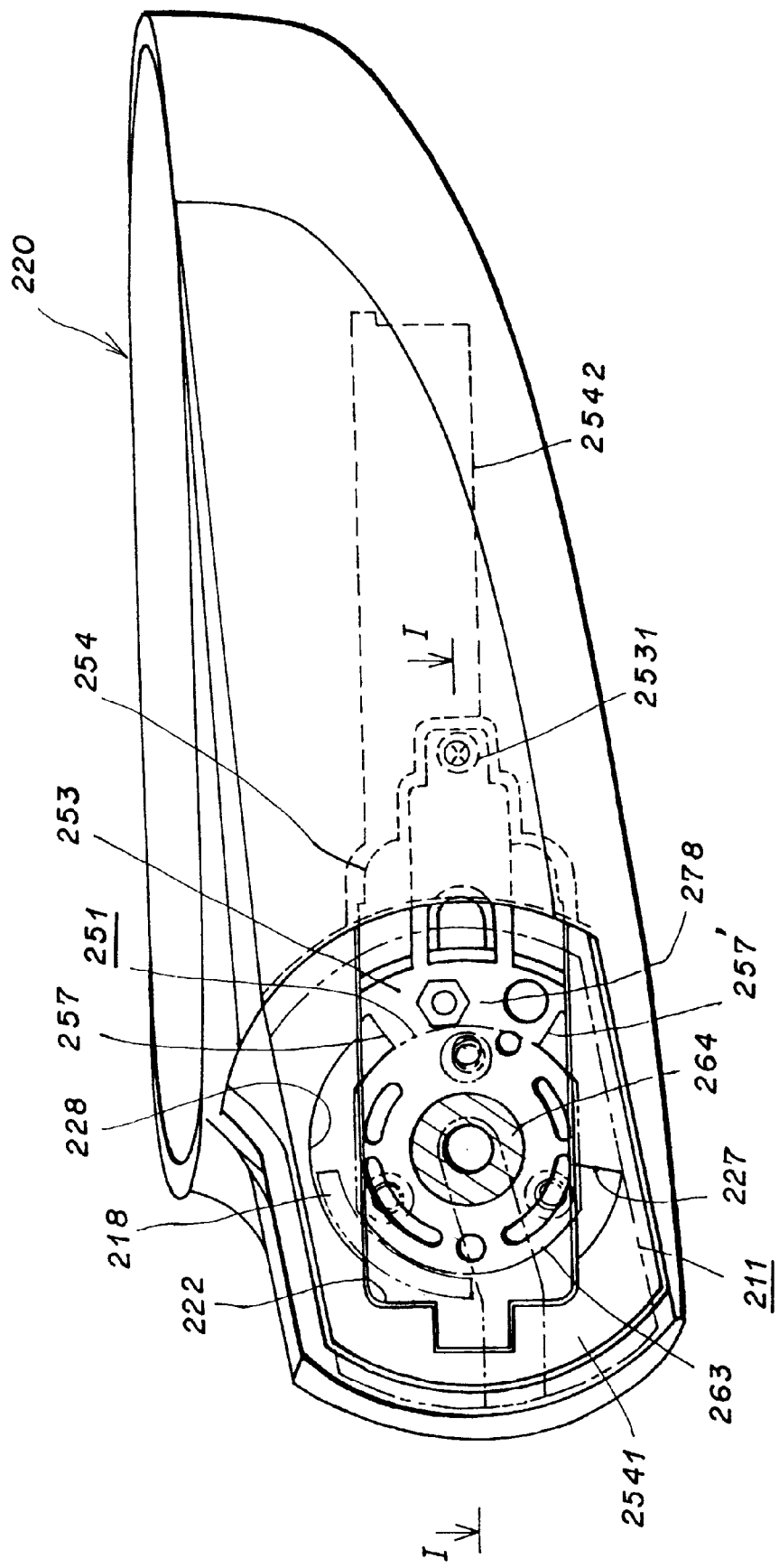
FIG. 25 is a bottom view taken along the line H—H in FIG. 24.
Figure 26:
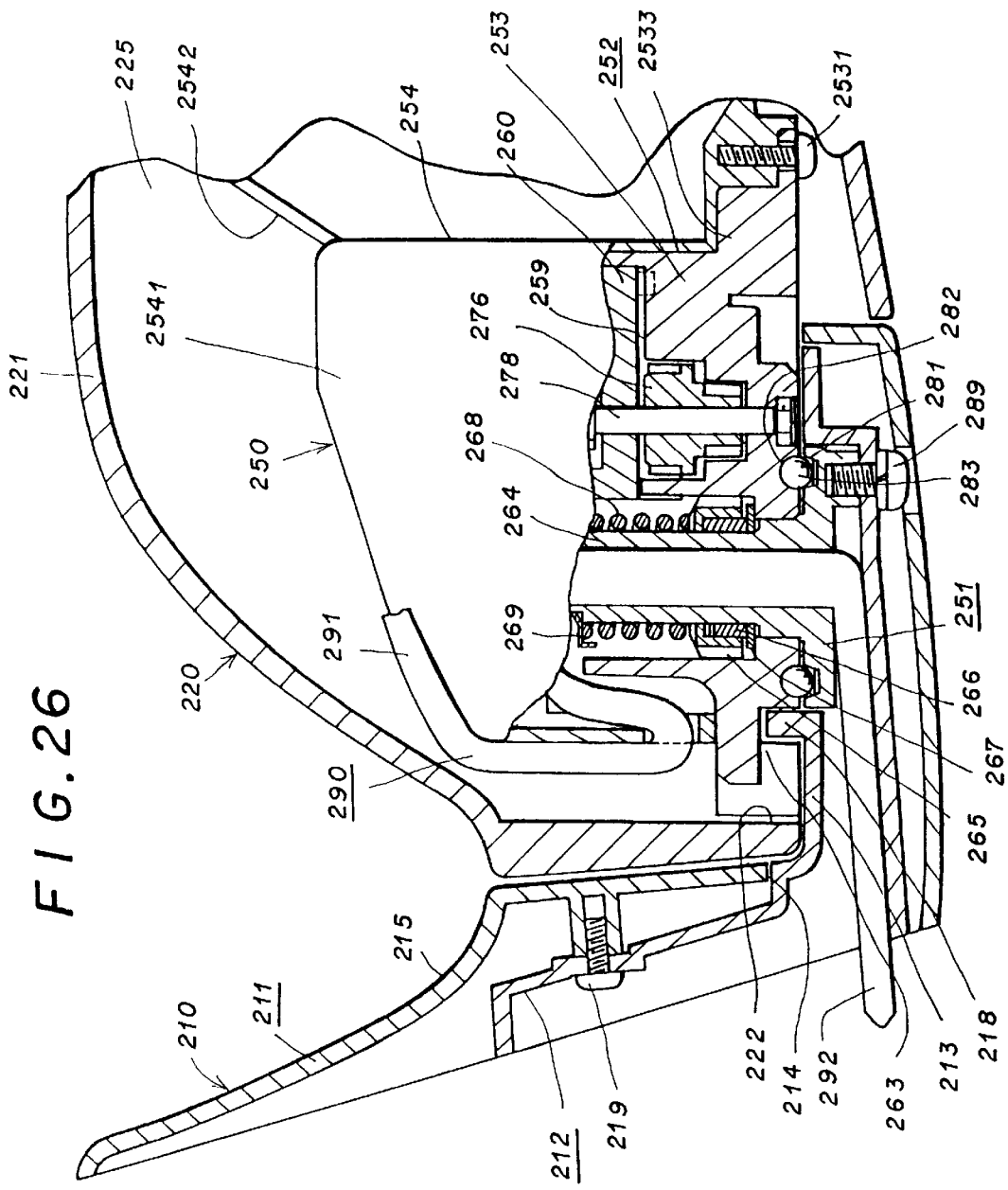
FIG. 26 is a sectional view of the rearview mirror, taken along the line I—I in FIG. 25.

Now the assembled status of the motor-driven positioning unit 250 will be described in detail below with reference to FIGS. 24 to 26.

The base 210 consists of the base body 211 and base cover 212 as having previously been described. They are made of a synthetic resin. The base body 211 is assembled as secured with screws 219 to the base cover 212 with the portion 213 thereof passed through the opening 216 in the base cover 212. The housing 220 is formed in the general shape of a box also made of a synthetic resin and open at the front thereof. The opening 222 is formed in the bottom area of the housing 220 that corresponds to the portion 213 of the base body 211. The studs to which the positioning unit 250 is to be fixed are formed on the rear wall 225 of the housing. As previously mentioned, the studs are formed each in the shape of an internally threaded cylinder integral with the rear all 225 of the housing.

The positioning unit 250 consists of the mechanism which turns the housing 220 and the support carrying the turning mechanism. The support consists of the stationary member 251 and rotary member 252, both made of a synthetic resin. The stationary member 251 has the general shape of a plate. The rotary member 252 consists of the member 253 and the member 254 separable from the member 253 as having previously been described. The member 253 is designed in the general shape of a hollow box open at the top thereof. The member 253 has provided therein a bearing 258 and bridge seat 259 formed integrally therein. A bridge 260 is mounted and fixed on the bridge seat 259. The member 253 has formed integrally therewith at one end thereof the projection 2533 which receives the member 254. The seat 2532 to receive the member 254 in FIG. 23 is formed on the circumference of the cylindrical portion of the member 253 in a plane in which the top of the projection 2533 also lies. The member 254 consists of the cover 2541 and extension 2542 as having previously been described. The cover 2541 has the shape of a hollow box open at the bottom thereof. When the cover 2541 is fitted onto the member 253, they will form a closed container. The member 254 has formed on the inner wall of the opening thereof that is fitted onto the member 253 a step which is to be fitted on the projection 3533 of the member 253. Only a part of the extension 2542 is illustrated. However, it has the general shape of a shallow box open at the front thereof. It has formed on the circumference thereof fixtures which are to be secured to the seats of the housing and on the inner wall thereof seats to which the tilting mechanism is to be fixed. To fix the member 254 to the member 253, the opening end face of the cover 254 is put into contact with the seat 2532 of the member 253 and step on the inner wall of the opening is put into contact with the projection 2533 of the member 253, then the cover 2541 is fitted onto the member 253, and screws 2531 are driven into the member 254 from under the member 253.

The shaft 264 is hollow and has longitudinally extending flat faces formed on parts of the circumference thereof. It is formed integrally with the stationary member 251. The stationary member 251 is installed to the rotary member 252 with the bearing 258 fitted on the shaft 264. The shaft 264 has a gear 265 fitted on a part thereof beyond the rotary member 252 in such a manner that the gear 265 can rotate and slide on the shaft 264. In addition, there is provided between the gear 265 and stationary member 251 a member 266 that forms a clutch together with the gear 265. The member 266 is formed generally like a ring that has a pawl on the end face thereof directed toward the gear 265. The member 266 is inserted in the hollow shaft 264 and blocked against rotation by the flat faces formed on the parts of the circumference of the shaft 264. There is formed in the end face of the gear 265 facing the member 266 a recess in which the pawl on the member 266 is engaged. The gear 265 is so fitted on the shaft 264 that the pawl on the member 266 is engaged in the recess therein. A seat plate 267 is disposed between the member 266 and stationary member 251. It is fitted on the shaft 264 while being in contact with a portion of the rotary member 252 that is higher than the stationary member 251. Also a coil spring 268 is disposed between the gear 265 and a spring seat 269 fixed to the free end of the shaft 264 and inserted in the shaft 264 to maintain the engagement of the pawl on the member 266 in the recess in the gear 265 and force the gear 265, member 266 and seat plate 267 toward the rotary member 252.

A motor 271 is fixed on the bridge 261 with the drive shaft thereof passed through a hole in the bridge 260. A worm is fixed by means of a coupling to a portion of the motor shaft that is protruded from the bridge 260. The worm is disposed below the bridge 260 and held by a bearing in the member 253. The worm wheel is fitted and fixed on the shaft of another worm. A coaxial gear is disposed to couple the worm wheel to the second worm and a spur gear to a gear which is in mesh with the gear 265. FIG. 26 shows only the coaxial gear 277 among these gears. The sector recesses 281 which retain the housing 220 in the viewing position are formed in the surface of the stationary member 251 that is opposite to the member of the rotary member 252 concentrically with the shaft 264. Balls 283 are held in concavities 282 in the rotary member 252. The rotary member 252 is fitted on the shaft 264 with the balls 283 put in the sector recesses 281.

The cable 290 is passed through the inner space of the base body 211 and hole in the shaft 264, and some of the wires of the cable 290 are connected to the drive circuit for the motor 271 in the positioning unit 250 and the other wires are led out of the positioning unit 250 through the opening in the member 254.

To install the positioning unit to the housing, for example, some wires 291 of the cable 290 are first connected to the drive circuit of the motor in the tilting mechanism 240, the stationary member 251 is placed in the opening 222 in the housing 220, the fixtures on the extension 2542 bolted to the seats on the housing 220 as having previously been described, and the stationary member 251 is fixed to the portion 213 of the base body 211 with the screws 289. The positioning unit 250 is connected to the controller located inside the car body y connecting the end 292 of the cable 290 to the controller by means of the connector.

The housing 220 is turned to the viewing position or first parking position in the same manner as with the other positioning units. Namely, when the motor 271 is put into run, the gear in mesh with the gear 265 is rotated on its own axis and about the gear 265 to turn the rotary member 252 and housing 220 about the shaft 264 to the viewing position. When the motor 271 is put into reverse run, the gear in mesh with the gear 265 is rotated reversely on its own axis and reversely about the gear 265 to turn the housing 220 to the first parking position. The housing 220 in the viewing position is blocked against turning by the balls 283 abutting the ends of the sector recesses 281 in the stationary member 251. The housing 220 can be manually turned as in the following. Namely, when the housing 220 is pressed by hand while the motor 271 is out of operation, the gear 265 and member 266 of the clutch are disengaged from each other to permit the rotary member 252 and housing 220 to turn together about the shaft 264. Also, then a person or thing touches or hits the housing 220 in the viewing position, the gear 265 and member 266 of the clutch are disengaged from each other to permit the rotary member 252 and housing 220 to turn together about the shaft 264.

The housing 220 in the first or second parking position is blocked against turning with the projection 218 on the base 210 engaged into the concavity 257 in the rotary member 252 or the concavity 227 in the member 254 as having previously been described. As seen from FIG. 25, the projection 218 is formed integrally on a portion of the base body 211 and in the form of a sector concentric with the housing 220. As shown in FIG. 26, the rotary member 252 is so formed that the bottom 262 thereof is nearly flush with the bottom of the housing 220 when the positioning unit 250 is set in the housing 220 and the fixtures of the member 254 are fixed to the studs 223 on the housing 220. The member 253 and housing 220 have formed in the bottoms thereof a recess into which the projection 218 is engaged. The recess is a partially fragmentary circular recess. One end of the recess is the concavity 257 formed in the lateral side of the member 253 and the other end is the concavity 227 formed in the portion of the member 254 that is located in the opening 222 in the housing 220. The recesses 228 and 263 which connect the concavities 257 and 227 to each other are formed in the bottoms of the portions of the members 253 and 254 that are located in the opening 222 in the housing 220. The concavity 257 is so located that one end of the projection 218 is engaged therein when the rotary member 252 is turned along with the housing 220 to the first parking position, while the concavity 227 is so located that the other end thereof is engaged therein when the rotary member 252 is turned along with the housing 220 to the second parking position. To fix the stationary member 251 to the base 210, the projection 218 is placed in the circular recess formed by the concavities 257 and 287 and recesses 263 and 228, and the portion 213 of the base body 211 and the stationary member 251 are secured to each other with the screws 289.

When the housing 220 is turned to the first parking position, the projection 218 is engaged into the concavity 227 in the rotary member 252 to block the rotary member 252 and housing 220 against further turning. Reversely, when the housing 220 is turned to the second parking position, the projection 218 is engaged into the concavity 257 in the member 254 to block the rotary member 252 and housing 220 against turning.

Also in this rearview mirror, the rotary member 252 has provided therein another concavity 257' formed symmetrically with the concavity 257 with respect to the longitudinal center axis of the rotary member 252. In case the positioning unit 250 is installed to a base-housing set which is to be installed to the left-hand door of a car body, the projection 218 is engaged into this concavity 257' to block the housing 220 in the first parking position against further turning. Similar to the rearview mirror having previously been described with reference to FIGS. 2 to 11, an identical positioning unit 250 can be installed to the base-housing set even if the housing 220 is so designed as to thinner at the portion thereof before the center axis of revolution in order to have a balance in style with the car body.

Figure 27:
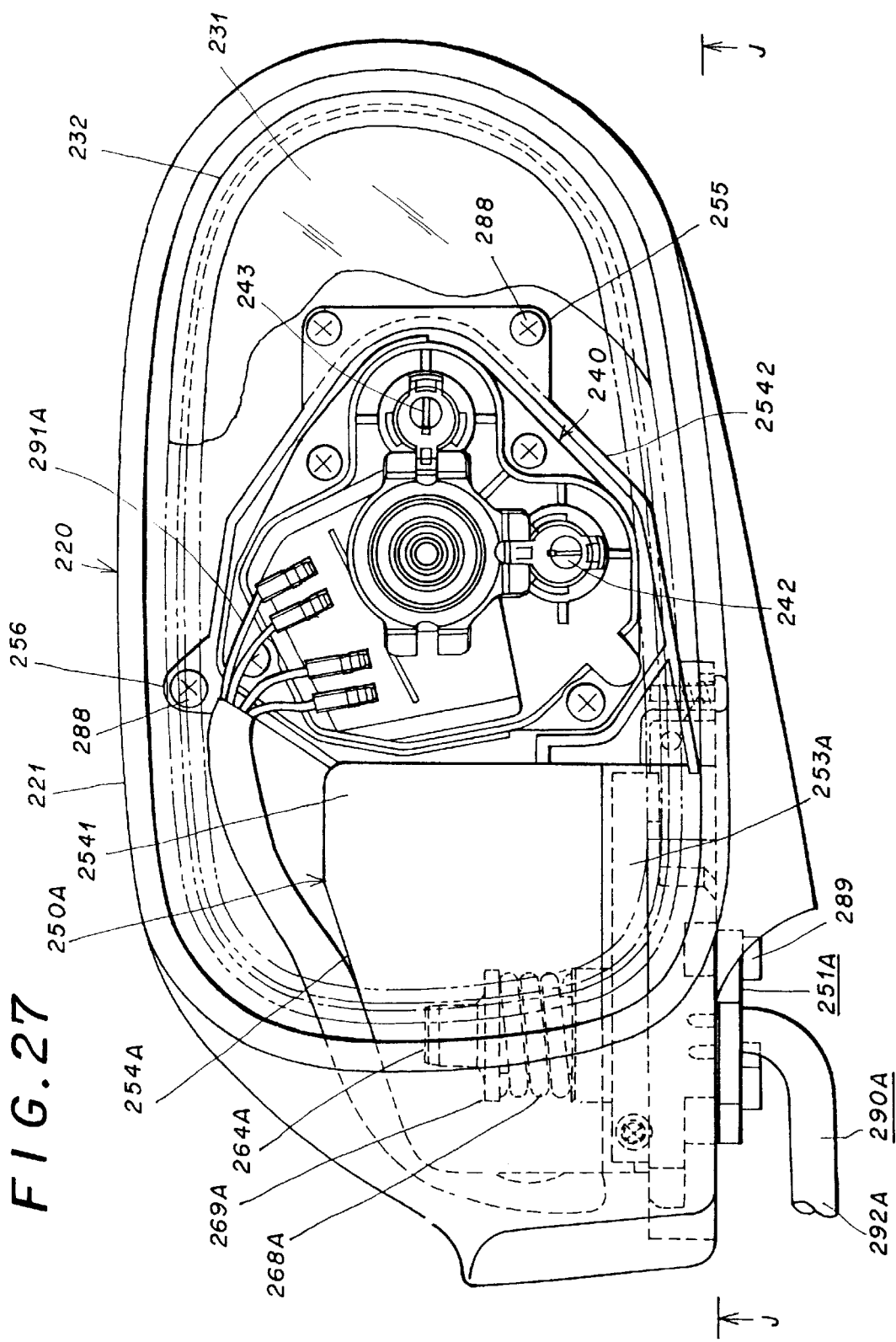
FIG. 27 is a front view of another rearview mirror system obtained by assembling the system in FIG. 22.
Figure 28:
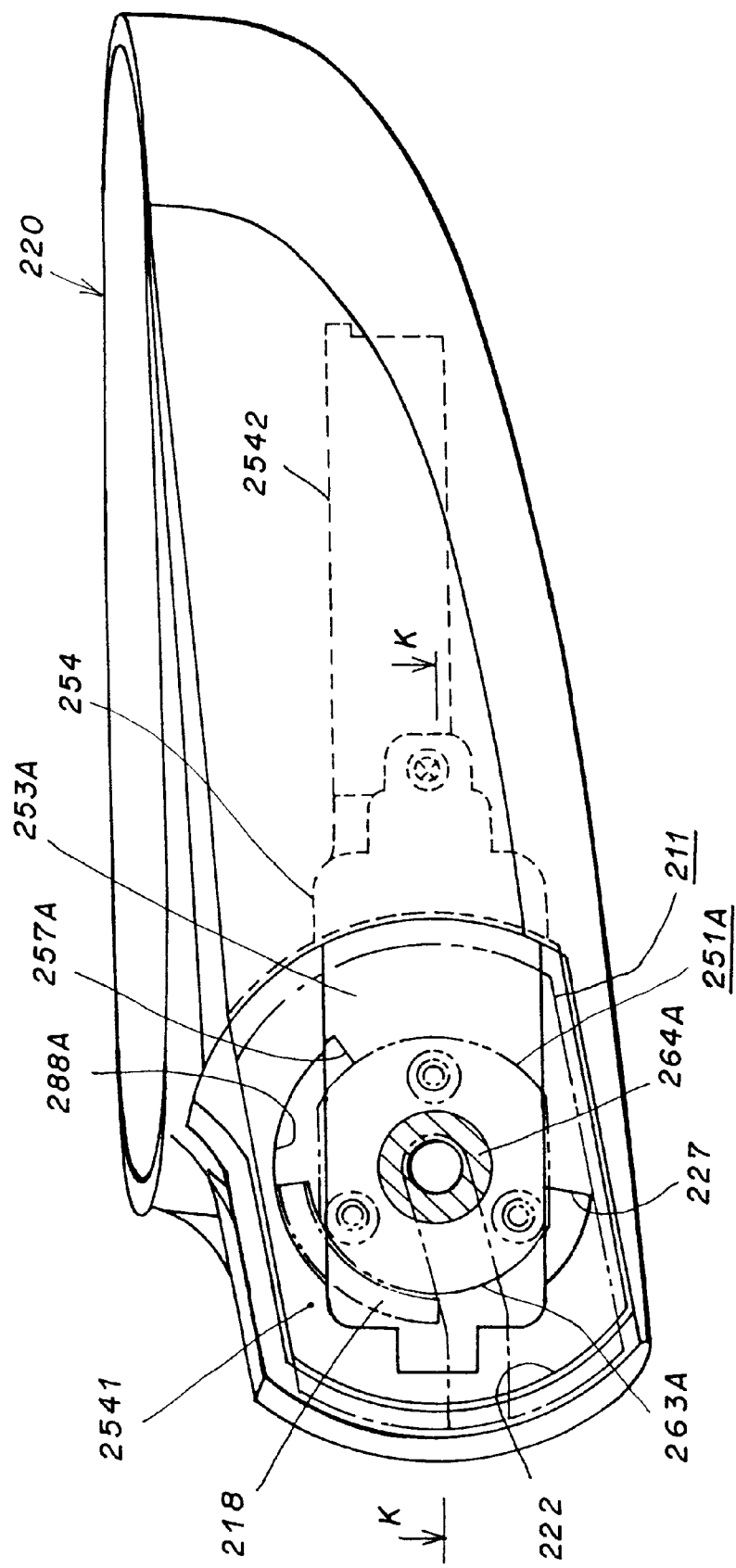
FIG. 28 is a bottom view taken along the line J—J in FIG. 27.
Figure 29:
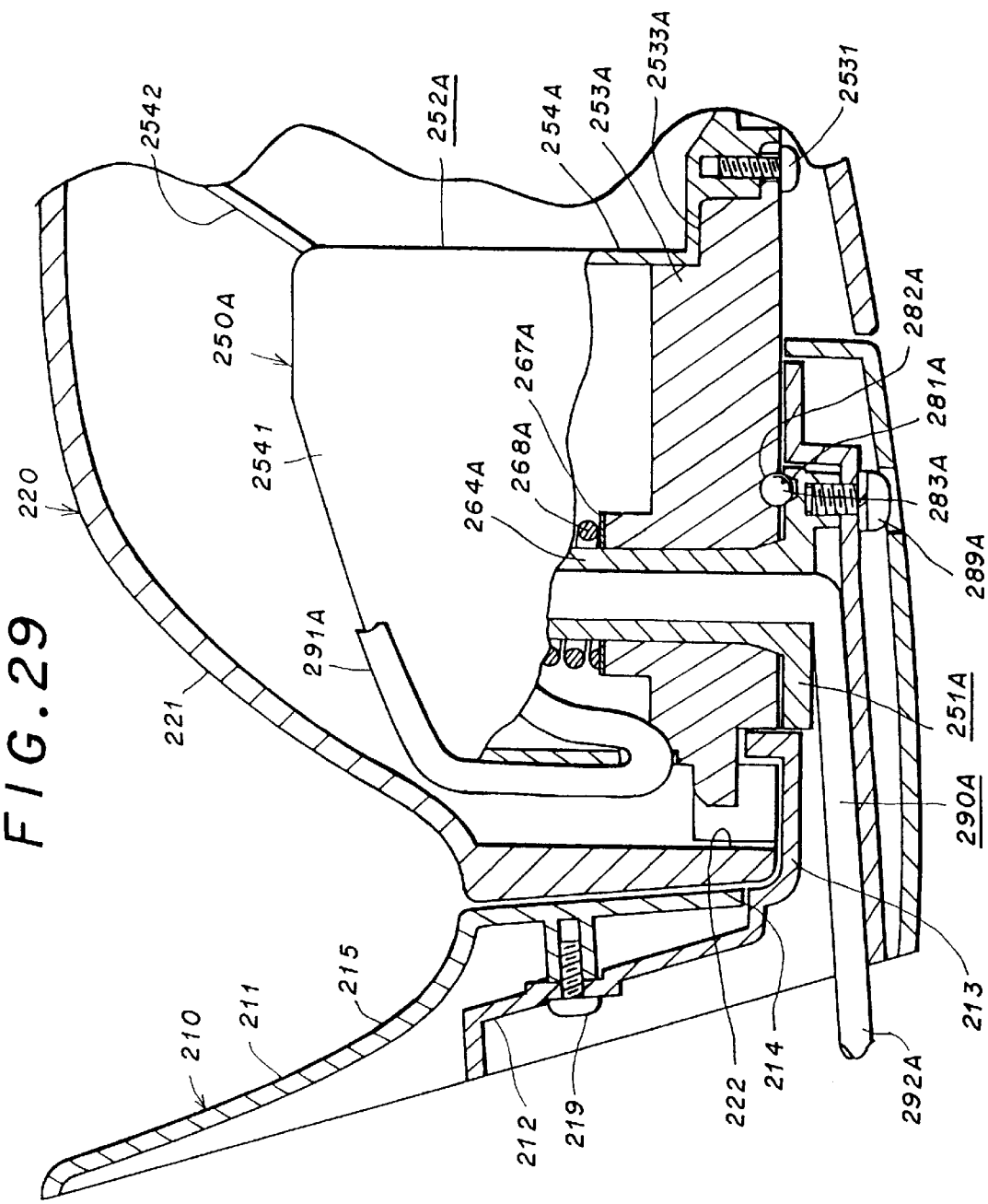
FIG. 29 is a sectional view taken along the line K—K in FIG. 28.

FIGS. 27 to 29 show in detail the assembled status of the manual positioning unit.

The base 210 and housing 220 are the same as those in the rearview mirror having previously been described with reference to FIGS. 24 to 26.

Like the positioning unit 250, the positioning unit 250A consists of a mechanism which turns the housing 220 and a support which carries the turning mechanism. The support consists of a stationary member 251A and rotary member 252A, both made of a synthetic resin. Similar to the stationary member 251, the stationary member 251A is formed the general shape of a plate. The rotary member 252A comprises a member 253A formed nearly like a plate having a projection 2533A formed integrally therewith at one end thereof and a seat 2532 formed on the lateral side thereof and which is flush with the projection 2533A as shown in FIG. 22. The projection 2533A and seat 2532 are designed the same in size and shape as those in the motor-driven positioning unit 250. The rotary member 252A has another member identical to the member 254A in the rearview mirror having previously been described with reference to FIGS. 24 to 26. To install the member 253 to the member 254, a step on the inner wall of the opening in the cover 2541 is put into contact with the end face of the opening and the projection 2533A with the seat, the member 253 is fitted into the cover 2541 and the members 253 and 254 are fixed to each other by driving screws 2531 into the member 254A from under the member 253A.

A hollow shaft 264A is formed integrally with the stationary member 251A. The stationary member 251A is coupled to the rotary member 252A by inserting the shaft 264A into a bearing 258A. A coil spring 268A is mounted on a portion of the shaft 264A that protrudes from the rotary member 252A. The coil spring 268A is compressed by a spring holder provided at the feed end of the shaft 264 and forces the rotary member 252A toward the stationary member 251A by means of a seat plate 267A. Further, the stationary member 251A has formed therein concentrically with the shaft 264A sector recesses 281A in which balls 283A held in concavities 282A in the rotary member 252A are engaged. A cable 290A is passed through the inner space of the base body 211 and hole in the shaft 264A and led out of the positioning unit from an opening in the member 254A of the rotary member 252A.

To install the positioning unit 250A to the housing 220, for example, end 291A of the cable 290A is connected to the drive circuit of the motor in the tilting mechanism, then the stationary member 251A is placed in the opening 222 in the housing 220, the positioning unit 250A is put into the housing 220, the fixtures on the extension 2542 are bolted to the seats on the housing 220, and the stationary member 251A is fixed to the portion 213 of the base body 211 with the screws 289.

Figure 30:
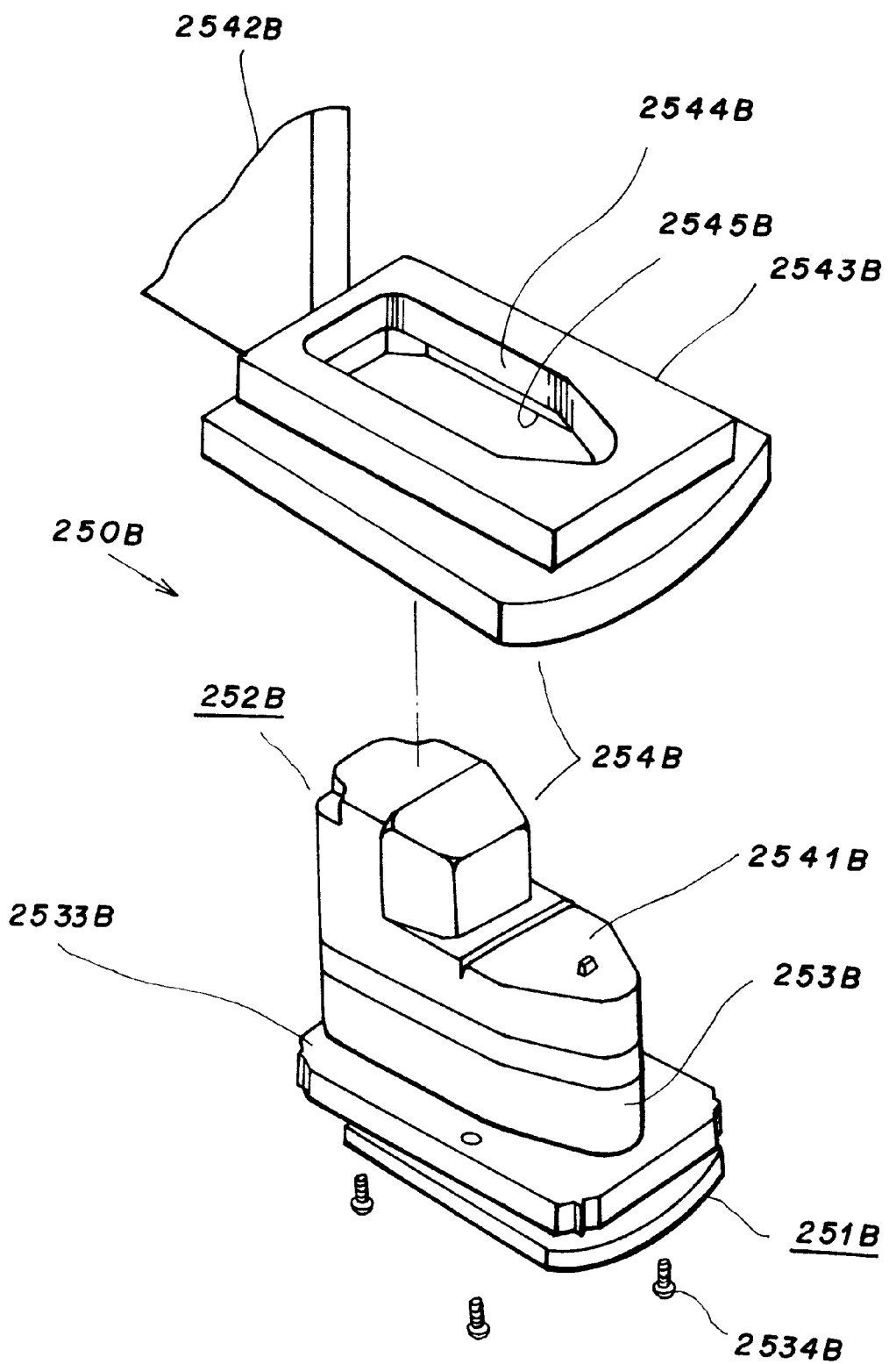
FIG. 30 is an exploded perspective view of a rearview mirror obtained by assembling the system in FIG. 22, having a portion thereof modified.
Figure 31:
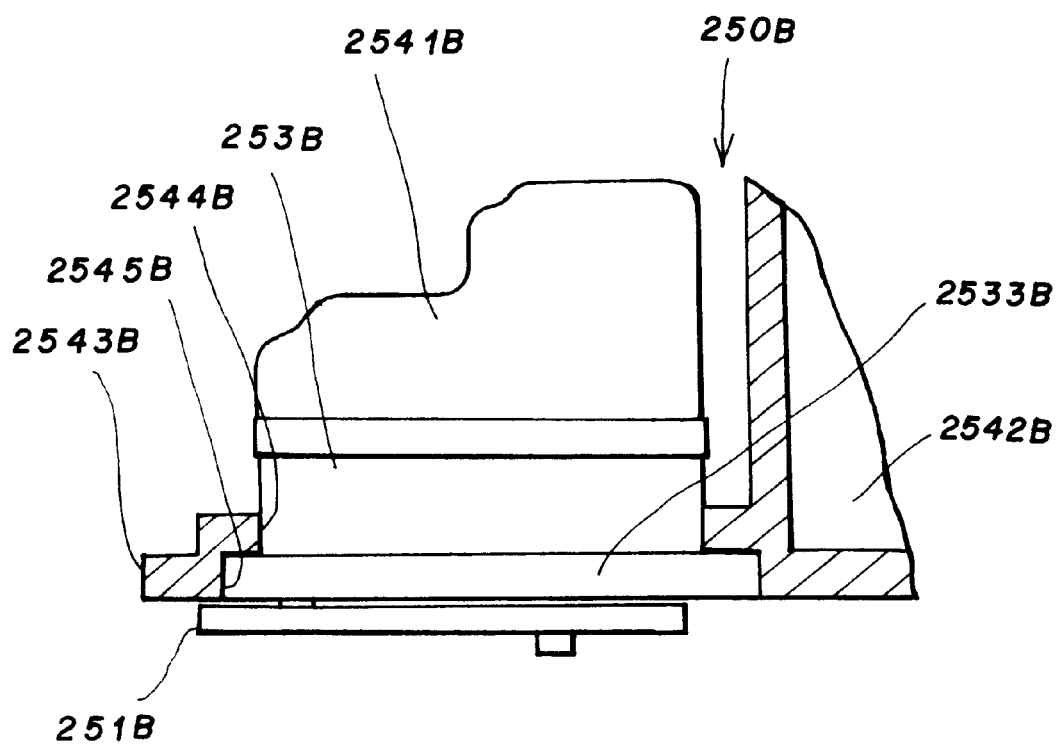
FIG. 31 is a sectional view showing the assembly of the rearview mirror in FIG. 30.

The housing 220 can be turned to the viewing position or first parking position by pressing it by hand. When pressed, the housing 220 is turned about the shaft 264A. When it has been turned to the viewing position, the balls 283A abut the end of the sector recess 281A in the stationary member 251A to limit the housing 220 from turning. When the housing 220 in the viewing position is pressed by a person or thing, it is turned to the first or second parking position. As in the rearview mirror having been described with reference to FIGS. 24 to 26, the housing 220 in the first parking position is blocked against turning by the projection 218 engaged into the concavity in the member 253A, one end of the partially fragmentary circular recess formed in the bottoms of the members 253A and 254A concentrically with the shaft. The housing 220 in the second parking position is blocked against turning by the projection 218 engaged into the concavity in the member 254A, the other end of the circular recess. The member 253A has another concavity 257' formed therein concentrically with the concavity 257 with respect to the longitudinal center axis of the rotary member 252A. This concavity 257' is to be used when the positioning unit 250A is installed in the base-housing set of a rearview mirror which is to be installed at the left-hand door of a car, to block the housing against turning in the first parking position. The positioning unit 250A can be installed to a housing 220 designed thinner at the portion thereof before the center axis of revolution in order to take a balance in style with a car body style FIGS. 30 and 31 show a positioning unit 250B for use in a rearview mirror according to the present invention. As in the rearview mirror having previously been described with reference to FIGS. 24 to 29, the positioning unit 250B has a rotary member consisting of a member in which a turning mechanism is housed and a member separable from this member. The latter member has a cover which forms a container when it is fitted to the former member, and an extension from the cover. The cover and extension are separable from each other. By preparing a plurality of such extensions, a same positioning unit 250B can be installed to a base-housing set of a rearview mirror which is to be installed to the right-hand door of a car, a base-housing set of a rearview mirror which is to be installed to the left-hand door of the car and to each of base-housing sets different in shape from one another and which are to be installed to such doors.

The base, housing, mirror unit and tilting mechanism (not shown) are the same as those in the rearview mirror having previously been described with reference to FIGS. 24 to 29.

The positioning unit 250B is for example a motor-driven one, and consists of a turning mechanism and a support which carries the turning mechanism. The support consists of a stationary member 251B and rotary member 252B. The stationary member 251B is shaped nearly like a plate. The rotary member 252B consists of a member 253B and a member 254B separable from the member 253B. The member 253B has the general shape of a box open at the top thereof and has a projection 2533B formed integrally at the bottom thereof. The member 254B consists of a cover 2541B and extension 2542B. The cover 2541B has the general form of a hollow box open at the bottom thereof. It is so designed that, when fitted on the member 253B, it forms a container together with the member 253B. The extension 2542B is separable from the cover 2541B and has a holder 2543B formed integrally at the end thereof on the side of the member 254. The extension 2542B has the shape of a shallow box. It has formed on the circumference thereof fixtures that are to be fixed to the studs 223 of the housing 220 and on the rear wall thereof seats to which the tilting mechanism 240 is to be fixed. The fixtures and seats are designed to have the same structures as the fixtures 255 and 256 and seats 226, respectively, in the rearview mirror having previously been described with reference to FIGS. 24 to 29. The holder 2543B is formed like a plate having formed therein an opening 2544B. The opening 2544B has a shape corresponding to the horizontal sectional profile of a portion 2531B of the member 253B. The holder 2543B had formed in the bottom thereof a step 2545B to which the projection 2533B is set. As shown in FIG. 31, the cover 2541B is coupled to the extension 2542B by setting the step 2545B around the opening 2544B in the member 254B to the projection 2533B of the member 253B and driving screws 2534B into screw holes in the holder 2543B through through-holes in the projection 2533B of the member 253B.

The turning mechanism is set and closed in the container formed by the member 253B and cover 2541B. As in the other positioning units having been described, the turning mechanism itself consists of a shaft fixed to the stationary member 251B, gear mounted on the shaft by means of a clutch, motor installed in a portion 2531B of the rotary member 252B, gear train which transmits the power of the motor to the gear on the shaft, balls held in the portion 2531B, sector recesses formed in the stationary member 251B, etc.

The positioning unit 250B is to be installed in the housing 220 in the same manner as in the other positioning units having been described. The installation will be described with reference to FIG. 22 as well. The cable led through the inner space of the base body 211 is passed through the shaft of the turning mechanism 240, some wires of the cable are connected to the motor in the turning mechanism 240, the other wires are led out from the opening in the cover 2541B of the member 254B and connected to the drive circuit of the motor in the tilting mechanism, then the tilting mechanism is fixed along with the mirror unit to the seats on the extension 2542 with screws 287, the stationary member 251B is placed in the opening 222 in the housing 220, the fixtures on the extension 2542B are fixed to the studs 223 on the housing 220 with screws 288, and the stationary member 251B is secured to the base 210 with screws 289.

Also in the rearview mirror using this positioning unit 250B, the housing 220 is turned to the viewing position or first parking position as in the following. Namely, the motor included in the positioning unit 250B drives a gear of the gear train that is in mesh with the gear on the shaft. The gear of the gear train rotates on its own axis and about the gear on the shaft while being in mesh with the latter, to thereby turn the rotary member 252B along with the housing 220. When the housing 220 is pressed by hand, the clutch disengages the gear on the shaft from the stationary member 251B and thus the rotary member 252B is permitted to turn along with the gear on the shaft about the shaft between the viewing position and first parking position. When a person or thing touches or hits the housing 220, the clutch will disengages the gear on the shaft from the rotary member 252B and thus the rotary member 252B is permitted to turn along with the housing 220 about the shaft to the second parking position. In the viewing position, the housing 220 is held against turning by the balls held in the rotary member 252B and which abut the ends of the sector recesses in the stationary member 251B. In the first parking position, the housing 220 is held against turning by the projection 218 on the base 210 that is engaged into the concavity in the rotary member 252B. In the second parking position, the housing 220 is block against turning by the projection 218 engaged into the concavity in the holder 2543B of the member 254B.

Figure 32:
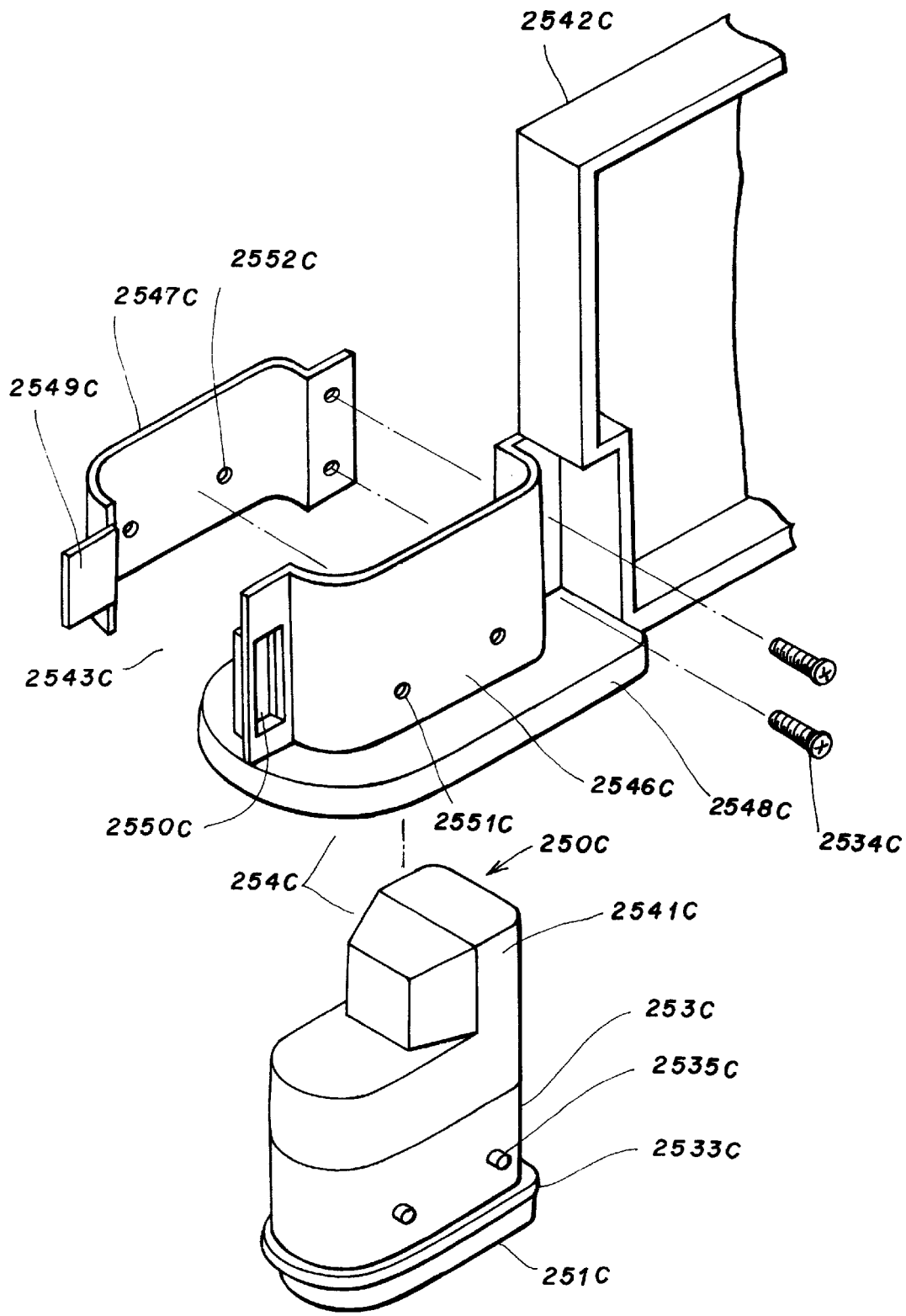
FIG. 32 is an exploded perspective view of another rearview mirror obtained by assembling the system in FIG. 22, having a portion thereof modified.
Figure 33:
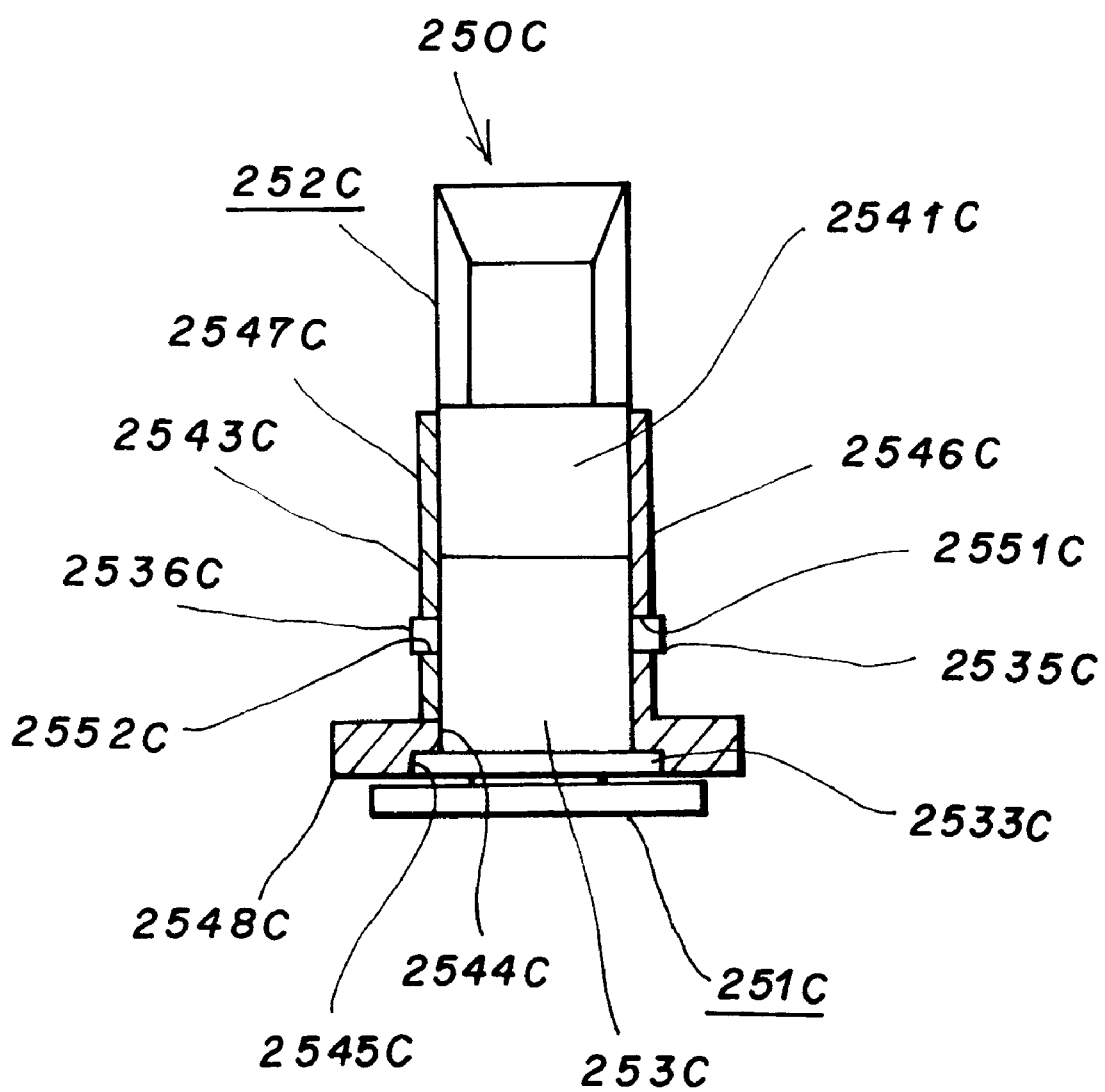
FIG. 33 is a sectional view showing the assembled status of the rearview mirror in FIG. 32.

FIGS. 32 and 33 show a positioning unit 250C for use in a rearview mirror according to the present invention. As in the rearview mirror having previously been described with reference to FIGS. 30 and 31, the positioning unit a member separable from a member of the rotary member in which a turning mechanism is installed. The separable member has a separable cover and an extension from the cover. By preparing a plurality of such extensions, a same positioning unit can be installed to a base-housing set of a rearview mirror which is to be installed to the right-hand door of a car body, a base-housing set of a rearview mirror which is to be installed to the left-hand door, and to each of base-housing sets for various car doors and which are different in shape from one another.

The base, housing, mirror unit and tilting mechanism are not illustrated in FIGS. 32 and 33, but they are the same as those in the rearview mirror having been described with reference to FIGS. 24 to 29.

The positioning unit 250C is for example a motor-driver one. It consists of a turning mechanism and a support which carries the turning mechanism. The support consists of a stationary member 251C and a rotary member 252C. The rotary member 252C consists of a member 253C and a member 254C separable from the member 253C. The member 253C is generally designed in the shape of a hollow box open at the top thereof and having a projection 2533C formed integrally at the lower portion thereof. The member 254C consists of a cover 2541C and an extension 2542C. The cover 2541C has the general form of a hollow box open at the bottom thereof. When fitted on the member 253C, the cover 2541C forms a container together with the member 253C. The extension 2542C is separated from the cover 2541C and has a holder 2543C formed integrally at the end thereof on the side of the cover. The extension 2542C has the form of a shallow box. It has formed on the circumference thereof fixtures which are to be fixed to the studs 223 on the housing 220 and on the rear wall thereof seats to which the tilting mechanism is secured. The fixtures and seats are the same as the fixtures 255 and 256 and seats 226 in the rearview mirror having been described with reference to FIGS. 24 to 29. The holder 2543C consists of two U-shaped portions 25436C and 2547C and a plate-like portion 2548C in which an opening 2544C is formed. The opening 2544C has such a size and shape that the member 253C is fitted therein. There is formed along the opening 2544C a step 2545C to which the projection 2533C is closely fitted. The portion 2547C is removable from the portion 2546C. The portions 2546C and 2547C are so shaped that, when coupled to each other, they will define a hole of which the shape corresponds to the horizontal sectional profile of the member 253C. FIG. 33 shows the fixation of the member 254C to the member 253C. The container formed by the member 253C and cover 2541C is introduced into the opening 2544C in the portion 2548C of the holder 2543C from under the portion 2548C until the projection 2533C fits the step 2545C along the opening 2544C. The portion 2547C is applied to the lateral sides of the member 253C and cover 254C. A tongue piece 2546C at the end of the portion 2547C is inserted into a hole 2550C formed in the free end portion of the portion 2546C and screws 2543C are driven into screw holes in the portions 2546C and 2547C. The member 253C has pins 2535C on one side of the member 253C and pins 2536C on the other side. These pins are destined to prevent disengagement from the holder 2543C of the container formed by the member 253C and cover 2541C. When the container formed by the member 253C and cover 2541C is inserted into the holder 2543C, the pins enter holes 2551C and 2552C formed in the portions 2546C and 2547C, respectively.

The turning mechanism is also a motor-driven one, for example. It is set and closed in the container formed by the member 253C and cover 2541C. As in the other positioning units having been described, the turning mechanism itself consists of a shaft fixed to the stationary member 251C, gear mounted on the shaft by means of a clutch, motor installed in the rotary member 253C, gear train which transmits the power of the motor to the gear on the shaft, balls held in the member 253C, sector recesses formed in the stationary member 251C, etc.

The positioning unit 250C is to be installed in the housing 220 in the same manner as in the positioning unit having been described with reference to FIGS. 30 and 31. The installation will be described with reference to FIG. 22 as well. The cable led through the inner space of the base body 211 is passed through the shaft of the turning mechanism, some wires of the cable are connected to the motor in the turning mechanism, the other wires are led out of the positioning unit 250C from the opening in the member 253C and connected to the drive circuit of the motor in the tilting mechanism 240, then the tilting mechanism 240 is fixed along with the mirror unit to the seats on the extension 2542C with screws 287, the stationary member 251C is placed in the opening 222 in the housing 220, the fixtures on the extension 2542C are fixed to the studs 223 on the housing 220 with screws 288, and the stationary member 251C is secured to the base 210 with screws 289.

The housing 220 is turned to the viewing position or first parking position as in the following. Namely, the motor included in the positioning unit 250C drives a gear of the gear train that is in mesh with the gear on the shaft. The gear of the gear train rotates on its own axis and about the gear on the shaft while being in mesh with the latter, to thereby turn the rotary member 252C along with the housing 220. When the housing 220 is pressed by hand, the clutch disengages the gear on the shaft from the stationary member 251C and thus the rotary member 252C is permitted to turn along with the gear on the shaft about the shaft between the viewing position and first parking position. When a person or thing touches or hits the housing 220, the clutch will disengages the gear on the shaft from the rotary member 252C and thus the rotary member 252C is permitted to turn along with the housing 220 about the shaft to the second parking position. In the viewing position, the housing 220 is held against turning by the balls held in the rotary member 252C and which abut the ends of the sector recesses in the stationary member 251C. In the first parking position, the housing 220 is held against turning by the projection 218 on the base 210 that is engaged into the concavity in the rotary member 252C. In the second parking position, the housing 220 is block against turning by the projection 218 engaged into the concavity in the holder 2543C of the member 254C.

It should be noted that the embodiments according to the present invention have been described on the assumption that the driver's seat is disposed in the center of a car body, for simplicity of illustration and description. Actually, however, the driver's seat is disposed in a position nearer to any one of the rearview mirrors installed on the right- and left-hand doors of the car. The angle defined between the mirror surface and the driver's looking at the mirror when the housing is in the viewing position is different between a rearview mirror installed to the left of a car body and a one installed to the right. Accordingly, it is necessary that the positions of the ends of the sector recesses in the stationary member, which the balls held on the rotary member abut to block the housing against turning in the viewing position, and the circumferential length of the projection which blocks the housing against turning in the parking position, should be different from the right-hand rearview mirror to the left-hand one. In the rearview mirror system according to the present invention, the housing in the second parking position is blocked against turning by the engagement of the projection on the base into the concavity in the rotary member, not by any contact between the ends of the sector recesses and the balls or half balls formed integrally with the rotary member. The base is produced as adapted for each of the right- and left-hand rearview mirrors. Therefore, a same positioning unit can be used with both the base-housing sets for the right- and left-hand rearview mirrors. Even if the angle defined between the mirror surface and driver's looking at the mirror is greatly different between the right- and left-hand rearview mirrors and so it is necessary to use a positioning unit of one such angle for one of the right- and left-hand rearview mirrors while using a positioning unit of another angle for the other rearview mirror, the necessary positioning units count only four (two different motor-driven and two different manual positioning units) which is much less than the number of positioning unit types required for the conventional rearview mirrors.

What is claimed is:

1. A positioning unit for turning a housing of a rearview mirror system to one of a viewing position wherein the housing protrudes laterally from a car body, a first parking position wherein the housing is directed toward a car tail and a mirror side faces a lateral side of the car body, or a second parking position wherein the housing is directed toward a car head and a rear side faces the lateral side of the car body, comprising:

a base adapted to be fixed to the car body;

a stationary member adapted to be fixed to the base;

a rotary member including a main portion adapted to be coupled to the housing and a portion separable from the main portion; and a turning mechanism for turning the main portion and the housing to one of the viewing position or the first parking position, the main portion having formed therein a concavity for engaging a projection on the base to block the housing against further turning beyond one of the first or second parking positions, the separable portion having formed therein a concavity for engaging the projection on the base to block the housing against further turning beyond the other parking position.

2. A positioning unit as set forth in claim 1, wherein the turning mechanism comprises a shaft provided in the stationary member to support the main portion, a gear mounted on the shaft, a motor provided on the main portion, a gear train disposed between the motor and the gear on the shaft, a gear of the gear train being in mesh with the gear on the shaft and being rotated on its own axis and about the gear on the shaft, a clutch disposed between the gear on the shaft and the shaft to disengage the gear on the shaft from the shaft only when the housing is applied with an external force, sector recesses formed in the stationary member and protrusions formed on the main portion which abut the ends of the sector recesses to set the main portion in the viewing position.

3. A positioning unit as set forth in claim 1, wherein the turning mechanism comprises a shaft provided in the stationary member to support the main portion, a spring disposed to force the main portion toward the stationary member, sector recesses formed in the stationary member, and protrusions formed on the main portion and which abut the ends of the sector recesses to set the main portion in the viewing position.

4. A rearview mirror system for vehicles, comprising:

a base adapted to be fixed to a car body;

a housing incorporating a mirror;

a positioning unit including a stationary member coupled to said base, a rotary member coupled to said housing, and a turning mechanism disposed between said stationary and rotary members to turn said rotary member along with said housing from a viewing position wherein said housing protrudes laterally from the car body to one of a first parking position wherein said housing is directed toward the back of the car body or a second parking position wherein said housing is directed toward the front of the car body; and means for blocking said housing against further turning beyond each of said parking positions, said means including a projection provided on said base, and a plurality of concavities provided on any of said housing or rotary member for engaging said projection to block said housing against further turning beyond each of said parking positions.

5. A rearview mirror system for vehicles as set forth in claim 4, wherein said rotary member is fitted on a shaft provided on said stationary member, and pressed toward said stationary member by a spring provided between said rotary and stationary members, and said turning mechanism includes a sun gear mounted on said shaft, a clutch provided between said sun gear and stationary member, a planet gear disposed on said rotary member and in mesh with said sun gear, and a motor provided on said rotary member to rotate said planet gear about said sun gear.

6. A rearview mirror system for vehicles as set forth in claim 5, wherein said projection is provided on said base, and said concavities are provided on said rotary member.

7. A rearview mirror system for vehicles as set forth in claim 5, wherein said projection is provided on said base, and said concavities are provided on said rotary member and said housing.

8. A rearview mirror system for vehicles as set forth in claim 4, wherein said rotary member is fitted on a shaft provided on said stationary member, and pressed toward said stationary member by a spring provided between said rotary and stationary members.

9. A rearview mirror system for vehicles as set forth in claim 8, wherein said projection is provided on said base, and said concavities are provided on said rotary member.

10. A rearview mirror system for vehicles as set forth in claim 8, wherein said projection is provided on said base, and said concavities are provided on said rotary member and said housing.

11. A rearview mirror system for vehicles, comprising:
a base which is to be fixed to a car body;
a housing incorporating a mirror; and
a positioning unit including a stationary member coupled to said base, a rotary member coupled to said housing, and a turning mechanism disposed between said stationary and rotary members to turn said rotary member along with said housing from a viewing position where said housing protrudes laterally from the car body to a first parking position where said housing is directed toward the back of the car body or a second parking position where said housing is directed toward the front of the car body;
said housing having an opening formed in an area of said housing that is located concentrically with a center axis of revolution of the housing and faces said base, and having seats formed around said opening for the coupling of the rotary member to said housing, said positioning unit having fixtures which are to be coupled to said seats on the housing; and
said base having a projection extending toward said rotary member, said rotary member having a first concavity in which said projection is engaged to block said housing against turning in one of said parking positions, and said housing having a second concavity in which said projection is engaged to block said housing against turning in the other of said parking positions.

12. A rearview mirror system for vehicles as set forth in claim 11, wherein a space between a set of lines opposite to each other of a profile of said opening in the housing that is defined when the opening is projected onto a plane is gradually smaller as it goes toward outside of said housing.

13. A rearview mirror system for vehicles as set forth in claim 11, wherein said positioning unit is so formed that, when it is installed to the housing, the bottom of the rotary member is flush with the bottom of the housing, and the concavities formed in the rotary member and housing are defined by end portions of a partially fragmentary, generally circular recess formed in the bottom of the rotary member and housing concentrically with the center axis of revolution of the housing.

14. A rearview mirror system for vehicles as set forth in claim 11, wherein said rotary member has a third concavity formed symmetrically with said second concavity.

15. A rearview mirror system for vehicles as set forth in claim 11, wherein said rotary member is formed in the shape of a container, and said turning mechanism is installed in said container.

16. A rearview mirror system for vehicles, comprising:
a base which is to be fixed to a car body;
a housing incorporating a mirror and a mirror tilting mechanism; and
a positioning unit including a stationary member coupled to said base, a rotary member coupled to said housing, and a turning mechanism disposed between said stationary and rotary members to turn said rotary member along with said housing from a viewing position where said housing protrudes laterally from the car body to a first parking position where said housing is directed toward the back of the car body or a second parking position where said housing is directed toward the front of the car body;
said housing having a chamber located concentrically with a center axis of revolution of the housing and open in an area of the housing that faces said base, said positioning unit being so formed that an area of said rotary member that is to be coupled to said housing can be fitted in said chamber of the housing; and
said base having a projection extending toward said rotary member said rotary member having a first concavity in which said projection is engaged to block said housing against turning in one of said parking positions, and said housing having a second concavity in which said projection is engaged to block said housing against turning in the other of said parking positions.

17. A rearview mirror system for vehicles as set forth in claim 16, wherein said rotary member has a portion including an area of said rotary member that is to be coupled to said housing, and has a rest portion separably coupled to the portion of said rotary member, said portion forms a container together with said rest portion, and said turning mechanism is housed in the container.

18. A rearview mirror system for vehicles as set forth in claim 16, wherein said chamber has projection on a wall defining the chamber, and said rotary member has a concavity in which the projection is engaged when the container is housed in the chamber.

19. A rearview mirror system for vehicles as set forth in claim 16, wherein the bottom of the rotary member is flush with the bottom of the housing, and the concavities are defined by end portions of a partially fragmentary, generally circular recess formed in the bottom of the rotary member and housing concentrically with the center axis of revolution of the housing.

20. A rearview mirror system for vehicles as set forth in claim 16, wherein said rotary member has a third concavity formed symmetrically with said second concavity.

21. A rearview mirror system for vehicles, comprising:
a base adapted to be fixed to a car body;
a housing incorporating a mirror; and
a positioning unit including a stationary member coupled to said base, a rotary member coupled to said housing, and a turning mechanism disposed between said stationary and rotary members for turning said rotary member and said housing from a viewing position wherein said housing protrudes laterally from the car body to one of a first parking position wherein said housing is directed toward the back of the car body or a second parking position wherein said housing is directed toward the front of the car body;
said housing defining an opening located concentrically with a center axis of revolution of the housing and facing said base, said housing having seat member formed in a position apart from said opening for coupling the rotary member to the housing;
said rotary member having a portion for coupling said rotary member to said housing and a remainder portion which is separably coupleable to the portion, the portion having an extension extending toward the seat member of the housing and having fixtures for coupling said portion to said seat member of said housing; and
said base having a projection extending toward said rotary member, and said rotary member having concavities for engaging said projection to block said housing against further turning beyond each of said parking positions.

22. A rearview mirror system for vehicles as set forth in claim 21, wherein said concavities are defined by end portions of a partially fragmentary, generally circular recess provided in the portion forming said rotary member concentrically with the center axis of revolution of the housing.

23. A rearview mirror system for vehicles as set forth in claim 21, wherein a part of said portion except for the extension forms together with said rest portion a container in which said turning mechanism is installed.

24. A rearview mirror system for vehicles as set forth in claim 21, wherein the bottoms of said portion and rest portion of the rotary member are so formed as to be nearly flush with each other, and said concavities are defined by end portions of a partially fragmentary, generally circular recess provided in the bottom of said portion forming said rotary member concentrically with the center axis of revolution of the housing.

25. A rearview mirror system for vehicles as set forth in claim 21, wherein said rest portion of the rotary member has other concavities formed symmetrically with said concavities.

26. A rearview mirror system for vehicles, comprising:

a base adapted to be fixed to a car body;

a housing incorporating a mirror; and a positioning unit including a stationary member coupled to said base, a rotary member coupled to said housing, and a turning mechanism disposed between said stationary and rotary members for turning said rotary member and said housing from a viewing position wherein said housing protrudes laterally from the car body to one of a first parking position wherein said housing is directed toward the back of the car body or a second parking position wherein said housing is directed toward the front of the car body;

said housing defining an opening located concentrically with a center axis of revolution of the housing and facing said base, said housing having a seat member formed in a position apart from said opening for coupling the rotary member to the housing;

said rotary member having a portion for coupling said rotary member to said housing and a remaining portion which is separably coupled to the portion, said portion having an extension extending toward the seat member of the housing and having fixtures which are to be coupled to said seat member on the housing;

said base having a projection extending toward said rotary member, and said portion of the rotary member having a first concavity for engaging said projection to block said housing against further turning beyond one of said parking positions, and said remaining portion of the rotary member having a second concavity for engaging said projection to block said housing against further turning beyond the other parking position.

27. A rearview mirror system for vehicles as set forth in claim 26, wherein a part of said portion forming the rotary member except for the extension forms together with said rest portion a container, said extension adapted to be separable from the part forming the container, and said turning mechanism is installed in the container.

28. A rearview mirror system for vehicles, comprising:

a base adapted to be fixed on the right side of a car body;

a housing incorporating a mirror; and a positioning unit including a stationary member coupled to said base, a rotary member coupled to said housing, and a turning mechanism disposed between said stationary and rotary members for turning said rotary member and said housing from a viewing position wherein said housing protrudes laterally from the car body to one of a first parking position wherein said housing is directed toward the back of the car body or a second parking position wherein said housing is directed toward the front of the car body;

said base having a member extending toward said rotary member, and said rotary member having means for blocking said housing against further turning beyond each of said parking positions, said means being adapted to engage said member of said base in each parking position.

29. A rearview mirror system for vehicles, comprising:

a base which is to be fixed on the right side of a car body;

a housing incorporating a mirror; and a positioning unit including a stationary member coupled to said base, a rotary member coupled to said housing, and a turning mechanism disposed between said stationary and rotary members to turn said rotary member along with said housing from a viewing position where said housing protrudes laterally from the car body to a first parking position where said housing is directed toward the back of the car body or a second parking position where said housing is directed toward the front of the car body;

said base having a member extending toward said rotary member, and said rotary member and housing provided with means for blocking said housing against turning in each of said parking positions, said means adapted to be engaged to the member on the base in each parking position.

30. A rearview mirror system for vehicles, comprising:

a base adapted to be fixed on the left side of a car body;

a housing incorporating a mirror; and a positioning unit including a stationary member coupled to said base, a rotary member coupled to said housing, and a turning mechanism disposed between said stationary and rotary members for turning said rotary member and said housing from a viewing position wherein said housing protrudes laterally from the car body to one of a first parking position where said housing is directed toward the back of the car body or a second parking position where said housing is directed toward the front of the car body;

said base having a member extending toward said rotary member, and said rotary member having means for blocking said housing against further turning beyond each of said parking positions, said means being adapted to engage said member of said base in each parking position.

31. A rearview mirror system for vehicles, comprising:

a base which is to be fixed on the left side of a car body;

a housing incorporating a mirror; and a positioning unit including a stationary member coupled to said base, a rotary member coupled to said housing, and a turning mechanism disposed between said stationary and rotary members to turn said rotary member along with said housing from a viewing position where said housing protrudes laterally from the car body to a first parking position where said housing is directed toward the back of the car body or a second parking position where said housing is directed toward the front of the car body;

said base having a member extending toward said rotary member, and said rotary member and housing provided with means for blocking said housing against turning in each of said parking positions, said means adapted to be engaged to the member on the base in each parking position.

* * * * *